(12) United States Patent
Juris et al.

(10) Patent No.: US 9,232,873 B2
(45) Date of Patent: Jan. 12, 2016

(54) METHOD FOR BREWING A BEVERAGE

(71) Applicant: Starbucks Corporation, Seattle, WA (US)

(72) Inventors: Amanda L. Juris, Seattle, WA (US); Dervala A. Hanley, Seattle, WA (US); Charles B. Cook, Seattle, WA (US); Sung Hoon Kim, Palo Alto, CA (US); William Sauway Law, San Francisco, CA (US); Joel Frederic Jensen, Redwood City, CA (US); David A. Holcomb, Seattle, WA (US); Joseph Gray, Seattle, WA (US); Robert Sparks, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 14/295,227

(22) Filed: Jun. 3, 2014

(65) Prior Publication Data
US 2014/0356501 A1    Dec. 4, 2014

Related U.S. Application Data

(60) Provisional application No. 61/938,078, filed on Feb. 10, 2014, provisional application No. 61/831,469, filed on Jun. 5, 2013, provisional application No. 61/830,549, filed on Jun. 3, 2013, provisional application No. 61/841,133, filed on Jun. 28, 2013, provisional application No. 61/846,975, filed on Jul. 16, 2013.

(51) Int. Cl.
*A47J 31/38*    (2006.01)
*A23F 5/26*     (2006.01)
*A47J 31/18*    (2006.01)

(Continued)

(52) U.S. Cl.
CPC . *A47J 31/38* (2013.01); *A23F 3/18* (2013.01); *A23F 5/262* (2013.01); *A23F 5/265* (2013.01); *A47J 31/18* (2013.01); *A47J 31/20* (2013.01)

(58) Field of Classification Search
CPC ........... A47J 31/18; A47J 31/20; A47J 31/38; A23F 3/18; A23F 5/262; A23F 5/265
See application file for complete search history.

(56) References Cited

U.S. PATENT DOCUMENTS 4,381,696 A * 5/1983 Koral .............................. 99/304
5,441,752 A   8/1995 Sandin (Continued)

FOREIGN PATENT DOCUMENTS

CA    2119179 A1    9/1994
CA      81375       8/1997

(Continued)

OTHER PUBLICATIONS

International Search Report and Written Opinion for PCT/US2014/040708 dated Feb. 16, 2015 in 14 pages.

*Primary Examiner* — Anthony Weier
(74) *Attorney, Agent, or Firm* — Knobbe Martens Olson & Bear LLP

(57) ABSTRACT

A brewing apparatus including a fluid reservoir having a first end and a second end. The brewing apparatus can include a lid portion configured to removably engage the first end of the fluid reservoir and a cartridge holder configured to removably engage the second end of the fluid reservoir. A spring-loaded plunger can slidably connect to the lid portion.

5 Claims, 57 Drawing Sheets

(51) Int. Cl.
*A47J 31/20* (2006.01)
*A23F 3/18* (2006.01)

(56) References Cited

U.S. PATENT DOCUMENTS

| | | | |
|---|---|---|---|
| 5,632,193 | A | 5/1997 | Shen |
| 5,725,765 | A | 3/1998 | Shen |
| 5,943,946 | A | 8/1999 | Chen |
| D415,648 | S | 10/1999 | Joergensen |
| 5,979,299 | A | 11/1999 | Hornsby et al. |
| 6,135,010 | A | 10/2000 | Husted et al. |
| 6,324,966 | B1 | 12/2001 | Joergensen |
| 6,324,967 | B1 | 12/2001 | Robinson |
| 6,340,808 | B2 | 1/2002 | Joergensen |
| 6,349,631 | B2 | 2/2002 | Joergensen |
| 6,393,968 | B2 | 5/2002 | Joergensen |
| 6,422,133 | B1 * | 7/2002 | Brady ............... 99/297 |
| 6,536,331 | B2 | 3/2003 | Jorgensen |
| 6,692,780 | B1 | 2/2004 | Sandin |
| 6,797,160 | B2 | 9/2004 | Huang |
| D498,383 | S | 11/2004 | Chang et al. |
| 6,968,774 | B1 | 11/2005 | Bodum |
| 7,213,507 | B2 | 5/2007 | Glucksman et al. |
| 7,237,692 | B2 | 7/2007 | Bodum |
| 7,377,207 | B2 | 5/2008 | Hug et al. |
| D594,687 | S | 6/2009 | Bodum |
| D610,858 | S | 3/2010 | Jordana |
| 7,673,555 | B2 | 3/2010 | Nosler et al. |
| D615,339 | S | 5/2010 | Bronwasser |
| D648,974 | S | 11/2011 | Munro |
| 8,051,766 | B1 * | 11/2011 | Yu et al. ............... 99/297 |
| D652,246 | S | 1/2012 | Bodum |
| 8,234,971 | B2 | 8/2012 | Cerroni |
| 8,313,644 | B2 * | 11/2012 | Harris et al. ......... 210/198.1 |
| 2005/0046211 | A1 * | 3/2005 | Nole et al. ........... 294/27.1 |
| 2005/0172818 | A1 | 8/2005 | Hunt et al. |
| 2005/0279217 | A1 | 12/2005 | Bodum |
| 2008/0178743 | A1 | 7/2008 | Hug et al. |
| 2009/0229472 | A1 | 9/2009 | Ferrara, Jr. |
| 2009/0263550 | A1 | 10/2009 | Navarini et al. |
| 2010/0112150 | A1 | 5/2010 | Navarini et al. |
| 2010/0154645 | A1 | 6/2010 | Nosler et al. |
| 2010/0192780 | A1 | 8/2010 | Bodum |
| 2010/0275785 | A1 | 11/2010 | Weissman et al. |
| 2010/0294135 | A1 | 11/2010 | Weissman et al. |
| 2010/0319549 | A1 * | 12/2010 | Kelty et al. ............. 99/297 |
| 2011/0041697 | A1 | 2/2011 | Ruckstuhl |
| 2011/0083560 | A1 | 4/2011 | Chen |
| 2011/0088561 | A1 | 4/2011 | Bodum |
| 2012/0017767 | A1 | 1/2012 | Besora |
| 2012/0125928 | A1 | 5/2012 | Bodum |
| 2012/0216682 | A1 * | 8/2012 | Bodum ............... 99/297 |
| 2012/0260806 | A1 | 10/2012 | Rolfes et al. |
| 2012/0312173 | A1 | 12/2012 | Geissler |
| 2013/0010568 | A1 | 1/2013 | Bodum |
| 2013/0037469 | A1 | 2/2013 | Harris et al. |
| 2013/0055901 | A1 | 3/2013 | Zhang et al. |
| 2013/0078342 | A1 | 3/2013 | Loebl |
| 2013/0101715 | A1 | 4/2013 | Geissler et al. |

FOREIGN PATENT DOCUMENTS

| | | |
|---|---|---|
| CA | 2206800 A1 | 12/1997 |
| CA | 2203852 A1 | 10/1998 |
| CA | 2331488 A1 | 11/1999 |
| CA | 2262262 A1 | 12/1999 |
| CA | 90858 | 11/2000 |
| CA | 2357283 A1 | 3/2002 |
| CA | 2424187 A1 | 11/2003 |
| CA | 2297949 C | 10/2005 |
| CA | 2610687 A1 | 12/2006 |
| CA | 2627328 A1 | 3/2007 |
| CA | 134537 | 10/2010 |
| CA | 2756253 A1 | 10/2010 |
| CA | 2493392 C | 11/2010 |
| CA | 135956 | 3/2011 |
| CA | 2781317 A1 | 5/2011 |
| CA | 2787200 A1 | 7/2011 |
| CA | 2801176 A1 | 12/2011 |
| EP | 0615714 A1 | 9/1994 |
| EP | 0761148 A1 | 3/1997 |
| EP | 0951853 B1 | 10/1999 |
| EP | 1009269 B1 | 1/2003 |
| EP | 1237446 B1 | 5/2003 |
| EP | 1237450 B1 | 5/2003 |
| EP | 1237448 B1 | 6/2003 |
| EP | 0824334 B1 | 7/2003 |
| EP | 1148802 B1 | 8/2003 |
| EP | 1237449 B1 | 3/2006 |
| EP | 1509112 B1 | 7/2006 |
| EP | 1551262 B1 | 7/2006 |
| EP | 1800572 B1 | 2/2008 |
| EP | 1565094 B1 | 3/2008 |
| EP | 1741371 B1 | 4/2008 |
| EP | 1908379 A1 | 4/2008 |
| EP | 1922962 B1 | 6/2009 |
| EP | 1940268 B1 | 11/2011 |
| EP | 2413753 B1 | 1/2013 |
| WO | WO 95/15886 A1 | 6/1995 |
| WO | WO 96/05760 A1 | 2/1996 |
| WO | WO 98/10686 A1 | 3/1998 |
| WO | WO 99/07266 A1 | 2/1999 |
| WO | WO 99/58034 A1 | 11/1999 |
| WO | WO 00/30513 A1 | 6/2000 |
| WO | WO 00/42890 A1 | 7/2000 |
| WO | WO 00/72736 A1 | 12/2000 |
| WO | WO 01/43606 A1 | 6/2001 |
| WO | WO 01/43607 A1 | 6/2001 |
| WO | WO 01/43608 A1 | 6/2001 |
| WO | WO 01/43609 A1 | 6/2001 |
| WO | WO 01/45538 A1 | 6/2001 |
| WO | WO 2004/026090 A1 | 4/2004 |
| WO | WO 2004/033335 A1 | 4/2004 |
| WO | WO 2004/041038 A1 | 5/2004 |
| WO | WO 2005/089603 A1 | 9/2005 |
| WO | WO 2006/128880 A2 | 12/2006 |
| WO | WO 2007/080461 A1 | 7/2007 |
| WO | WO 2009/011982 A1 | 1/2009 |
| WO | WO 2009/100552 A1 | 8/2009 |
| WO | WO 2010/031198 A2 | 3/2010 |
| WO | WO 2010/037340 A1 | 4/2010 |
| WO | WO 2010/094026 A1 | 8/2010 |
| WO | WO 2011/088221 A2 | 7/2011 |
| WO | WO 2011/101511 A1 | 8/2011 |
| WO | WO 2011/153272 A2 | 12/2011 |
| WO | WO 2012/041394 A1 | 4/2012 |
| WO | WO 2012/084809 A1 | 6/2012 |
| WO | WO 2012/141806 A2 | 10/2012 |
| WO | WO 2014/197480 | 12/2014 |

* cited by examiner

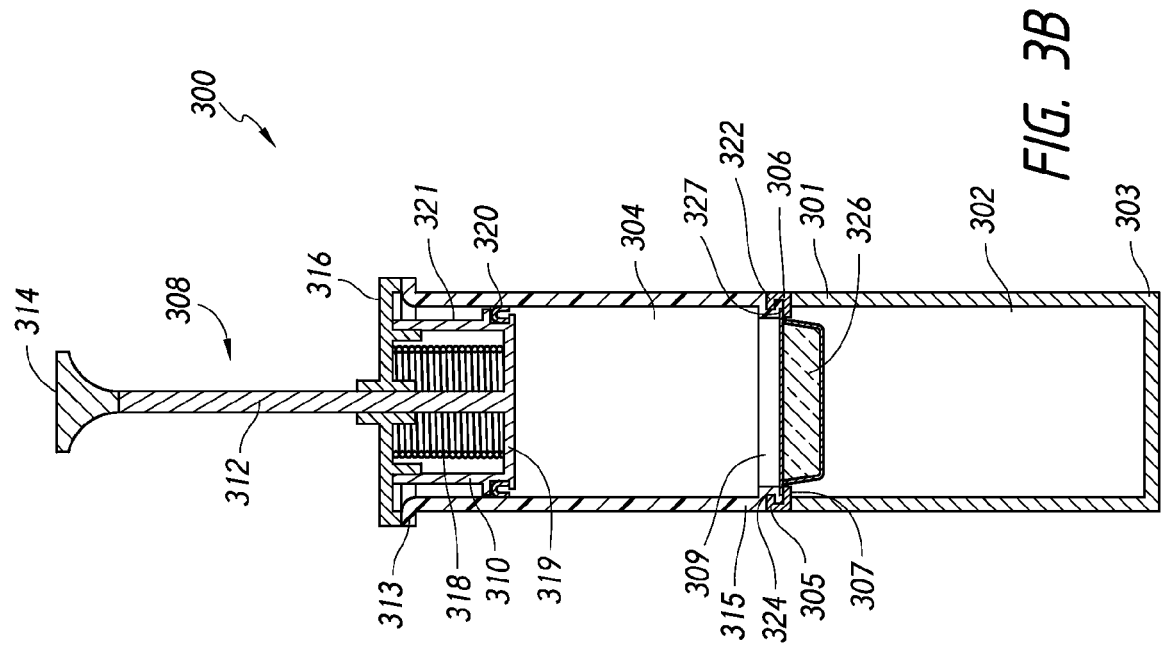
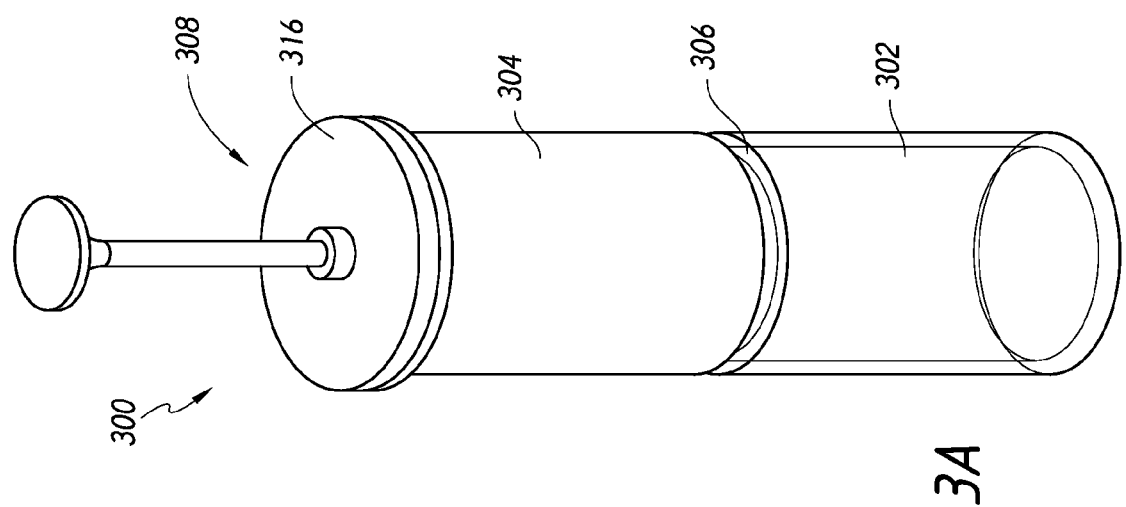
FIG. 3B
FIG. 3A

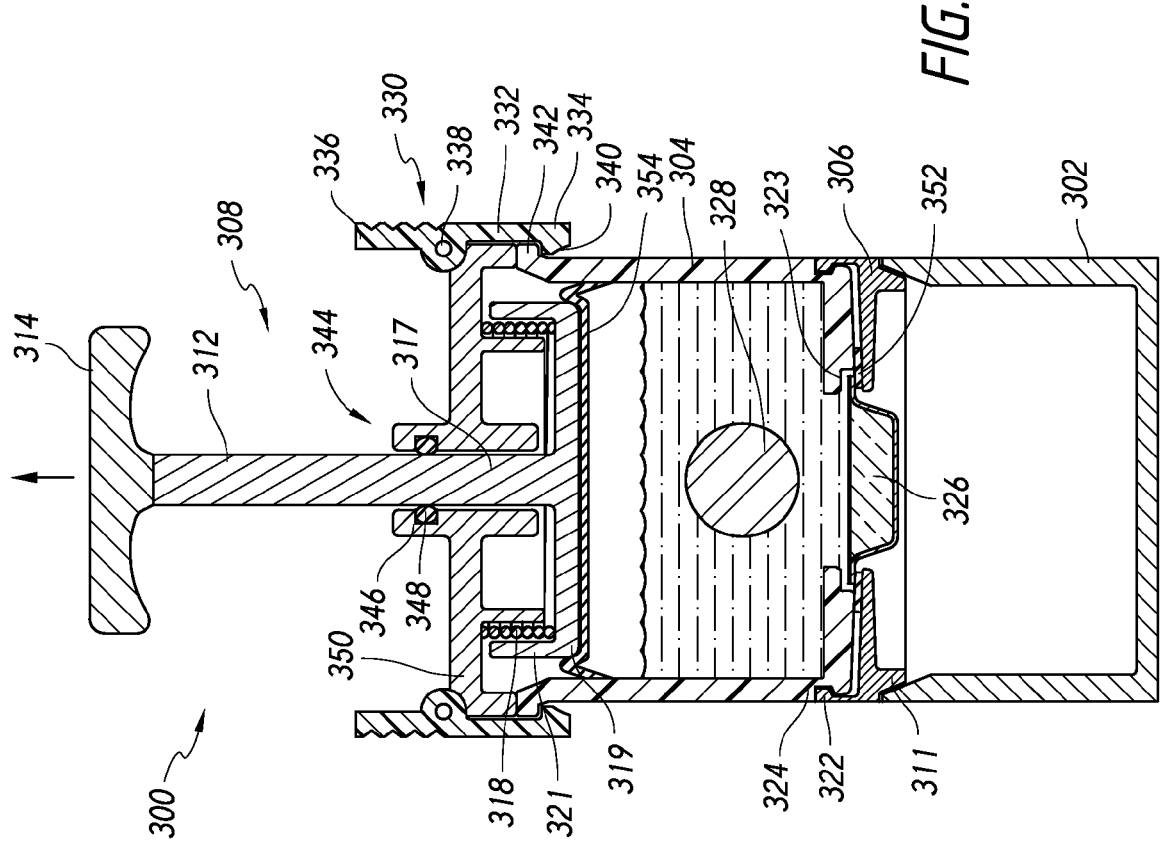

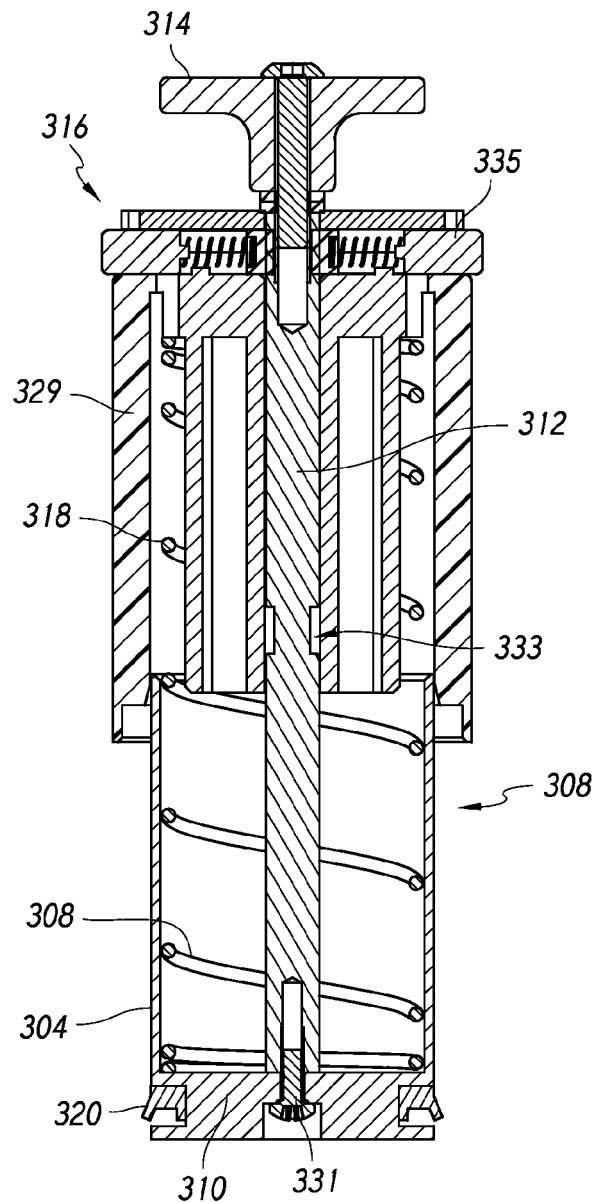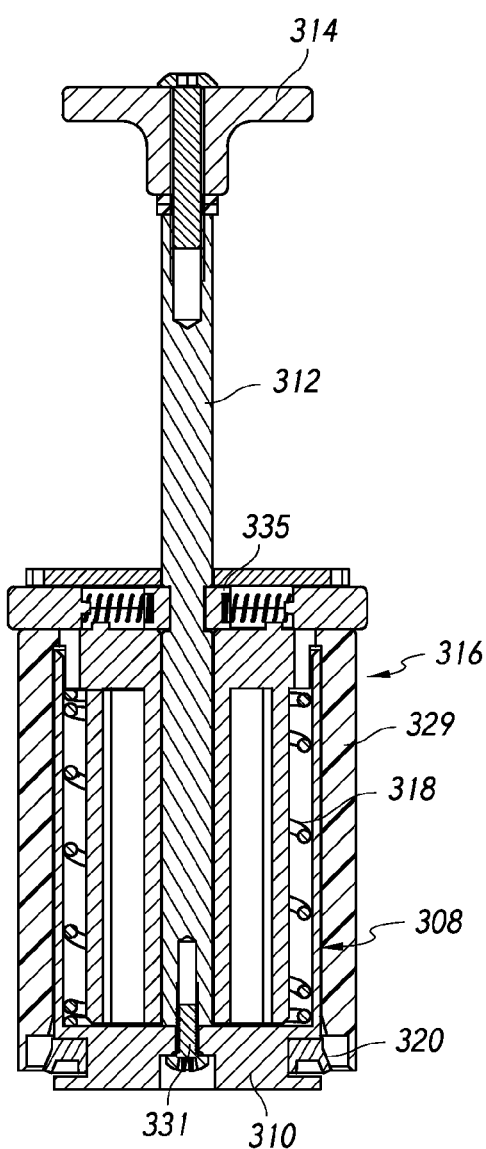
FIG. 3H
FIG. 3I

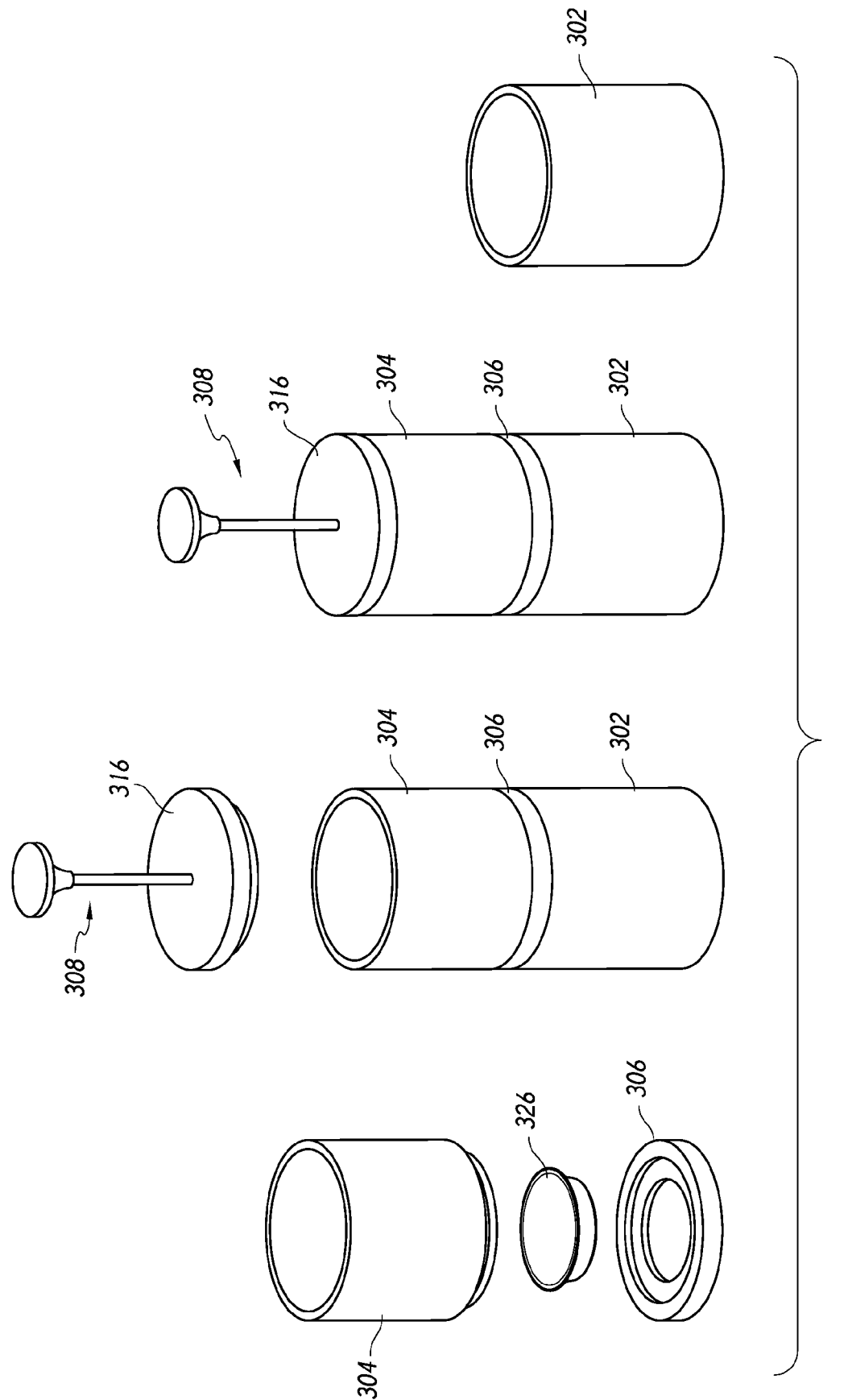

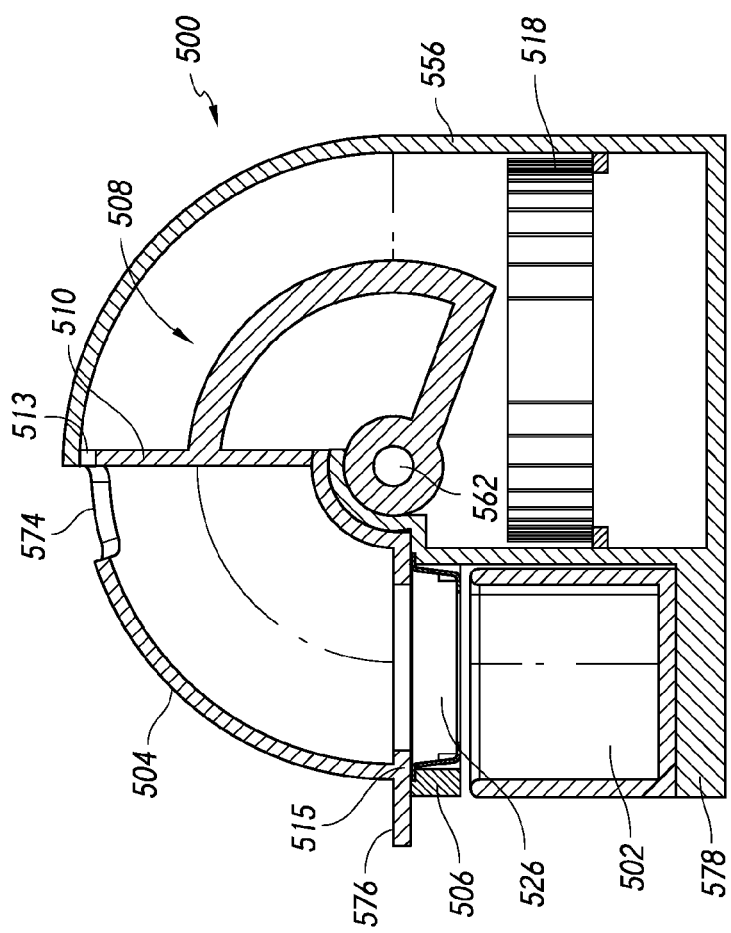
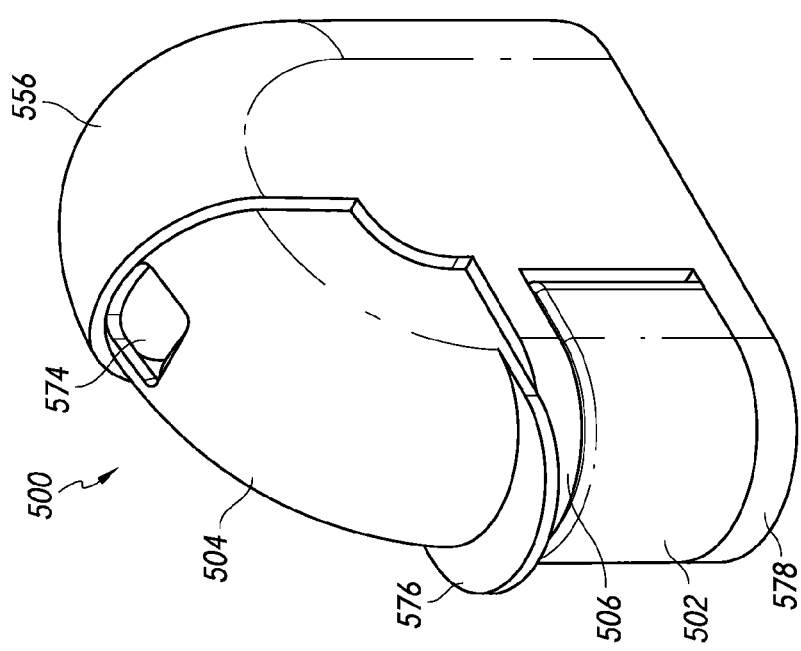
FIG. 5B
FIG. 5A

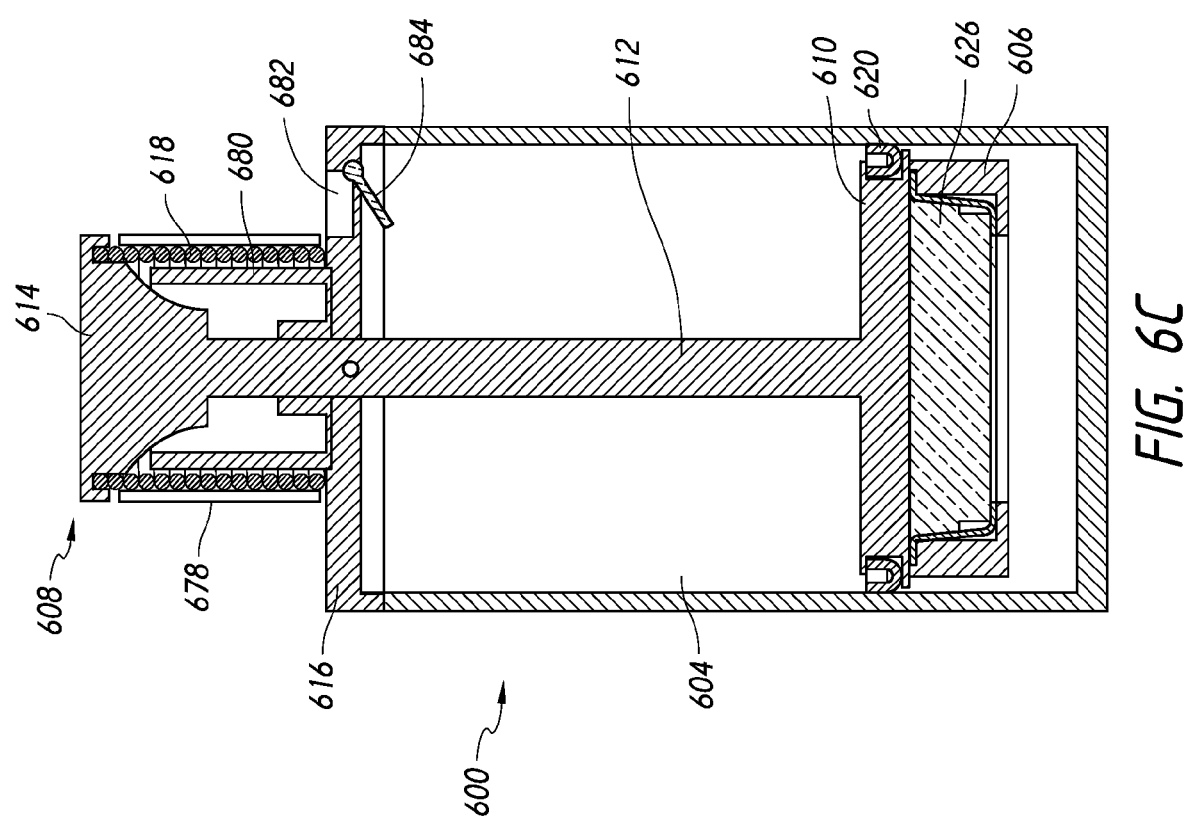

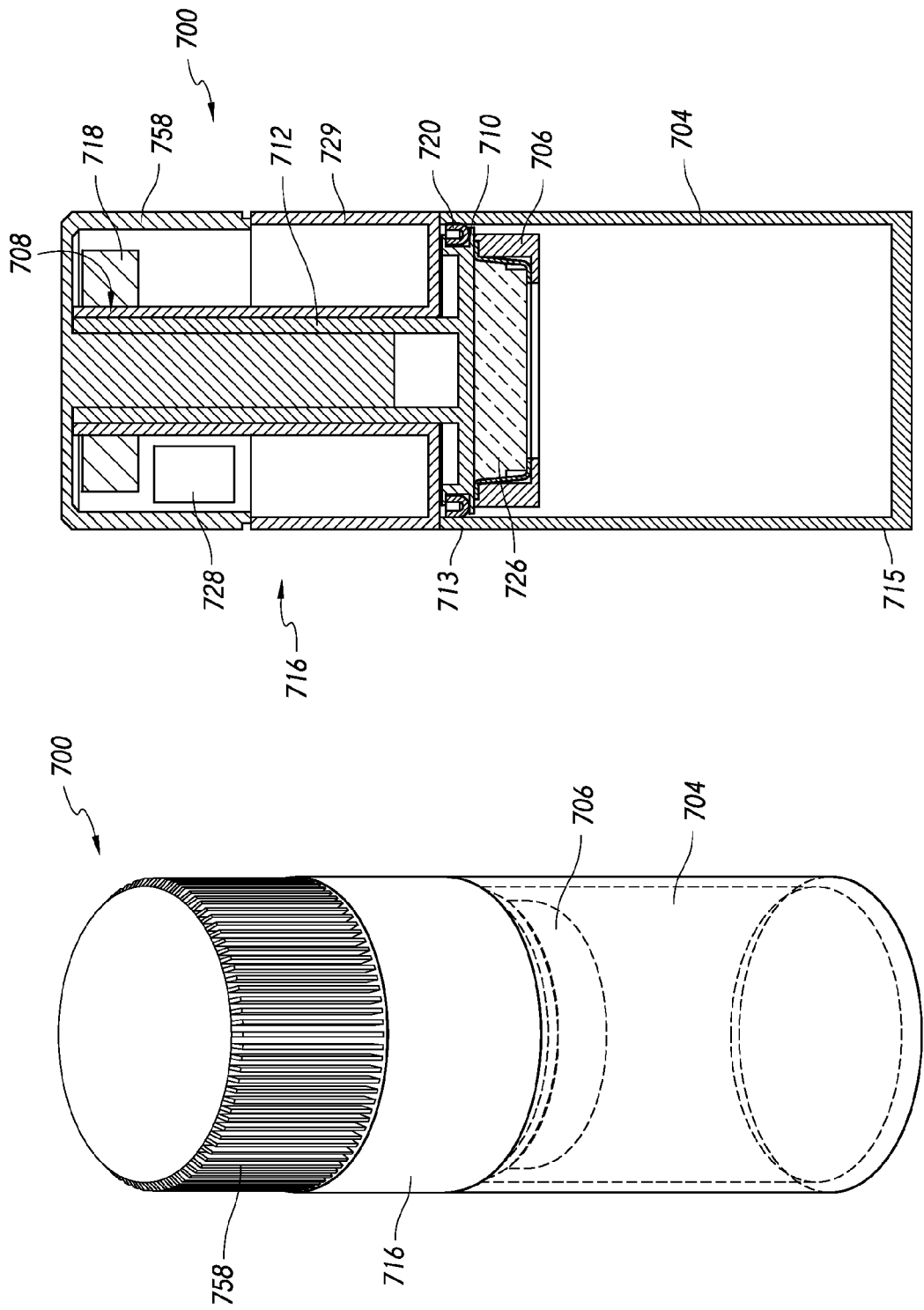

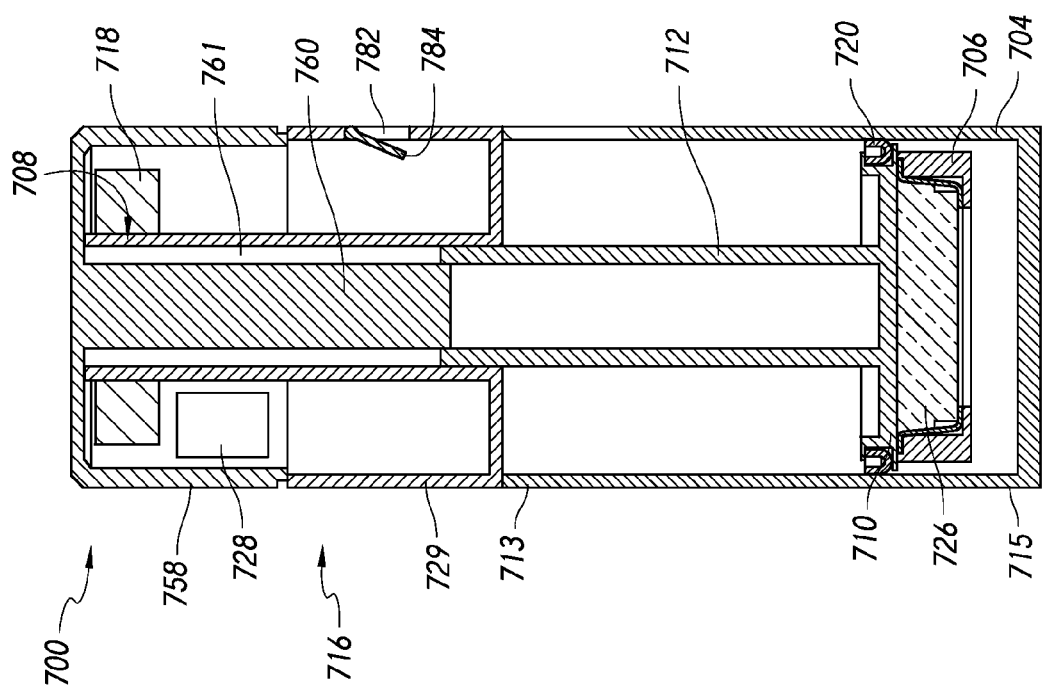

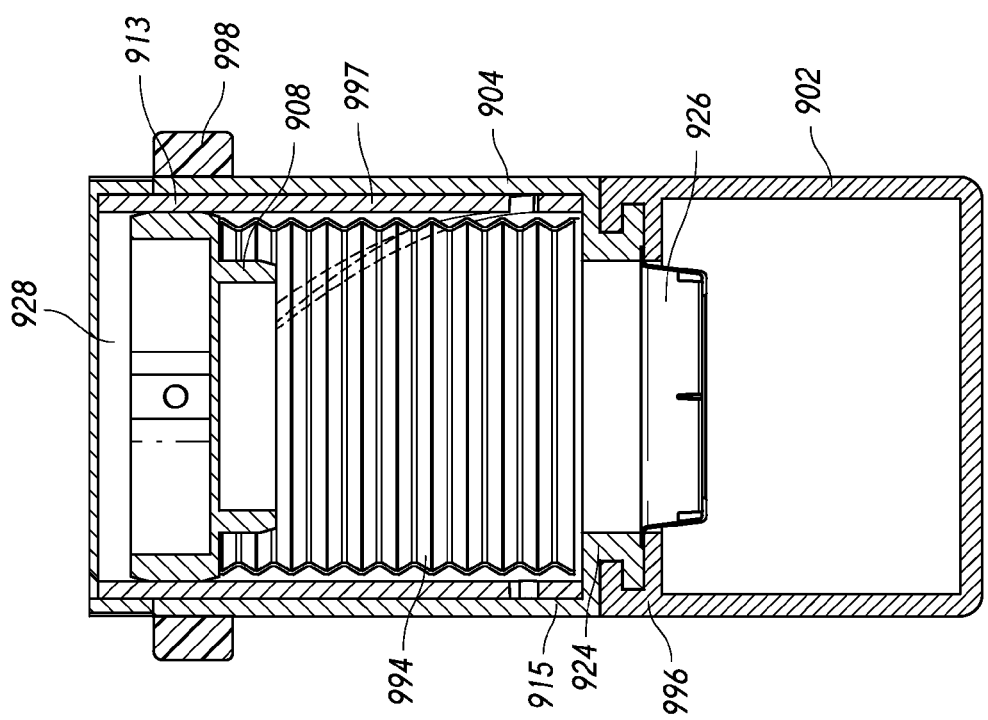
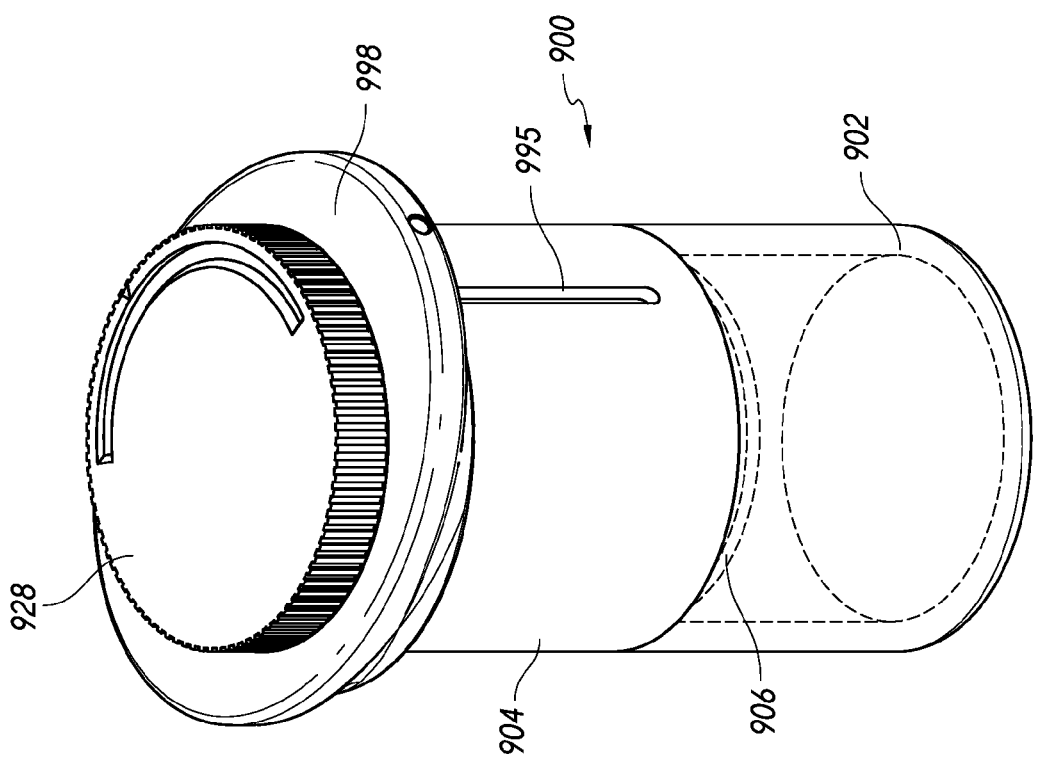
FIG. 9B
FIG. 9A

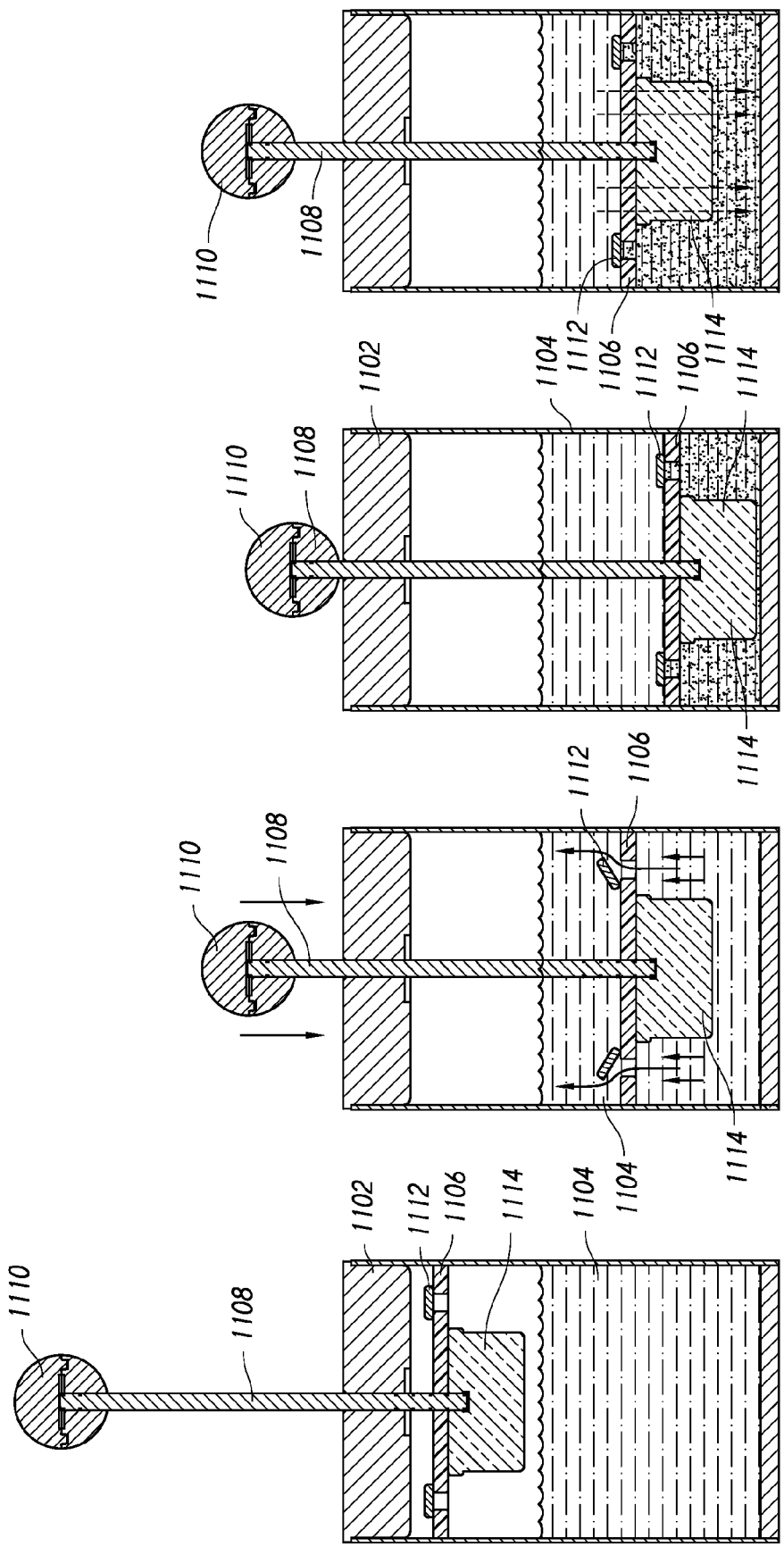

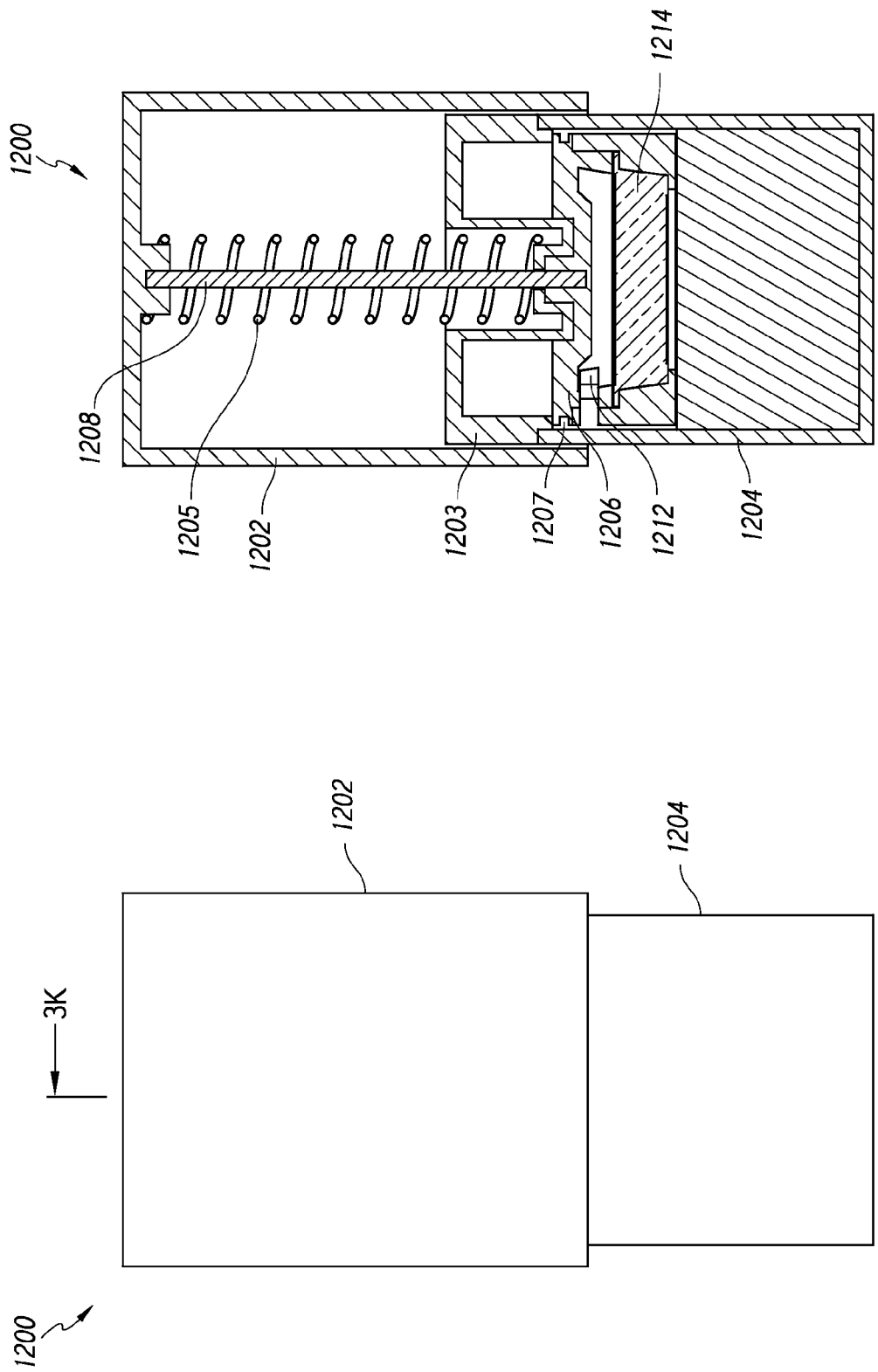

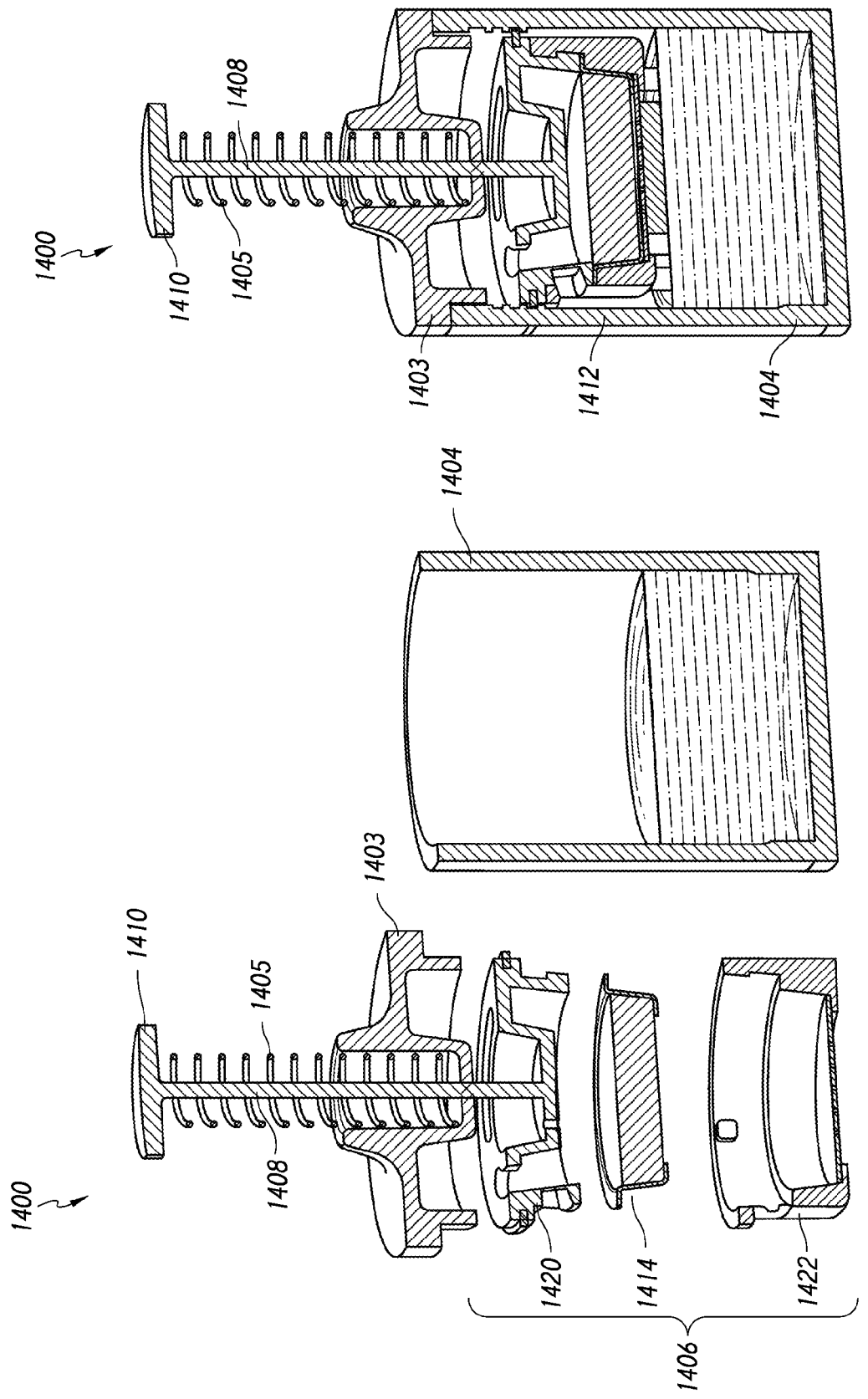

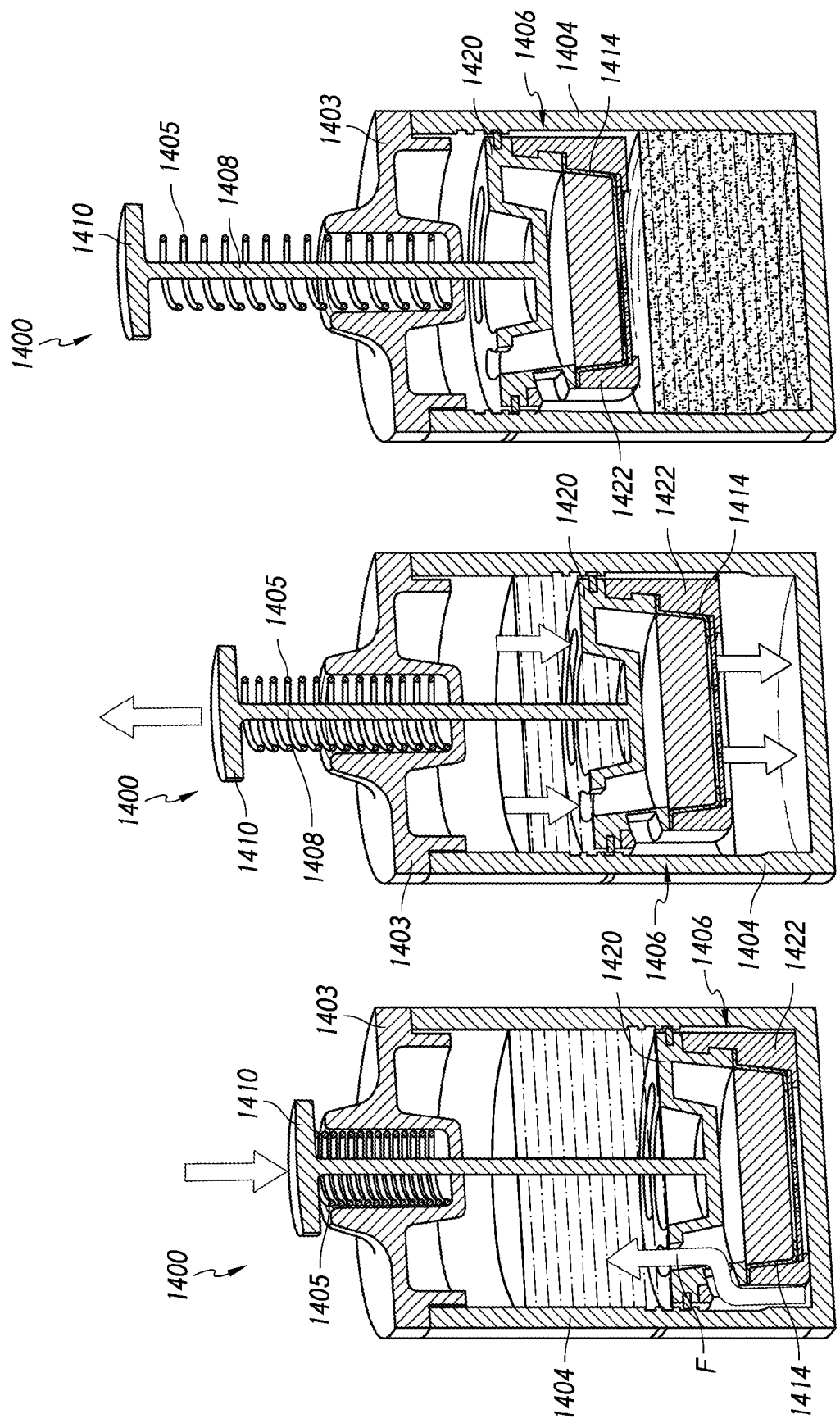

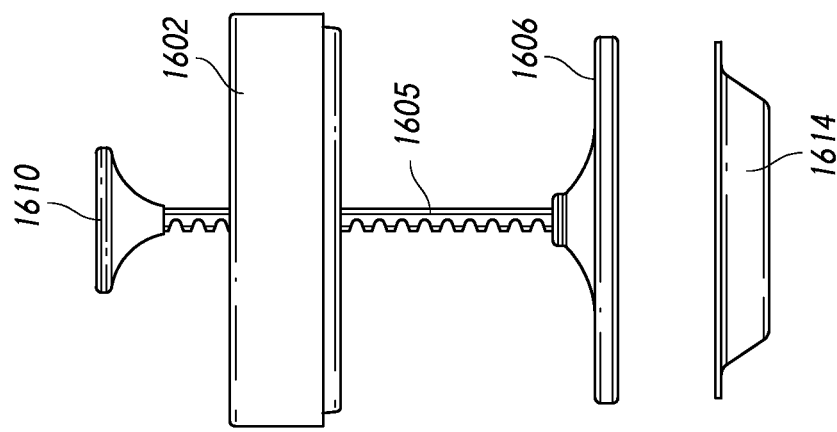
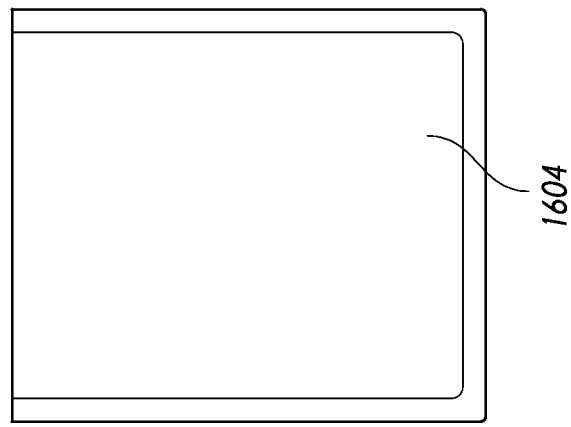
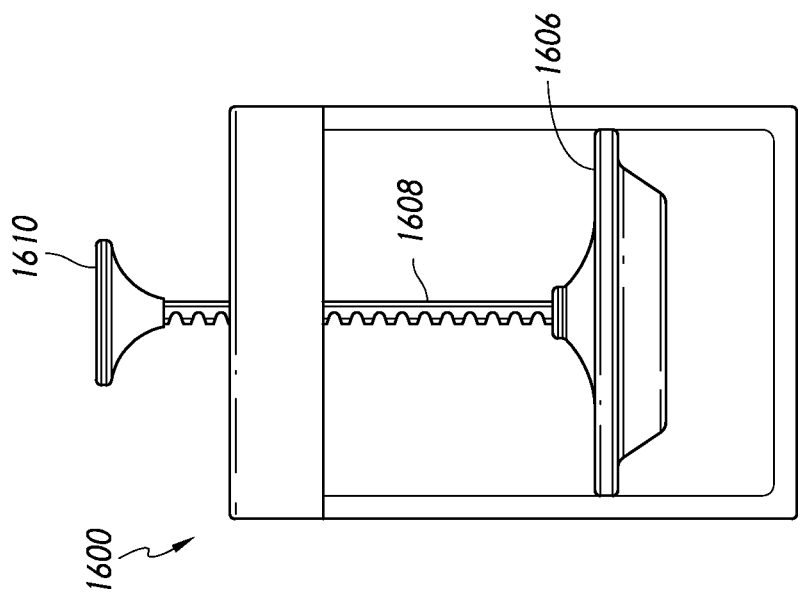
FIG. 22B
FIG. 22A

METHOD FOR BREWING A BEVERAGE

INCORPORATION BY REFERENCE TO ANY PRIORITY APPLICATIONS

This application claims priority benefit under 35 U.S.C. §119(e) of U.S. Provisional Application No. 61/830,549, filed Jun. 3, 2013, titled "MODIFIED FRENCH PRESS," U.S. Provisional Application No. 61/831,469, filed Jun. 5, 2013, titled "APPARATUS AND METHOD FOR BREWING A BEVERAGE," U.S. Provisional Application No. 61/841,133, filed Jun. 28, 2013, titled "MODIFIED FRENCH PRESS," U.S. Provisional Application No. 61/846,975, filed Jul. 16, 2013, titled "MODIFIED FRENCH PRESS," and U.S. Provisional Application No. 61/938,078, filed Feb. 10, 2014, titled "APPARATUS AND METHOD FOR BREWING A BEVERAGE," all of which are hereby incorporated by reference in their entirety.

BACKGROUND

1. Field

The present disclosure generally relates to apparatuses and methods for brewing a beverage, such as coffee.

2. Description of the Related Art

Of the many techniques for brewing coffee, connoisseurs consider the French press technique to be one of the best for taste and efficient use of ground coffee (efficiency is proportional to the ratio of the amount of coffee brewed to the amount of ground coffee used). It is theorized that the good taste and efficiency is a result of the relatively thorough wetting of the coffee grounds that the French press technique allows. Wetting is a function of the surface area of the coffee grounds in contact with water during the brewing time, and of the portion of the brewing time during which this contact occurs. The greater the contact area and contact time, the more thorough the wetting of the coffee grounds.

FIGS. 1A and 1B illustrate the French press technique. Referring to FIG. 1A, one places ground coffee 10 and hot water 12 in a coffee pot 14, and allows coffee to brew. Because the ground coffee 10 often floats to the surface of the water 12, one may stir or otherwise agitate the mixture of the ground coffee and the water to more thoroughly wet the individual coffee grounds that constitute the ground coffee. Referring to FIG. 1B, after the coffee 15 has brewed, one grasps a handle 16 of a filter 18, inserts the filter into the coffee pot 14, and presses the filter down toward the bottom of the pot.

Because the filter 18 passes liquid but does not pass coffee-ground-sized particles, as one presses the filter toward the bottom of the coffee pot 14, the substantially ground-free brewed coffee 15 fills the portion of the pot above the filter while the filter retains the ground coffee 10 in the portion of the pot below the filter. Of course, the edge 20 of the filter 18 and the inner side 22 of the pot 14 form a seal sufficient to prevent coffee grounds from passing between the edge of the filter and the inner side of the pot.

After one presses the filter 18 below a spout 24 of the coffee pot 14, he can pour the substantially ground-free brewed coffee 15 into a cup (not shown in FIGS. 1A and 1B) via the spout. Although ideally one may stop pressing the filter 18 after the filter is below the spout 24, one typically presses the filter all the way to the bottom of the coffee pot 14 to reduce the chances of undersized coffee grounds passing through the filter and into the cup.

Still referring to FIG. 1B, after one pours the desired amount of brewed coffee 15, he retracts the filter 18 from the pot 14 by pulling on the handle 16, removes the ground coffee 10 from the pot, and then cleans the filter and the pot.

SUMMARY

The present disclosure is directed towards devices methods for use in making coffee or the like. In one embodiment, the device incorporates a container, a lid and a filtering assembly. The container is adapted to hold a liquid and has an opening at an upper end. The lid is coupleable with the upper end of the container. The filtering assembly is positioned on a lower side of the lid, corresponding to a side of the lid nearest the container during use. An actuator positioned on an upper side of the lid is coupled to the filtering assembly by a shaft passing through the lid such that an actuation force placed on the actuator results in a downward movement of the filtering assembly. The shaft or actuator is biased to return the filtering assembly to a position proximate the lid. A filter for holding coffee grounds or the like to be steeped in the liquid is coupled to the filtering assembly. The filtering assembly has at least a first opening therethrough, the opening being positioned to allow the liquid to pass therethrough without also passing through the filter. For example, the first opening can optionally house a valve configured to allow liquid to pass only when the filtering assembly moves downward in the container. At least a second opening can be positioned to allow liquid to pass therethrough when the liquid flows through the filter. The second opening forces water through the coffee grounds causing a restriction of flow through the filtering assembly.

When a user manipulates the actuator to move the filtering assembly downward through the liquid, the filtering assembly moves quickly because the liquid flows primarily through the first opening. When the filtering assembly returns to the lid under the biasing force, the filtering assembly moves at a significantly slower velocity as the liquid passes primarily through the filter and the second opening and the coffee grounds or the like.

Certain aspects of the present disclosure are directed toward a brewing apparatus including a fluid reservoir having a first end and a second end. The brewing apparatus can include a lid portion configured to removably engage the first end of the fluid reservoir and a cartridge holder configured to removably engage the second end of the fluid reservoir. A spring-loaded plunger can slidably connect to the lid portion. The spring-loaded plunger can be configured to move between a first configuration and a second configuration. The brewing apparatus can include a timing mechanism configured to control movement of the spring-loaded plunger through the fluid reservoir.

In the above-mentioned brewing apparatus, the lid portion can be configured to lock the spring-loaded plunger in the first configuration.

In any of the above-mentioned brewing apparatuses, the brewing apparatus can include a vessel removably connected to the cartridge holder. The cartridge holder can be disposed between the fluid reservoir and the vessel.

In any of the above-mentioned brewing apparatuses, the brewing apparatus can include a visual indicator configured to indicate a presence of heated water for a pre-determined period of time. The visual indicator can be a color-changing indicator.

In any of the above-mentioned brewing apparatuses, the brewing apparatus can include a sealing member configured to form a seal between the plunger and the fluid reservoir.

In any of the above-mentioned brewing apparatuses, the lid portion can include a latch mechanism configured to secure the lid portion to the fluid reservoir.

In any of the above-mentioned brewing apparatuses, the plunger moves from the first configuration to the second configuration at a rate controlled by a spring. The spring can include, but is not limited to, a compression spring, torsion spring, spiral spring, extension spring, constant force spring, or a gas-compressed spring. In certain aspects, the movement of the plunger can be controlled using a spring and damper system, a timing mechanism (e.g., a ratchet), a bellow, a rubber band or otherwise deformable elastomer, a phase change, a battery, a capacitor, a thermal energy input, or an otherwise biasing or force producing mechanism. In certain aspects, the timing mechanism can be adjustable.

Certain aspects of the disclosure are directed toward a method of using a brewing apparatus. The method can include providing a fluid reservoir having a first end and a second end; securing a cartridge holder to the second end of the fluid reservoir; securing the cartridge holder to the vessel; and securing a lid portion to the first end of the fluid reservoir. The lid portion can slidably connect to a spring-loaded plunger configured to move between a first configuration and a second configuration.

Certain aspects of this disclosure are directed toward a method of using a brewing apparatus including: loading a cartridge comprising one or more beverage components into the brewing apparatus; activating a mechanical loaded plunger; adding hot water to a fluid reservoir of the brewing apparatus; and releasing the mechanical loaded plunger to move to move the plunger between a first configuration and a second configuration within the fluid reservoir to pass hot water through the cartridge.

In any of the above-mentioned methods, moving the plunger from the second configuration to the first configuration can include compressing a spring connected to a plunger. After compressing the spring, the method can include pouring heated water into the fluid reservoir. In certain aspects, the method can include locking the plunger in the first configuration.

In any of the above-mentioned methods, moving the plunger from the first configuration to the second configuration can include releasing the spring-loaded plunger. In certain aspects, after releasing the spring-loaded plunger, the method can include re-compressing the spring.

In any of the above-mentioned methods, the method can include releasing the spring-loaded plunger after a visual indicator indicates a presence of heated water in the fluid reservoir for a pre-determined period of time. In certain variants, the visual indicator can include a temperature sensor configured to indicate when the temperature has dropped to the correct brewing temperature. In certain variants, the method can include releasing the spring-loaded plunger after a timer indicates that a steep time has elapsed. The timer can include, but is not limited to, an hourglass, a mechanical timer, a moisture indicator, a temperature indicator, a pressure gauge, a thermo-electric powered timer, or a battery-powered electronic timer.

In any of the above-mentioned methods, the method can include activating a mechanical loaded plunger by compressing a spring. In certain aspects, the method can include activating a mechanical loaded plunger by compressing a torsion spring. In certain aspects, the method can include activating a mechanical loaded plunger by raising a mass to a first position.

Certain aspects of this disclosure are directed toward a brewing apparatus including a fluid reservoir having a first end and a second end, a lid portion configured to removably engage the first end of the fluid reservoir, a cartridge holder coupled to the second end of the fluid reservoir, and a spring-loaded plunger slidably connected to the lid portion. The spring-loaded plunger can be configured to move between a first configuration and a second configuration within the fluid reservoir. For example, a torsion spring can be configured move the spring-loaded plunger between the first and second configurations. In certain aspects, the torsion spring rotates a piston coupled to the plunger.

Certain aspects of this disclosure are directed toward a brewing apparatus including a fluid reservoir including a first end and a second end, a lid portion configured to removably engage the first end of the fluid reservoir, a cartridge holder coupled to the second end of the fluid reservoir, a spring-loaded plunger slidably connected to the lid portion, and a pivot arm coupled to the spring-loaded plunger. The spring-loaded plunger can be configured to move between a first configuration and a second configuration within the fluid reservoir. The pivot arm and the plunger can pivot about a pivot point as the spring-loaded plunger moves from the first configuration to the second configuration.

For purposes of summarizing the disclosure, certain aspects, advantages, and features of the inventions have been described herein. It is to be understood that not necessarily any or all such advantages are achieved in accordance with any particular embodiment of the inventions disclosed herein. No aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 4I illustrates an enlarged exploded view of the plunger assembly shown in FIGS. 4E and 4F.

FIG. 4O illustrates a method of using the brewing apparatus shown in FIG. 4A.

FIG. 5A illustrates an isometric view of a rotary press apparatus for brewing a beverage.

FIG. 5B illustrates a cross-section of the apparatus shown in FIG. 5A.

FIG. 6C illustrates a cross-section of the apparatus shown in FIG. 6A in a primed configuration.

FIG. 7A illustrates an isometric view of another spring-loaded, pull-type apparatus for brewing a beverage.

FIG. 7B illustrates a cross-section of the apparatus shown in FIG. 7A in a deployed configuration.

FIG. 7C illustrates a cross-section of the apparatus shown in FIG. 7A in a primed configuration.

FIG. 9A illustrates an isometric view of a manual press apparatus for brewing a beverage.

FIG. 9B illustrates a cross-section of the apparatus shown in FIG. 9A.

FIG. 10 is an elevational, partially cross-sectioned view schematically illustrating an apparatus for brewing a steeped beverage, in a starting/ending configuration, according to one embodiment.

FIG. 11 is another view of the apparatus of FIG. 10, illustrated while being moved from the starting configuration to an initial brewing configuration.

FIG. 12 is another view of the apparatus of FIG. 10, shown in the initial brewing configuration.

FIG. 13 is another view of the apparatus of FIG. 10, illustrated while moving through the brewing configurations toward the ending configuration.

FIG. 14 is an elevation view of another embodiment of an apparatus for brewing a steeped beverage.

FIG. 15 is a diametric cross-section of the apparatus of FIG. 14, shown in a starting/ending configuration.

FIGS. 18A, 18B, 18C, 18D, and 18E is a progression of diametric cross-sectional views of an embodiment of the device, shown in the course of assembling the device and brewing coffee.

FIG. 22A is a diametric cross-section schematically illustrating an apparatus for brewing a steeped beverage according to one embodiment.

FIG. 22B is a side perspective view of the components of the apparatus of FIG. 22A.

DETAILED DESCRIPTION

Figure 1B:
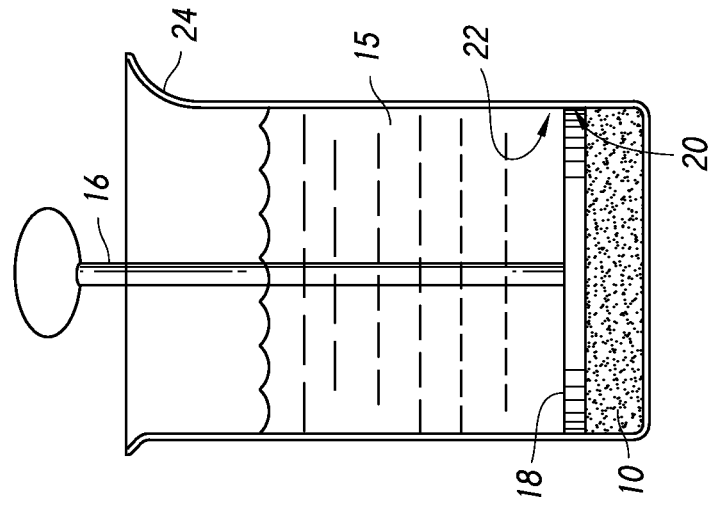
FIGS. 1A-1B illustrate a conventional French press technique for brewing coffee.
Figure 1A:
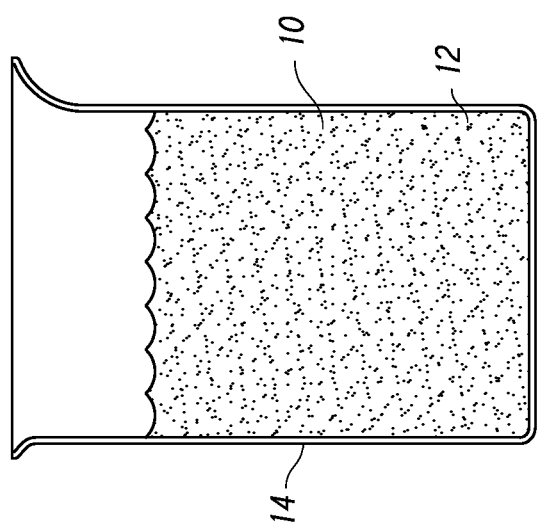

The following discussion is presented to enable a person skilled in the art to make and use one or more embodiments of the invention. The general principles described herein may be applied to embodiments and applications other than those detailed below without departing from the spirit and scope of the invention. Therefore the present invention is not intended to be limited to the embodiments shown, but is to be accorded the widest scope consistent with the principles and features disclosed or suggested herein.

The brewing apparatuses and methods described herein can employ a cartridge containing one or more beverage components or precursors to produce the beverage. The term "cartridge" as used herein shall be given its ordinary and customary meaning, and shall include, without limitation, cartridges, capsules, cups, pods, and the like. Generally, such cartridges are used to produce a single serving of the beverage and subsequently removed from the apparatus and discarded. A cartridge based brewing apparatus eliminates the need to grind, measure, and/or clean up the beverage component contained in the cartridge.

As an example, a beverage cartridge can include a generally hollow body portion. The body portion can have a chamber, a sidewall, a first end, and a second end. The first end can include a radially outwardly extending lip. The second end can have a radially inwardly extending flange. A first filter element can be joined with the lip. The first element can be configured to allow passage of liquid therethrough. A second filter element can be joined with the flange and configured to allow passage of liquid therethrough. In certain aspects, the beverage cartridge can be compostable.

The brewing apparatuses described herein can be configured to control one or more variables affecting the quality of an output from the brewing apparatus, such as brew pressure, flow rate, or brew time. Brew pressure can vary between different cartridges or within a single brew cycle. Thus, it can be desirable to configure the brewing apparatus to maintain a substantially constant flow rate, even when the brew pressure varies, to provide a consistent brew time. If the brew pressure is substantially constant between different cartridges, it may be desirable to configure the brewing apparatus to apply a constant force to the cartridge.

In addition, the brewing apparatuses described herein can be configured to include a simple (e.g., single action, low force, etc.), efficient mechanism to depress a plunger (or pull the plunger in a pull-type press) to minimize the user work input. In certain aspects, the mechanism can be fully automatic. Minimizing work input can help maintain a constant flow rate and/or brew time. In some embodiments, the brewing apparatus only requires the user to perform a single action to input energy, such as a push, pull, twist, shake, a flip, or otherwise. The user may perform the single action to manually deploy the plunger, to initiate the deployment of the plunger, or to set the plunger to automatically deploy. Although the examples provided below may be described in connection with a specific action or type of deployment, the deployment features can be interchangeable.

In some embodiments, the energy required to brew the beverage can be less than about 16 J, less than about 8 J, between about 6 J and about 8 J, or between about 3 J to about 5 J. In some embodiments, the user force required to depress or retract the plunger over a distance of less than or equal to about 4 inches can be less than about 35 lbf, less than or equal to about 25 lbf, less than or equal to about 15 lbf, less than or equal to about 10 lbf or less than or equal to about 5 lbf. In some embodiments, the user force required to rotate a lever can be less than or equal to about 3 lbf, less than or equal to about 2.5 lbf, or between about 2 lbf and about 1 lbf.

Method of Using a French Press

Figure 2:
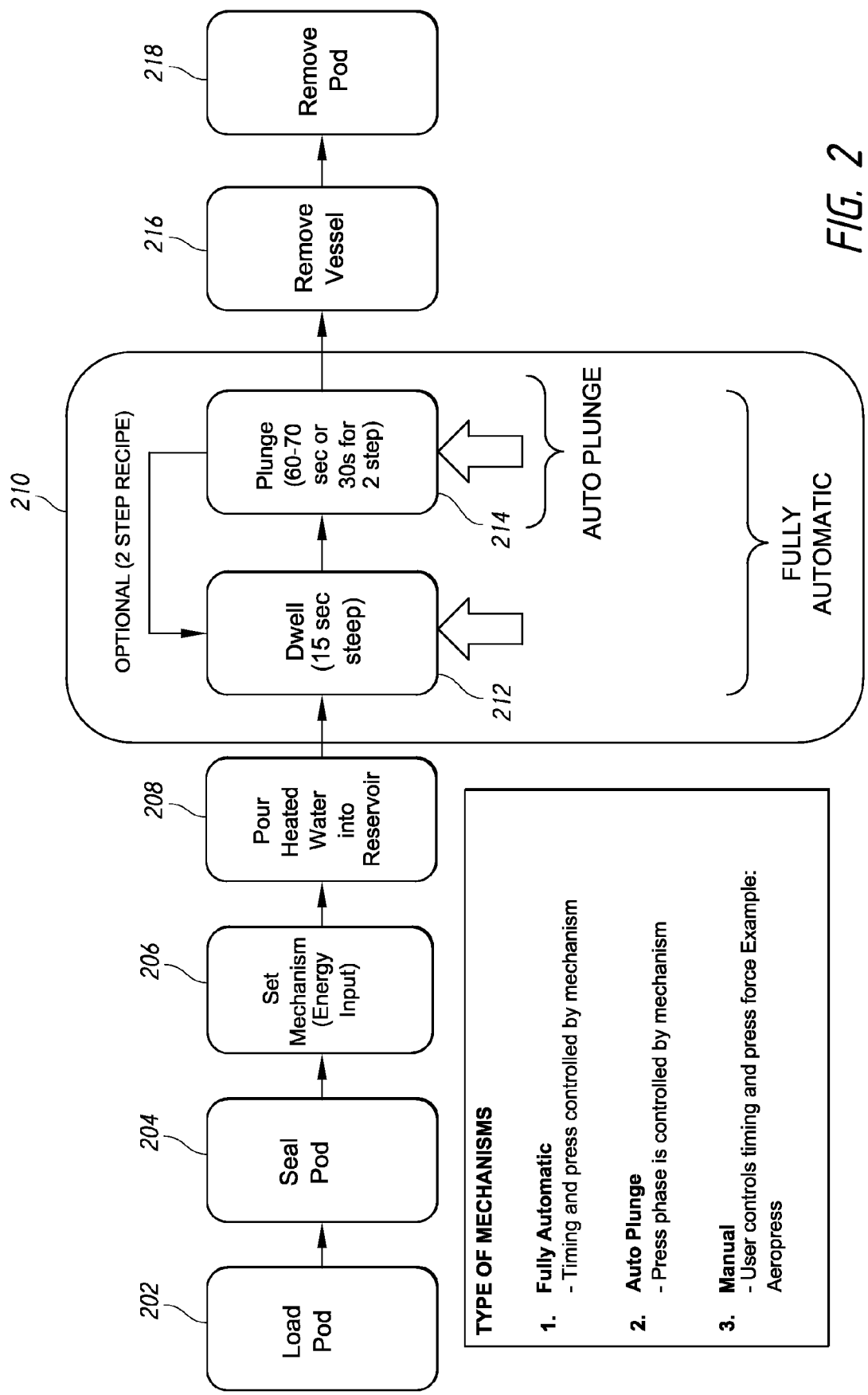
FIG. 2 is a block diagram illustrating a method of using a brewing apparatus.

FIG. 2 is a flow diagram illustrating a method 200 of using a brewing apparatus. Various brewing apparatuses configured to adopt this method are described in detail below.

As shown in FIG. 2, the user can first load the cartridge (block 202) and seal the cartridge within the brewing apparatus (block 204). After sealing the cartridge, the user can prime the plunger (block 206). Thereafter, the user can pour hot water into the fluid reservoir. Hot water can include water having a temperature of at least about 176° F. and/or less than or equal to about 212° F. For example, the temperature can be between about 195° F. and about 205° F. Priming the plunger prior to adding hot water protects the user from inadvertently spilling hot water during the priming step.

The steps for brewing the beverage (block 210) can vary depending whether the brewing apparatus utilizes a manual plunger (e.g., user controls the timing and push/pull force), a user-initiated plunger (e.g., user initiates plunger but brewing apparatus controls push/pull force), or a fully automatic plunger (e.g., brewing apparatus controls both the timing and push/pull force). If the brewing apparatus operates manually, then the user can optionally wait for a predetermined steep time (block 212) and then applies a force to move the plunger over a plunge time (block 214). If the brewing apparatus utilizes a user-initiated plunger, then the user waits for the steep time (block 212) and then initiates the plunge (block 214). Although the user initiates the plunge (block 214), the brewing apparatus controls the press force and plunge time. If the brewing apparatus is fully automatic, then the plunger will automatically plunge (block 214) after the steep time elapses (block 212). Similar to the user-initiated plunger, with the fully automatic brewing apparatus, the brewing apparatus controls the press force and plunge time.

The steep time and plunge time can vary depending on the recipe. For example, the steep time can be less than or equal to about one minute, less than or equal to about 30 seconds, or less than or equal to about 15 seconds. In some embodiments, a steep step can be omitted. The plunge time can be time can be less than about 120 seconds, for example, between about 60 seconds and about 70 seconds. In certain recipes, the steeping step (block 212) and the plunging step (block 214) can be repeated. For example, the cartridge can steep for about 15 seconds and the plunger can deploy over a 30-second period. Thereafter, the cartridge can steep for another 15 seconds and the plunger can deploy again for a 30-second period.

After brewing the beverage, the fluid reservoir can be removed (block 216) and the cartridge can be removed (block 218).

In some embodiments, the brewing apparatus can be configured to adjust one or more brewing parameters depending on the type of cartridge and/or brewing recipe. The brewing parameters can include, but are not limited to, steep time, plunge rate, or a number of repetitions. The plunge rate can be modified, for example, by changing the amount of spring compression, adjusting the spring working length, adjusting a timing mechanism configured to control the plunge rate, or adjusting a damping system. The damping system can be adjusted by opening or closing a vent, or by adjusting the coffee grounds or similar brewing medium.

In certain aspects, the user can input a type of cartridge or beverage output. For example, the brewing apparatus can include an input feature, such as one or more buttons designating different types of cartridges or beverages, a dial for selecting a type of cartridge or a beverage, or an RFID reader for reading the cartridge.

In certain aspects, the cartridge holder can include a sensor for sensing the type of cartridge in the holder. For example, the sensor may be able to sense the size and/or weight of the cartridge. As another example, the sensor can be an RFID sensor.

FIG. 2 is only intended to illustrate a method of brewing a beverage and not to limit the scope of the disclosure. None of the steps are essential or crucial. Any of the steps can be omitted or rearranged or new steps can be added.

Spring-Loaded French Press

FIG. 3A illustrates a spring-loaded brewing apparatus 300. The brewing apparatus 300 can include a vessel 302, a fluid reservoir 304, a cartridge holder 306, a plunger 308, and a lid portion 316. The vessel 302, the fluid reservoir 304, and the cartridge holder 306 can removably connect to each other, such that the cartridge holder 306 is disposed between and axially aligned with the fluid reservoir 304 and the vessel 302. The plunger 308 can slidably connect to the lid portion 316. When the lid portion 316 engages the fluid reservoir 304, the plunger 308 can move through the fluid reservoir 304.

The vessel 302 can be configured to receive a brewed beverage, such as coffee, and can be used as a drinking cup. In certain aspects, the vessel 302 can be double-walled for insulation. The vessel 302 can include a generally cylindrical body having a first open end 301 and a second closed end 303. The first end 301 can receive or mate with the cartridge holder 306, and the second end 303 can be the base of brewing apparatus 300.

The cartridge holder 306 can receive a cartridge 326 and connect to the fluid reservoir 304. The cartridge holder 306 can include an outer region 305 and an inner region 307. The inner region 307 can define a central opening 309 for receiving at least a portion of the cartridge 326. An upper surface of the inner region 307 can be recessed from an upper surface of the outer region 305. The inner region 307 can support an outward extending lip portion 327 of the cartridge 326, while the sidewall portion 325 can extend through the central opening 309. In certain variants, the cartridge 326 can be positioned in an inverted configuration such that the lip portion 327 is closer to the second end 303 of the vessel than the sidewall portion 325.

When the cartridge holder 306 engages the vessel 302, the first end 301 of the vessel 302 can support the outer region 305 of the cartridge holder. The cartridge holder 306 can simply rest on the vessel 302, or the cartridge holder 306 can include one or more features to engage the vessel 302. For example, the cartridge holder 306 can engage the vessel 302 using an interference fit, a screw mechanism, a snap fit, a bayonet, a detent, a latch mechanism, a magnet, or otherwise. In certain aspects, the cartridge holder 306 can include a downward extending lip 311 (e.g., toward the base of the brewing apparatus 300) that extends at least partially into the vessel 302. As shown in FIG. 3C, the lip 311 can be tapered inward and configured to mate with a tapered first end 301 of the vessel 302. In certain variants, the vessel 302 can include an upward extending lip (not shown) configured to be received by the cartridge holder 306.

The fluid reservoir 304 can include an open first end 313 and an open second end 315. The second end 315 can include downward extending flange portion 324 (i.e., toward the base of the brewing apparatus 300). When the fluid reservoir 304 engages the cartridge holder 306, the inner region 307 of the cartridge holder 306 can support the flange portion 324 of the fluid reservoir 304. The fluid reservoir 304 can include one or more features to engage the cartridge holder 306. For example, the fluid reservoir 304 can engage the cartridge holder 306 using an interference fit, a screw mechanism, a snap fit, a bayonet, a detent, a latch mechanism, a magnet, or otherwise. In certain variants, the cartridge holder 306 can include an upward extending flange portion (not shown) configured to be received by the fluid reservoir 304.

The fluid reservoir 304 can include an outer diameter that is substantially the same as an outer diameter of the cartridge holder 306 and/or vessel 302. An outer diameter of the flange portion 324 can be less than the outer diameter of the cartridge holder 306, and, in some examples, the outer diameter of the flange portion 324 can be less than an inner diameter of the outer region 305. The outer diameter of the flange portion 324 can be at least as great as an outer diameter of the lip portion 327 of the cartridge 326. An inner diameter of the flange portion 324 can be less than the outer diameter of the lip portion 327 of the cartridge 326.

As shown in FIG. 3B, the fluid reservoir 304 can secure the cartridge 326 to the cartridge holder 306. The lip portion 327 of the cartridge 326 can be sealed between the flange portion 324 of the fluid reservoir 304 and the inner region 307 of the cartridge holder 306. In certain aspects, as shown in FIG. 3C, the flange portion 324 of the fluid reservoir 304 can include a recessed portion 323 configured to receive the lip portion 327 of the cartridge 326 when the fluid reservoir 304 is secured to the cartridge holder 306. In certain aspects, the brewing apparatus can include a gasket 352 configured to facilitate a seal between the brewing apparatus 300 and the cartridge 326. When the cartridge 326 is loaded in the cartridge holder 306, the gasket 352 can be disposed between the fluid reservoir 304 and the cartridge 326, between the lip portion 327 of cartridge 326 and an upper surface the cartridge holder 306, between the sidewall 325 of the cartridge 326 and the cartridge holder 306, or between a bottom surface of the cartridge 326 and the cartridge holder 306.

In certain variants, the cartridge 326 can be secured between the cartridge holder 306 and the vessel 302. For example, the vessel 302 can define a recessed region configured to receive the lip portion 327 of the cartridge 326, and the cartridge holder 306 can include a downward facing projecting portion. When the cartridge holder 306 engages the vessel 302, the lip portion 327 of the cartridge 326 can be sealed between the recessed region of the vessel 302 and the projecting portion of the cartridge holder 306.

In certain variants, there is no cartridge holder 306, and the cartridge 326 can be secured between the vessel 302 and the fluid reservoir 304. For example, the vessel 302 can include an upward extending nest (not shown) configured to support the lip portion 327 of the cartridge 326. The nest can be configured such that the user can remove a used cartridge 326 by the lip portion 327. A gasket 352 can be disposed between the cartridge 326 and the fluid reservoir 304 or between the cartridge 326 and the vessel 302. The fluid reservoir 304 can simply rest on the vessel 302 or the fluid reservoir can engage the fluid reservoir 304 using any of the connection mechanisms described herein (e.g., interference fit, screw mechanism, snap fit, bayonet, detent, latch mechanism, magnet, or otherwise).

As described above, the total brew time can affect the quality of the output from the brewing apparatus 300. In certain aspects, the brewing apparatus 300 can include a timer 328 configured to alert the user when to actuate the plunger 308. The timer 328 can be an hourglass, a mechanical timer, a moisture indicator, temperature indicator, a pressure gauge, a thermo-electric powered timer, or a battery-powered electronic timer. The timer 328 can be initiated by a user action or by the presence of a fluid.

For example, as shown in FIG. 3C, the brewing apparatus 300 can include a timer 328 disposed on the fluid reservoir 304. The timer 328 can be a temperature indicator that changes color or otherwise visually signals the user that hot water has been present in the fluid reservoir 304 for a pre-determined period of time. The pre-determined period of time can be less than or equal to about one minute, less than or equal to about 30 seconds, or less than or equal to about 15 seconds. In certain variants, the indicator can signal the user to deploy the plunger when the temperature of the fluid in the fluid reservoir 304 reaches the desired brew temperature.

Figure 3D:
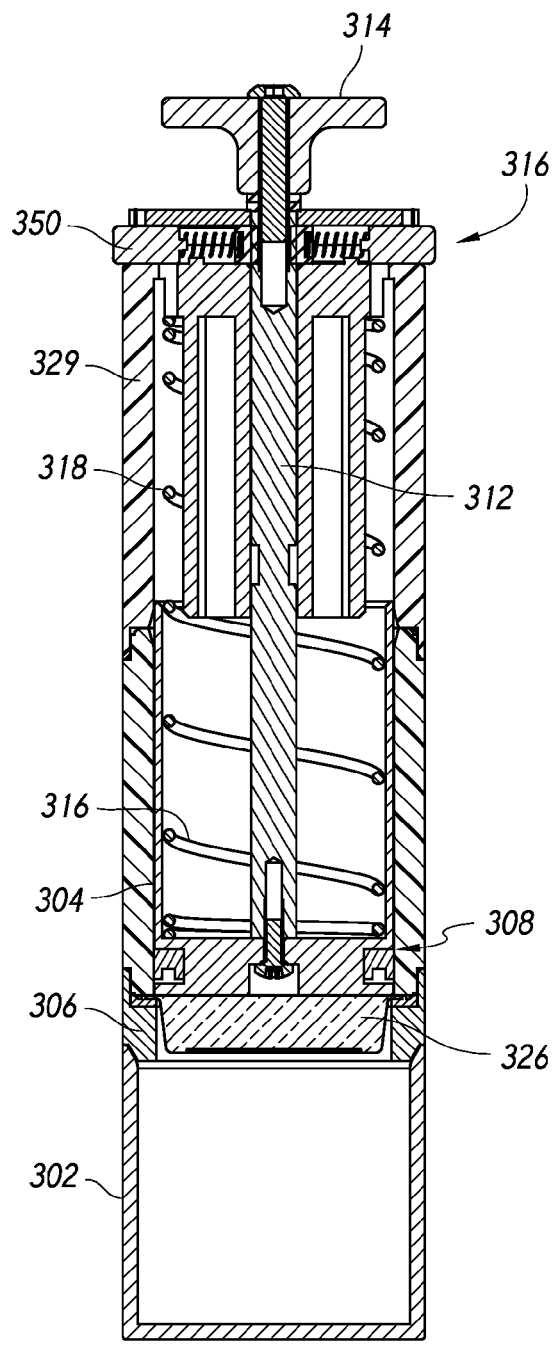
FIG. 3D illustrates a cross-section of yet another variant of the apparatus shown in FIG. 3A in a deployed configuration.
Figure 3E:
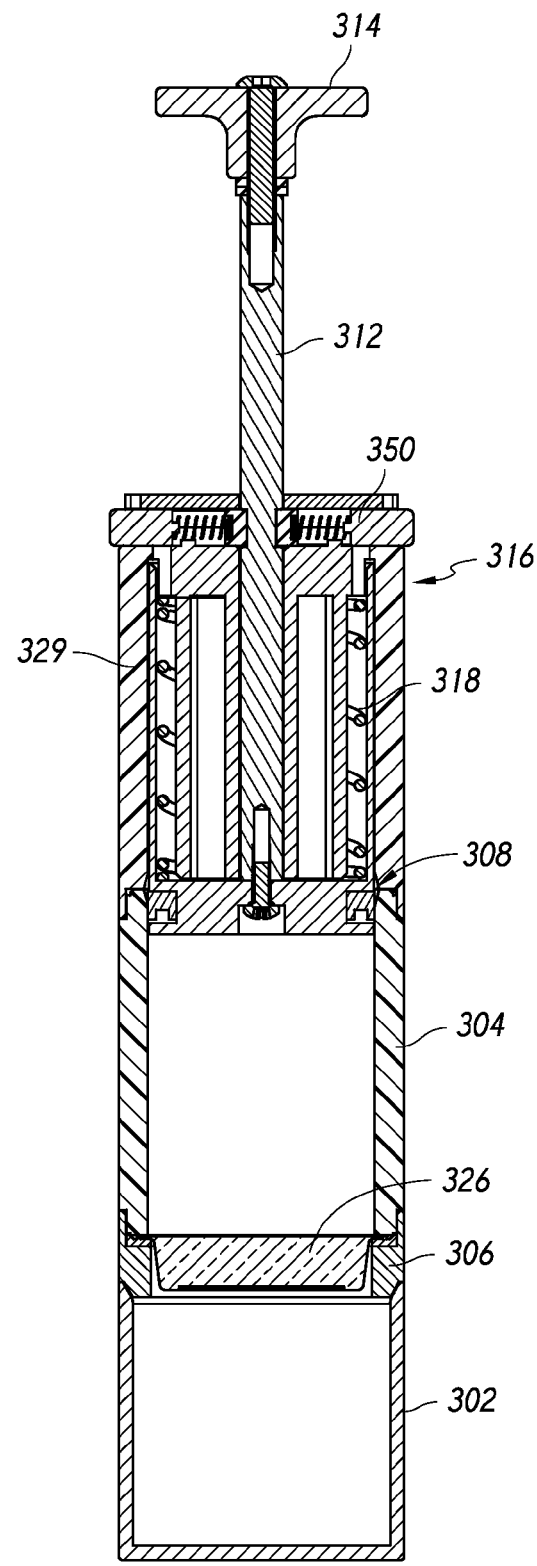
FIG. 3E illustrates a cross-section of the apparatus shown in FIG. 3D in a primed configuration.
Figure 3F:
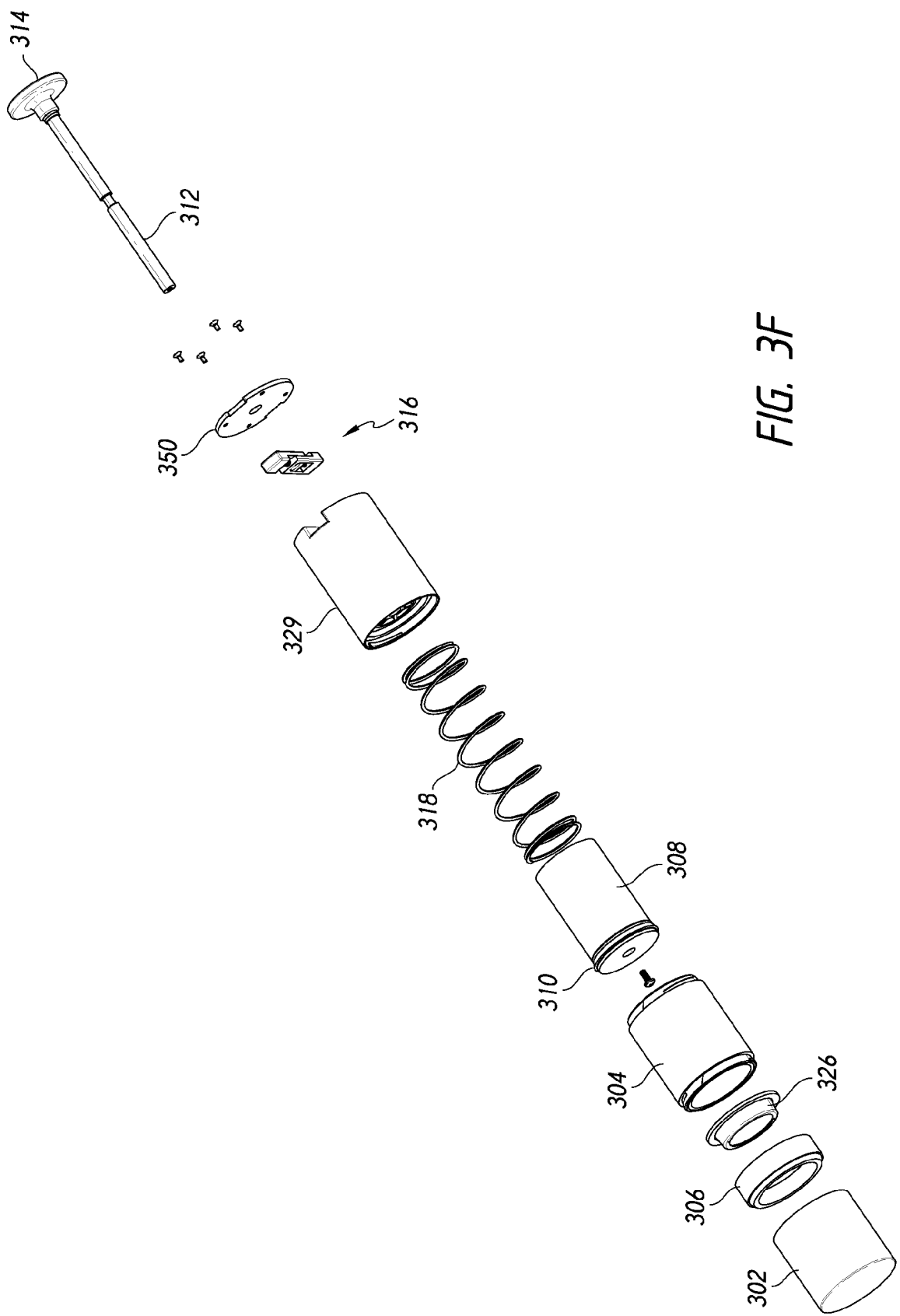
FIG. 3F illustrates an exploded view of the brewing apparatus shown in FIGS. 3D and 3E.
Figure 3G:
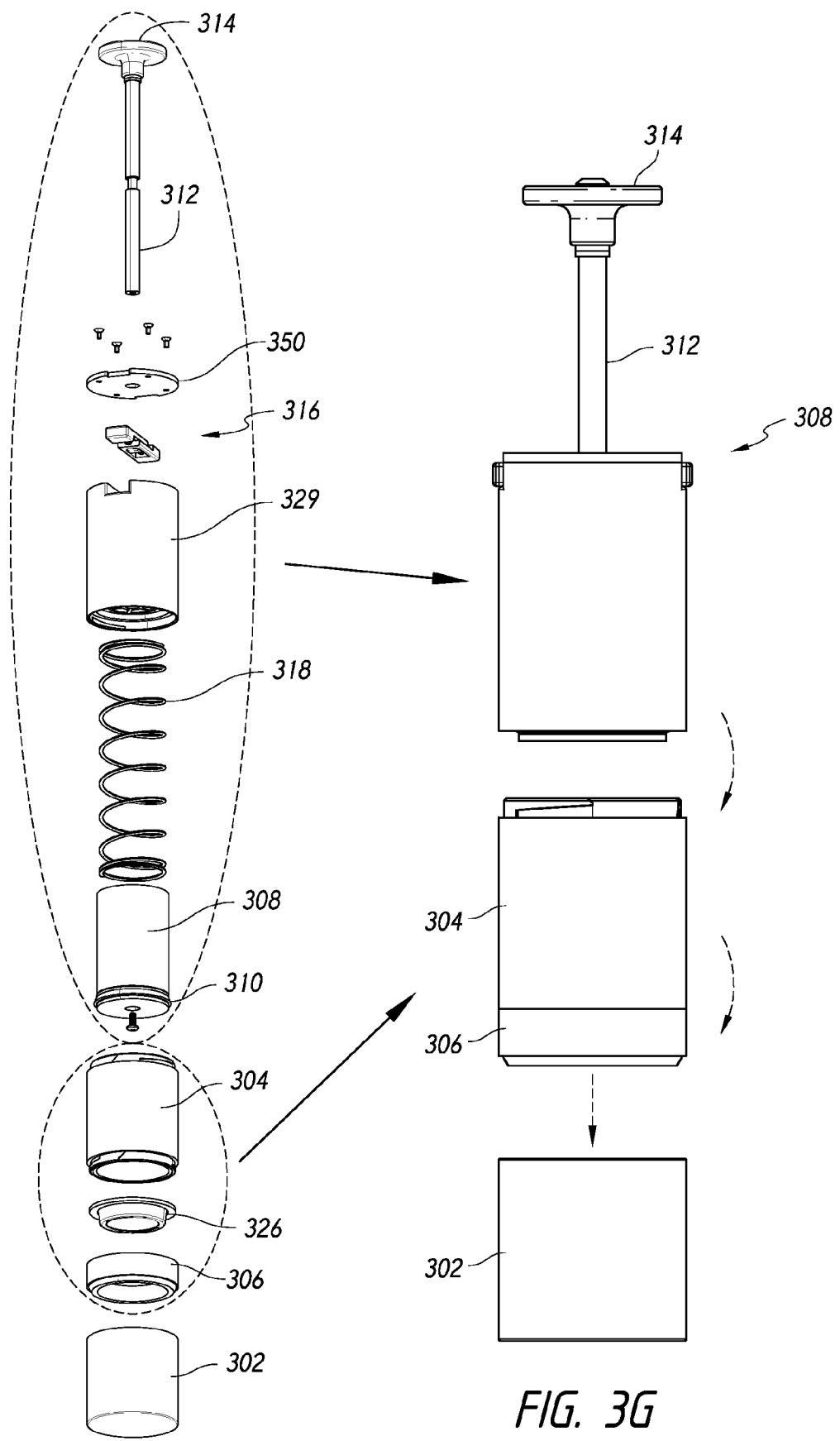
FIG. 3G illustrates a partial exploded view of the brewing apparatus shown in FIGS. 3D and 3E.
Figure 3L:
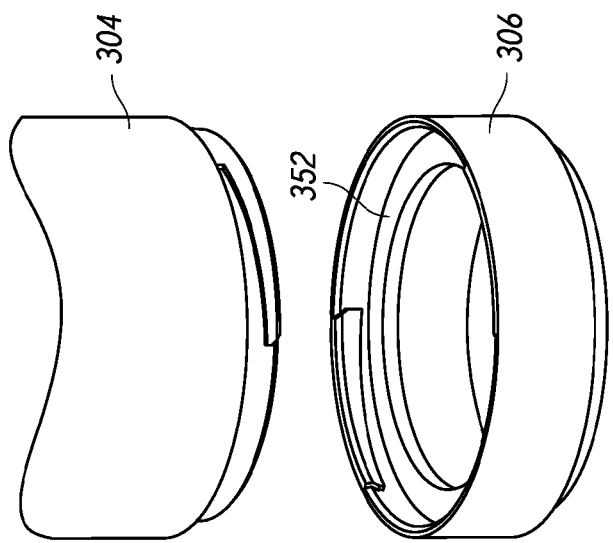
FIG. 3L illustrates an enlarged, exploded view of the lower portion of the brewing apparatus shown in FIGS. 3D and 3E.

The lid portion 316 can include a cover 350 configured to close the first end 313 of the fluid reservoir 304. In certain aspects, as shown in FIGS. 3D and 3E, the lid portion 316 can include a cap 329 configured to permit the use of a longer spring.

Figure 3K:
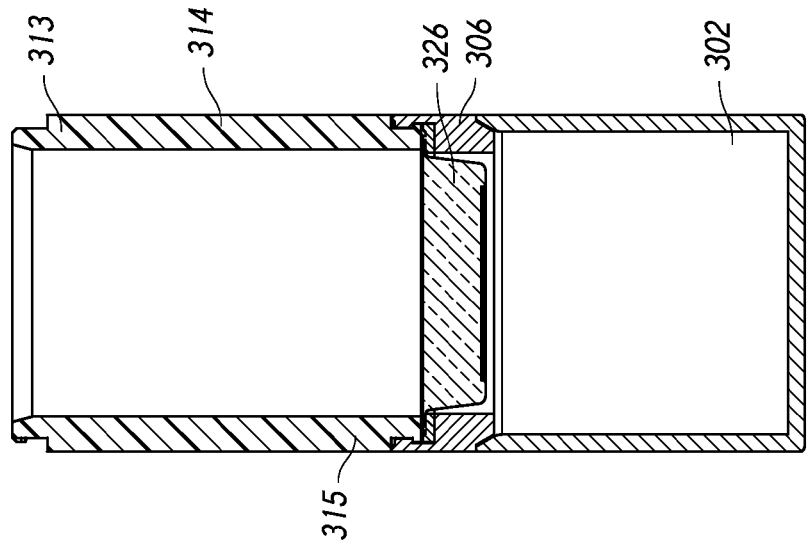
FIG. 3K illustrates an enlarged, cross-sectional view of the lower portion of the brewing apparatus shown in FIGS. 3D and 3E.
Figure 3J:
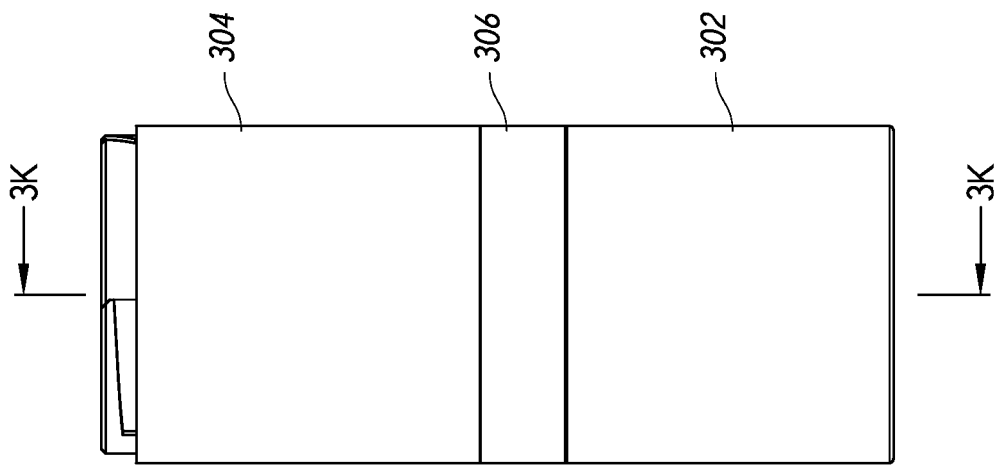
FIG. 3J illustrates an enlarged view of a lower portion of the brewing apparatus shown in FIGS. 3D and 3E.
Figure 3O:
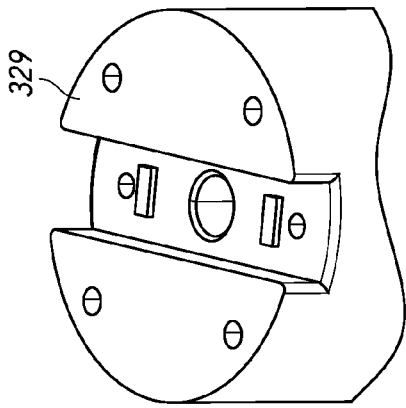
FIGS. 3M, 3N, 3O, and 3Q illustrate a trigger mechanism for releasing the plunger.

The lid portion 316 can connect to the fluid reservoir 304 using various connections, such as an interference fit, a screw mechanism, a snap fit, a bayonet, a detent, a latch mechanism, a magnet, or otherwise. In certain aspects, as shown in FIG. 3C, the brewing apparatus 300 can include a latch mechanism 330 configured to secure the lid portion 316 to the fluid reservoir 304. The latch mechanism 330 can include one or more pivoting arms 332. Each pivoting arm 334 can include a lower end 334 and an upper end 336 and can be pivotable around a pivot point 338. The lower end 334 of each pivoting arm 332 can include a projecting portion 340 capable of engaging the fluid reservoir 304 underneath a projecting rim portion 342 of the fluid reservoir 304. To secure the latch mechanism 330, the user can push the lower ends 334 of the pivoting arms 332 inward to engage the fluid reservoir 304. To release the latch mechanism 330, the user can push the upper ends 336 of the pivoting arms 332 inward to disengage the fluid reservoir 304. In certain aspects, as shown in FIG. 3K, the first end 313 of the fluid reservoir 304 can include a tapered edge to facilitate the connection between the fluid reservoir 304 and the lid portion 316.

The plunger 308 can include a base portion 310, a shaft 312, and a handle 314. The plunger 308 can slidably connect to the lid portion 316. For example, the lid portion 316 can define an opening 317 through which the shaft 312 extends. The base portion 310 and the handle 314 can each include a diameter that is greater than a diameter of the opening 317.

The plunger 308 can include one or more sealing members configured to form a seal between the base portion 310 and the fluid reservoir. The sealing members can help form a seal between the plunger 308 and the fluid reservoir 304 to prevent water from moving upward (i.e., toward the lid portion) past the base portion 310. As shown in FIG. 3B, the sealing member can be a sealing ring 320. As another example, as shown in FIG. 3C, the sealing member 354 can be secured to the lower surface 319 of the plunger 308. The sealing member 354 can be a rolling seal, a diaphragm seal, a cup seal, bellows, or likewise. The sealing member 354 can be configured to minimize the friction forces between the sealing portion 350 and the fluid reservoir 304 to less than or equal to about 4.5 J. Minimizing the seal friction can minimize the amount of work the user has to perform.

The base portion 310 can include a lower surface 319 and a sidewall portion 321 that define a cavity for housing a spring 318. The spring 318 can be a compression spring configured to move between a compressed configuration and an expanded configuration. The spring 318 can be coaxially disposed around the shaft 312 and positioned between the lid portion 316 and the lower surface 319 of the base portion 310. As shown in FIGS. 3H and 3I, the spring 318 can be secured to the base portion 310 of the plunger 308, for example, using a screw 331.

The spring 318 can be configured to move the plunger 308 through the fluid reservoir 304 and maintain a substantially constant, low flow rate through the cartridge 326. In certain aspects, the spring 318 can have an outer diameter that is less than an inner diameter of the fluid reservoir 304 but greater than a diameter of the plunger shaft 312. For example, the spring diameter can be less than or equal to about 60 mm, between about 30 mm and about 60 mm, between about 40 mm and about 50 mm, or between about 50 mm and about 60 mm. In certain aspects, the spring diameter can be about 42 mm. The spring 318 can include an uncompressed length of less than or equal to about 300 mm, less than or equal to about 250 mm, or less than or equal to about 215 mm. In certain aspects, the uncompressed length of the spring 318 can be between about 150 mm and about 250 mm, and the compressed length can be between about 40 mm and about 100 mm. In certain aspects, the user force required to move the spring-loaded plunger 308 a distance between about three inches and about four inches can be at least about 40 N and/or less than or equal to about 80 N. In certain aspects, the user force required to move the plunger between about 3.1 inches and about 3.6 inches is between about 30 N and about 70 N. In certain aspects, the user force required to move the plunger about 3.5 inches is about 50 N.

The lid portion 316 can include a locking mechanism 344 configured to maintain the position of the plunger 308 in a primed configuration. As shown in FIG. 3C, the lid portion 316 can include one or more grooves 346 configured to receive one or more projections 348 along the plunger shaft 312. As the plunger 308 moves upward, the spring 318 moves from the expanded configuration to the compressed configuration. To release the plunger 308, the user can twist the handle 314 in a clockwise or counter-clockwise direction. Releasing the plunger 308 causes the spring 318 to move back to the elongated configuration and move the plunger 308 downward through the fluid reservoir 304.

Figure 3N:
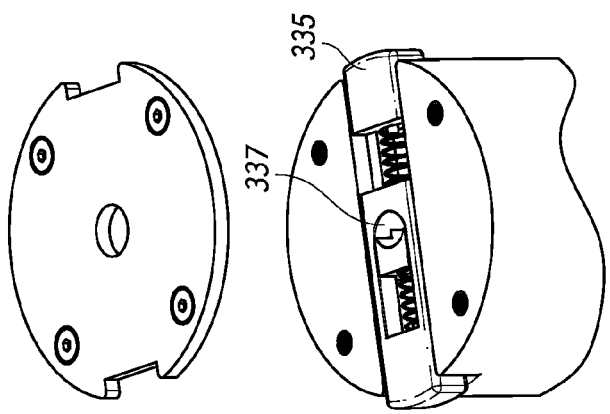
Figure 3Q:
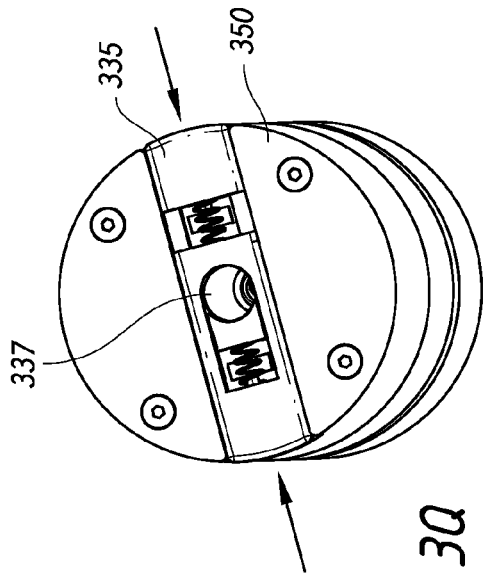
Figure 3M:
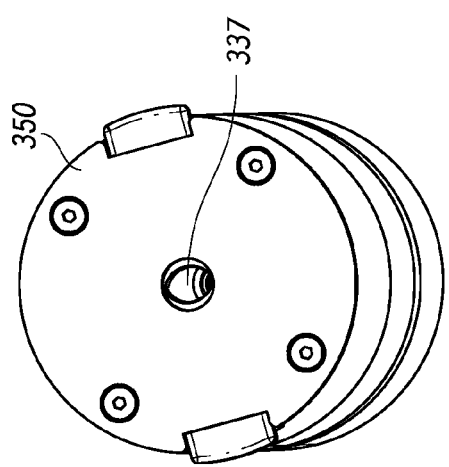
Figure 3P:
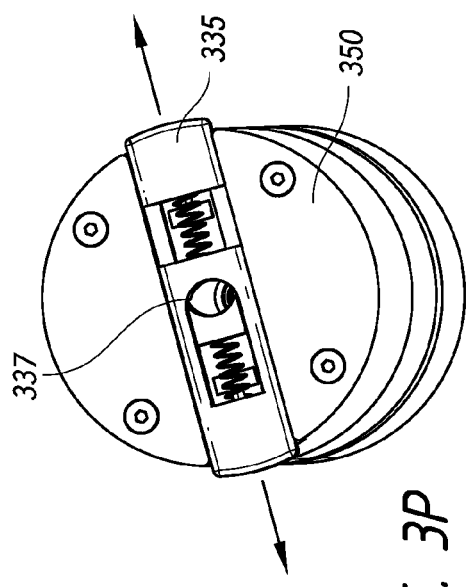
FIG. 3A illustrates an isometric view of a spring-loaded apparatus for brewing a beverage.
FIG. 3B illustrates a cross-section of the apparatus shown in FIG. 3A.
FIG. 3C illustrates a cross-section of a variant of the apparatus shown in FIG. 3A.
FIG. 3H illustrates an enlarged, cross-sectional view of an upper portion of the brewing apparatus shown in FIGS. 3D and 3E in a deployed configuration.
FIG. 3I illustrates an enlarged, cross-sectional view of the upper portion of the brewing apparatus shown in FIGS. 3D and 3E in a primed configuration.
FIG. 3R illustrates a method of using the brewing apparatus shown in FIG. 3A.
FIG. 3S illustrates cross-sectional views of a method of assembling the brewing apparatus shown in FIG. 3D.
FIG. 3T illustrates a method of using the brewing apparatus shown in FIG. 3D.

In certain variants, as shown in FIGS. 3H and 3I, the shaft 312 can include one or more grooves 333 to releasably engage one or more actuators 335 disposed on the lid portion 316. The actuators 335 can be spring-loaded buttons, switches, or likewise. For example, as shown in FIG. 3N, the actuators 335 can be two separate buttons capable of moving longitudinally relative to each other. The two actuators 335 can be secured to each other using one or more springs that bias the actuators 335 away from each other. As shown in FIG. 3P, when the actuators 335 are in their free configuration, the actuators 335 can define an opening 337 having a diameter that is less than the diameter of the plunger shaft 312. Once the plunger 308 is in the primed configuration, the opening 337 can engage the plunger grooves 333. To release the plunger 308, the user can push the actuators 335 inward, thereby increasing the size of the opening 337 to a diameter that is greater than or equal to the diameter of the shaft 312. Triggering the actuator 335 causes the plunger 308 to move to the deployed configuration.

As shown in FIGS. 3M-3Q, the cap 329 can include a recessed portion configured to receive the actuators 335. The actuators 335 can be secured to the lid 329 by securing the cover 350 to the cap 329.

FIG. 3R illustrates a method of using the brewing apparatus 300. After the cartridge 326 has been loaded into the cartridge holder 306, the cartridge 326 can be sealed between the fluid reservoir 304 and the cartridge holder 306 using any connection mechanism described herein (e.g., interference fit, screw mechanism, snap fit, bayonet, detent, latch mechanism, magnet, or otherwise). For example, as shown in FIG. 3C, the cartridge holder 306 can include bayonets 322 configured to secure a flange portion 324 of the fluid reservoir.

As shown in FIG. 3R, the cartridge holder 306 can rest on the vessel 302 or be secured using any connection mechanism described herein (e.g., interference fit, screw mechanism, snap fit, bayonet, detent, latch mechanism, magnet, or otherwise). In certain variants, the user can secure cartridge holder 306 to the vessel 302 prior to sealing the cartridge 326. Once the cartridge 326 has been sealed in place, the brewing apparatus 300 should be configured such that water from the fluid reservoir 304 can be forced through the cartridge 326 and into the vessel 302.

After securing the fluid reservoir 304, the cartridge holder 306, and the vessel 302, the plunger 308 can be primed by pulling the handle 314 upward to compress the spring 318. The user can pull the plunger 308 until the locking mechanism 344 secures the position of the plunger 308 relative to the lid portion 316. The step of priming the plunger 308 can take place prior to loading the cartridge 326, sealing the cartridge 326, and/or filling the fluid reservoir 304 with hot water.

After priming the plunger 308, the user can pour hot water into the fluid reservoir 304 and connect the lid portion 316 to the fluid reservoir 304. The steps of pouring hot water and priming the plunger 308 can be interchanged, but, for safety reasons, it can be preferable to prime the plunger 308 prior to filling the fluid reservoir 304 to prevent the user from inadvertently spilling hot water.

After filling the fluid reservoir 304 with hot water, the user can secure the lid portion 316 to the fluid reservoir 304. The lid portion 316 can be secured to the fluid reservoir 304 using any of the connection mechanisms described herein (e.g., interference fit, screw mechanism, snap fit, bayonet, detent, latch mechanism, magnet, or otherwise). For example, as shown in FIG. 3C, the lid portion 316 can include a latch mechanism 330. Pressing the arms 332 inward can force the projecting portions 340 to engage the projecting rim portion 342 of the fluid reservoir 304, such that the projecting rim portion 342 is secured between the projecting portions 340 and the cover 350.

After assembling the brewing apparatus 300, the cartridge 326 can steep for a pre-determined steep time. The brewing apparatus 300 can include a timer 328 configured to change colors after the cartridge 326 steeps for a period of time, for example, about fifteen seconds. Once the timer 328 changes color or otherwise indicates that the steep time has elapsed, the user can deploy the plunger 308 by twisting the handle 318 to release the locking mechanism 344. The spring 318 can be configured to maintain a substantially constant flow rate during the course of the plunge. In certain variants, the brewing apparatus 300 can automatically deploy the plunger 308 after a pre-determined period of time.

After the brewing process is complete, the fluid reservoir 304 can be removed. The lid portion 316 may still be secured to the fluid reservoir 304 when the fluid reservoir 304 disengages the cartridge holder 306. After the fluid reservoir 304 has been removed, the user can remove the vessel 302 and discard the cartridge 326.

Figure 3S:
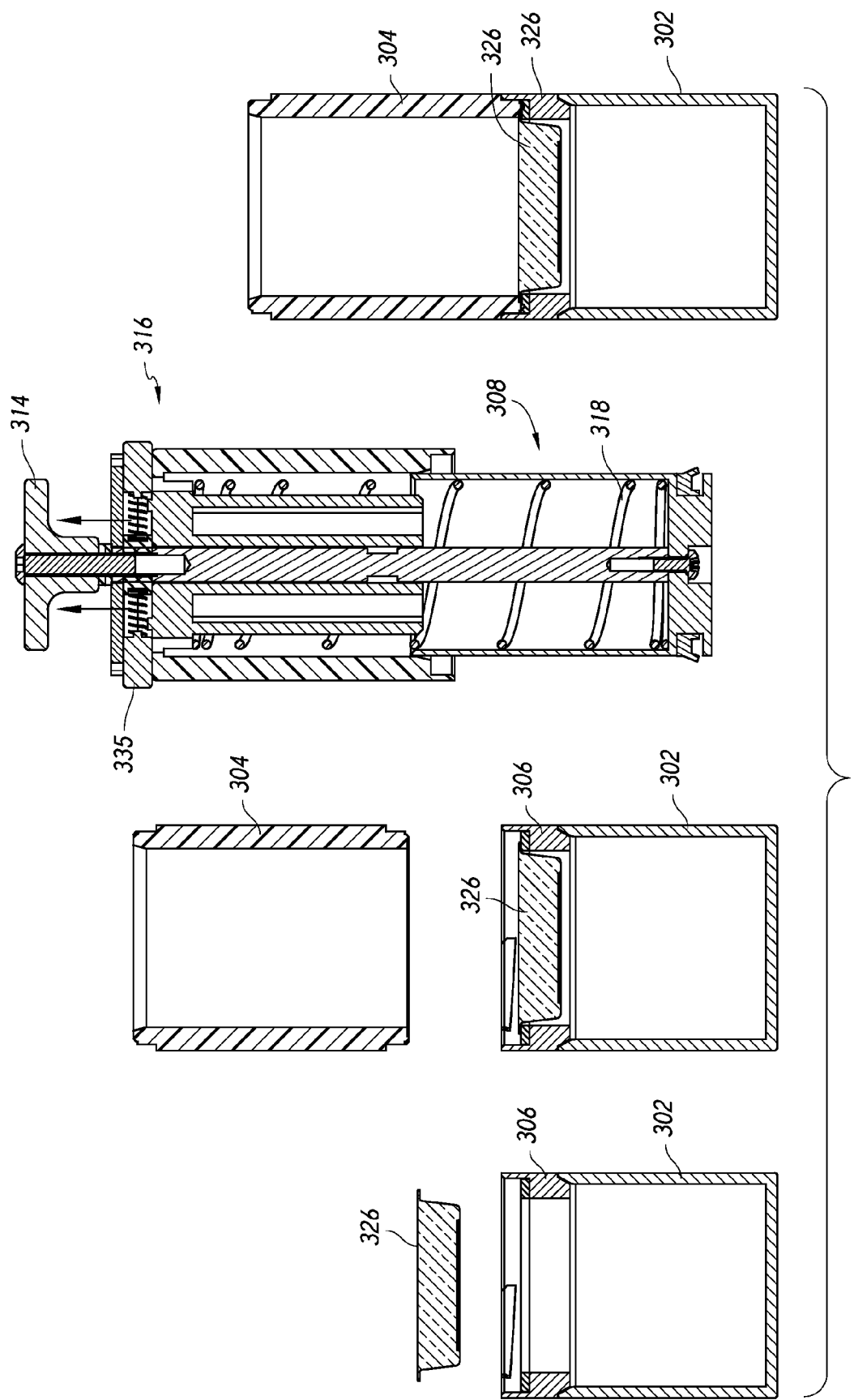
Figure 3T:
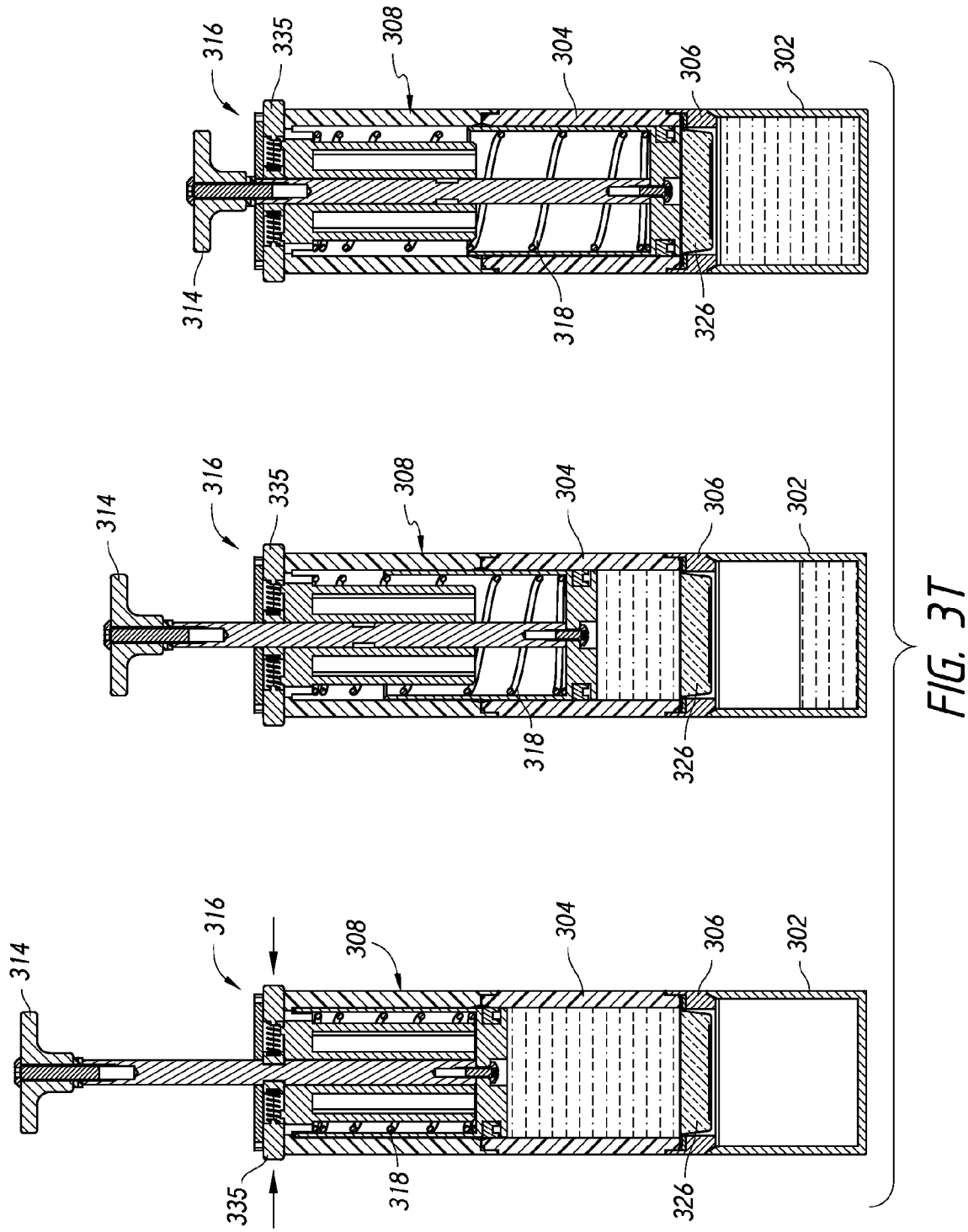

FIGS. 3S and 3T illustrate a method of using the brewing apparatus shown in FIGS. 3D and 3E. As shown in FIG. 3S, with the cartridge holder 306 resting on the vessel 302, the cartridge 326 can placed in the cartridge holder 306. Thereafter, the fluid reservoir 304 can engage the cartridge holder 326 using bayonets or another connection feature described herein. Before connecting the lid portion 316 to the fluid reservoir 304, the user can prime the plunger 308 by pulling the handle 314 upward and compressing the spring 318. The actuators 335 can lock the plunger 308 in the primed configuration. Thereafter, the user can add hot water to the fluid reservoir 304 and connect the lid portion 316 to the fluid reservoir 304 using bayonets or another connection feature described herein. Once the timer 328 indicates that the steep time has elapsed, the user can trigger the actuators 335 to release the plunger 308. The plunger 308 can be configured to force at least a majority or substantially all of the water in the fluid reservoir 304 through the cartridge 326 at a substantially constant rate. Once the brewing process is complete, the vessel 302 can be removed and the cartridge 326 discarded.

Figure 4B:
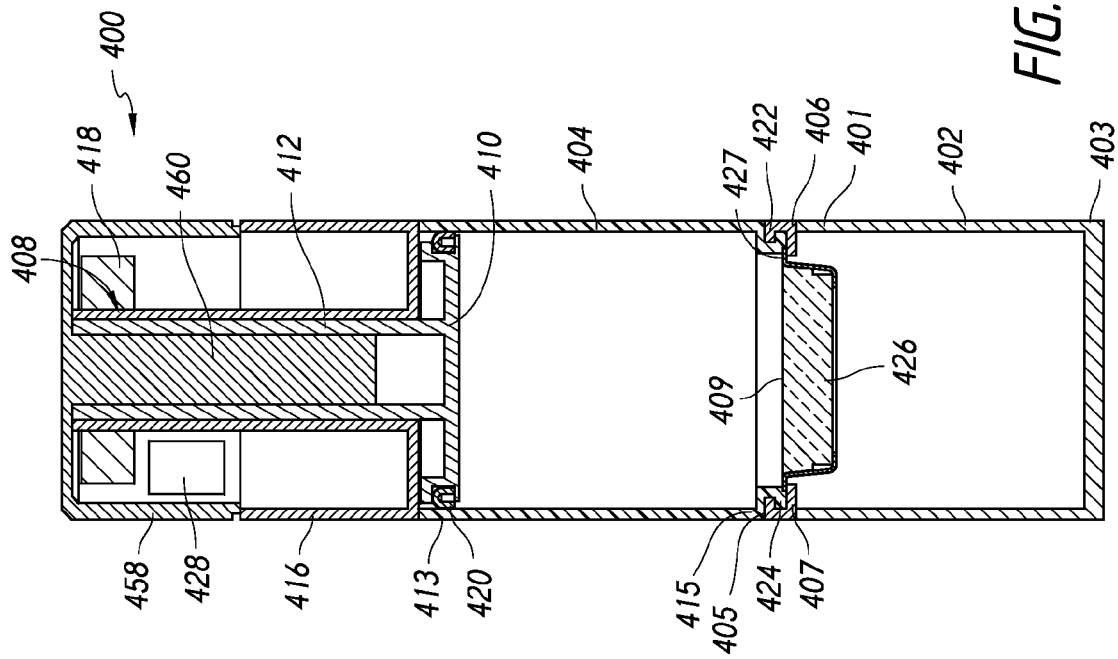
FIG. 4B illustrates a cross-section of the apparatus shown in FIG. 4A.
Figure 4A:
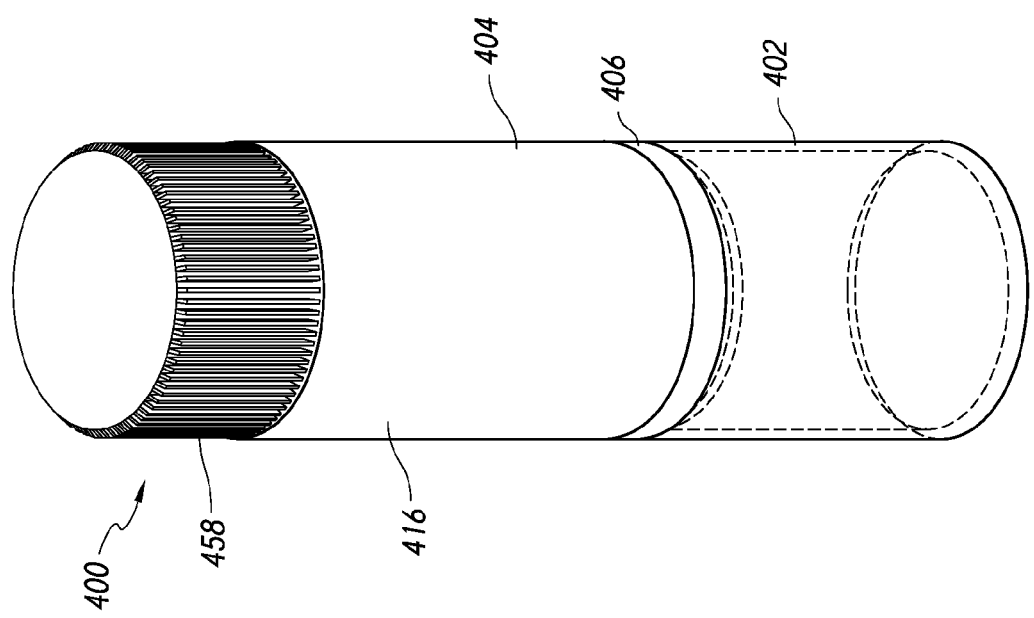
FIG. 4A illustrates an isometric view of yet another apparatus for brewing a beverage.

In certain variants, the brewing apparatus can include a torsion spring, such as the brewing apparatus 400 shown in FIG. 4A. The brewing apparatus 400 can include features similar to the brewing apparatus 300. Some of these corresponding components are identified with the same reference numbers, except that the features are in the 400s.

Similar to the brewing apparatus 300, the brewing apparatus 400 can include a fluid reservoir 404, a cartridge holder 406, a vessel 402, a plunger 408, and a lid portion 416. The vessel 402, fluid reservoir 404, and cartridge holder 406 can removably connect to each other using any of the connection features described in connection with the brewing apparatus 300 or its variants.

Depending on the configuration of the components, the brewing apparatus 400 can be configured to seal the cartridge 426 between the fluid reservoir 404 and the cartridge holder 406, between the cartridge holder 406 and the vessel 402, or directly between the fluid reservoir 404 and the vessel 402. The cartridge 426 can be sealed within the brewing apparatus 400 using any of the configurations described in connection with the brewing apparatus 300. For example, as shown in FIG. 4B, the cartridge 426 can be sealed between the fluid reservoir 404 and the cartridge holder 426.

Although not shown, the brewing apparatus can include a gasket configured to facilitate a seal between the brewing apparatus 400 and the cartridge 426. When the cartridge 426 is loaded in the cartridge holder 406, the gasket 452 can be disposed between the fluid reservoir 404 and the cartridge 426, between the lip portion 427 of cartridge 426 and an upper surface the cartridge holder 406, between the sidewall 425 of the cartridge 426 and the cartridge holder 406, or between a bottom surface of the cartridge 426 and the cartridge holder 406.

The plunger 408 can slidably connect to the lid portion 416. When the lid portion 416 engages the fluid reservoir 404, the plunger 408 can move through the fluid reservoir 404.

Figure 4D:
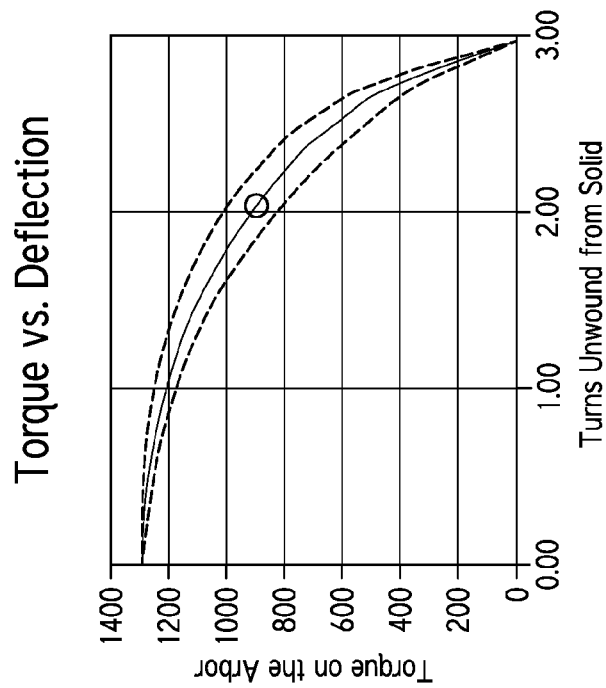
FIG. 4D is a graph illustrating a relationship between torque and deflection for a power spring used in the apparatus shown in FIG. 4A.
Figure 4C:
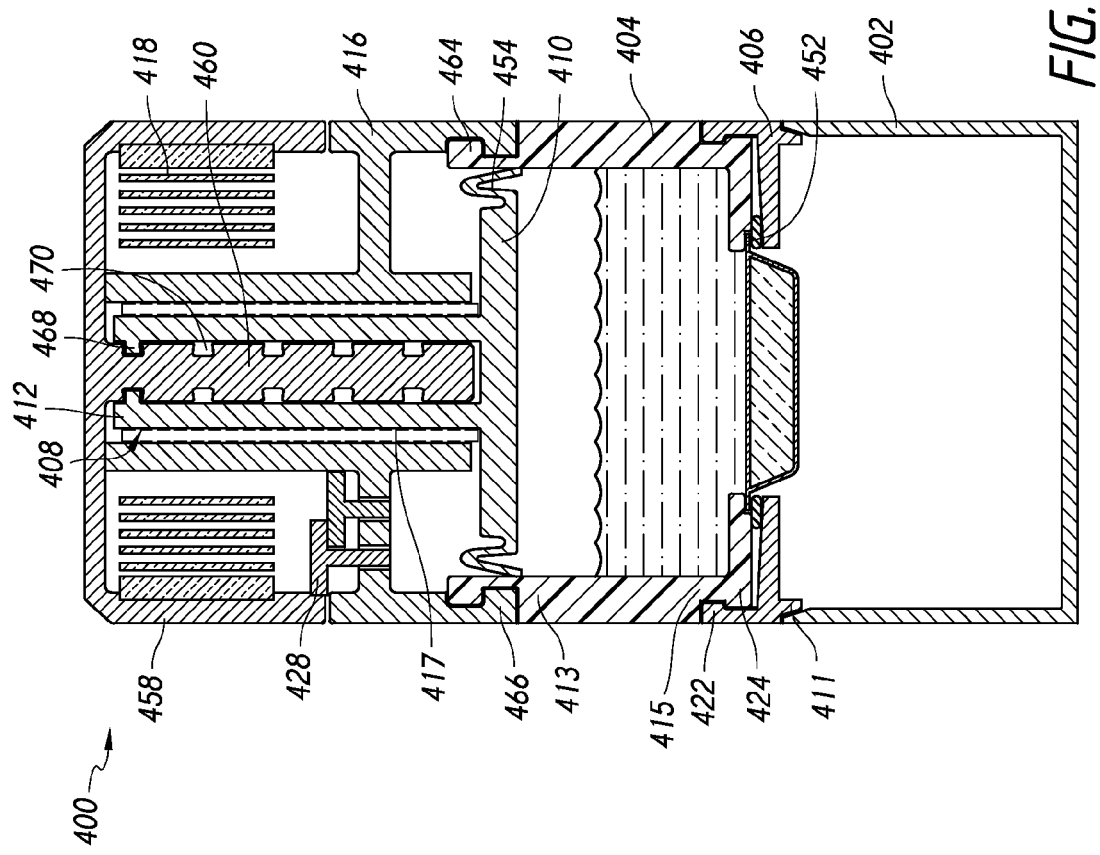
FIG. 4C illustrates a cross-section of a variant of the apparatus shown in FIG. 4A.

The lid portion 416 can connect to the fluid reservoir 404 using various connections, such as an interference fit, a screw mechanism, a snap fit, a bayonet, a detent, a latch mechanism, magnet, or otherwise. For example, as shown in FIG. 4C, the lid portion 416 can include bayonets 466 configured to engage corresponding features 464 positioned at the first end 413 of the fluid reservoir 404.

The plunger 408 can include a base portion 410 and a shaft 412. The plunger 408 can move vertically and/or rotationally relative to the lid portion 416. For example, the lid portion 416 can define an opening 417 through which the shaft 412 extends. The base portion 410 can include a diameter that is greater than a diameter of the opening 417.

The plunger 408 can include a sealing member configured to form a seal between the base portion 410 and the fluid reservoir 404. The sealing member can help form a seal between the plunger 408 and the fluid reservoir 404 to prevent water from moving upward (i.e., toward the lid portion) past the base portion 410. As shown in FIG. 4B, the plunger 408 can include a sealing ring 420. As another example, as shown in FIG. 4C, the plunger 408 can include a sealing member 454 secured to the base portion 410. The sealing member 454 can be a cup seal, a diaphragm seal, a rolling seal, bellows, or likewise. As described above, it can be desirable to minimize the friction forces between the sealing portion 450 and the fluid reservoir 404 to less than or equal to about 20 N. Minimizing the seal friction can minimize the amount of work the user has to perform.

The brewing apparatus 400 can include a spring 418 circumferentially disposed around the shaft 412. As shown in FIG. 4C, the spring 418 can be positioned near an upper portion of the plunger 408, for example, within an actuator 458. The spring 418 can be a power spring configured to move between a compressed configuration and an expanded configuration. The spring 418 can be configured to move the plunger 408 through the fluid reservoir 404 and maintain a substantially constant flow rate through the cartridge 426. In certain aspects, the spring 418 can have a diameter of at least about 60 mm and/or less than or equal to about 80 mm. In certain aspects, the spring 418 can have a diameter of about 70 mm. In certain aspects, the spring 418 can include a length of at least about 10 mm and/or less than or equal to about 20 mm. In certain aspects, the spring 418 can include a length of about 13 mm. In certain aspects, the torque required to turn the spring 418 up to four times can be between about 1 Nm and about 2 Nm, or less than or equal to about 1.4 Nm. In certain aspects, the torque required to turn the spring 418 one turn can be between about 1.2 Nm and about 1.4 Nm, for example, about 1.3 Nm. In certain aspects, the torque required to turn the spring 418 two turns can be between 0.8 Nm and about 1.4 Nm, between about 0.8 Nm and about 1.0 Nm, or about 0.9 Nm. FIG. 4D illustrates possible torque requirements for the power spring 418.

The lid portion 416 can include an actuator 458 configured to initiate the timer 428 and/or compress the spring 418. For example, as shown in the figures, the actuator 458 can be a dial; however, other actuators can be imagined, such as a button, switch, or lever. As shown in FIG. 4G, the lid portion 416 can also include a handle 459 to make it easier for the user to turn the actuator 458.

As shown in FIG. 4I, the brewing apparatus 400 can include a drive shaft 460. When the spring 418 moves between a compressed configuration and an expanded configuration, the spring 418 can act on a number of drive shaft pins 461 to spin the drive shaft 460. In turn, the drive shaft 460 can drive the plunger 408. The drive shaft 460 can define a helical cam path 470 configured to receive the inward protruding portion of the plunger pins 468.

The brewing apparatus 400 can include a cap 429. The cap 429 can include a number of linear guide paths configured to guide the outward extending portion of the plunger pins 468. The combination of the spring 418, drive shaft 460, cap portion 429, and plunger 408 can help convert rotary motion to vertical motion and move the plunger 408 between a deployed configuration and a primed configuration.

Figure 4E:
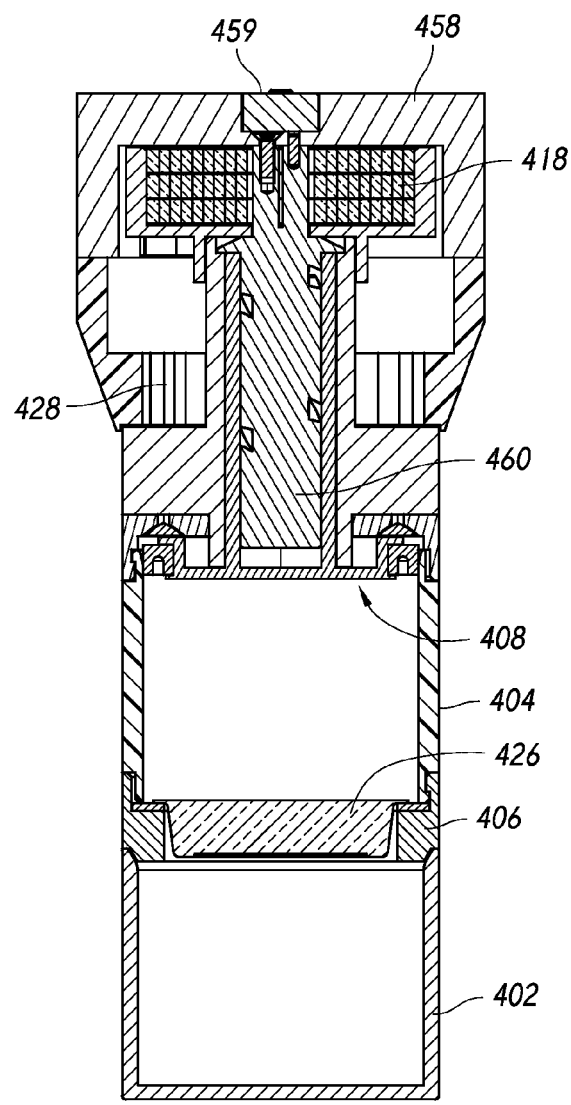
FIG. 4E illustrates a cross-section of yet another variant of the brewing apparatus shown in FIG. 4A in a primed configuration.
Figure 4F:
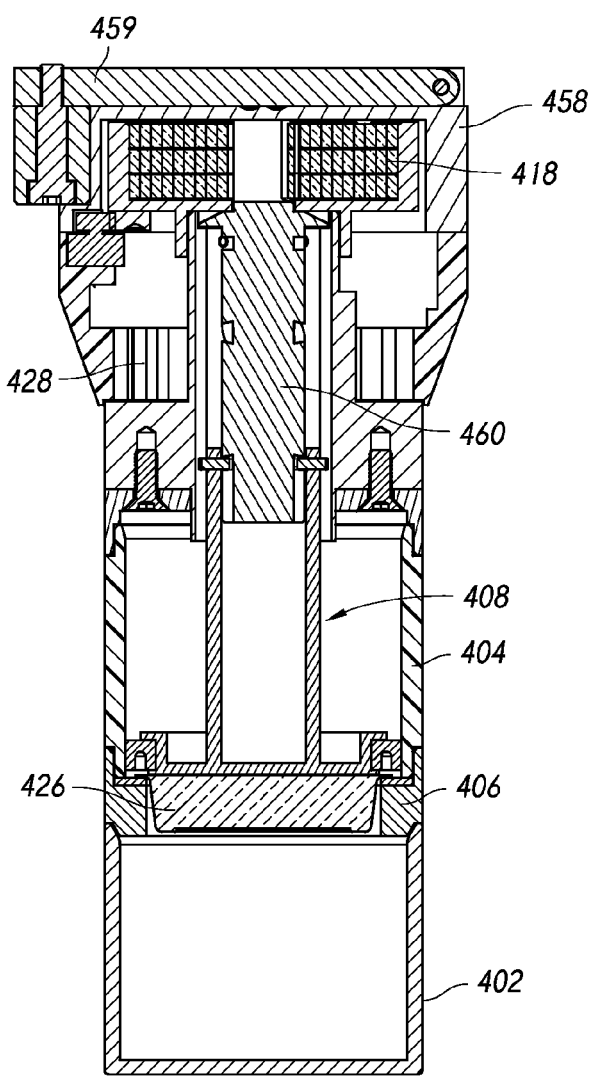
FIG. 4F illustrates a cross-section of the brewing apparatus shown in FIG. 4E in a deployed configuration.
Figure 4G:
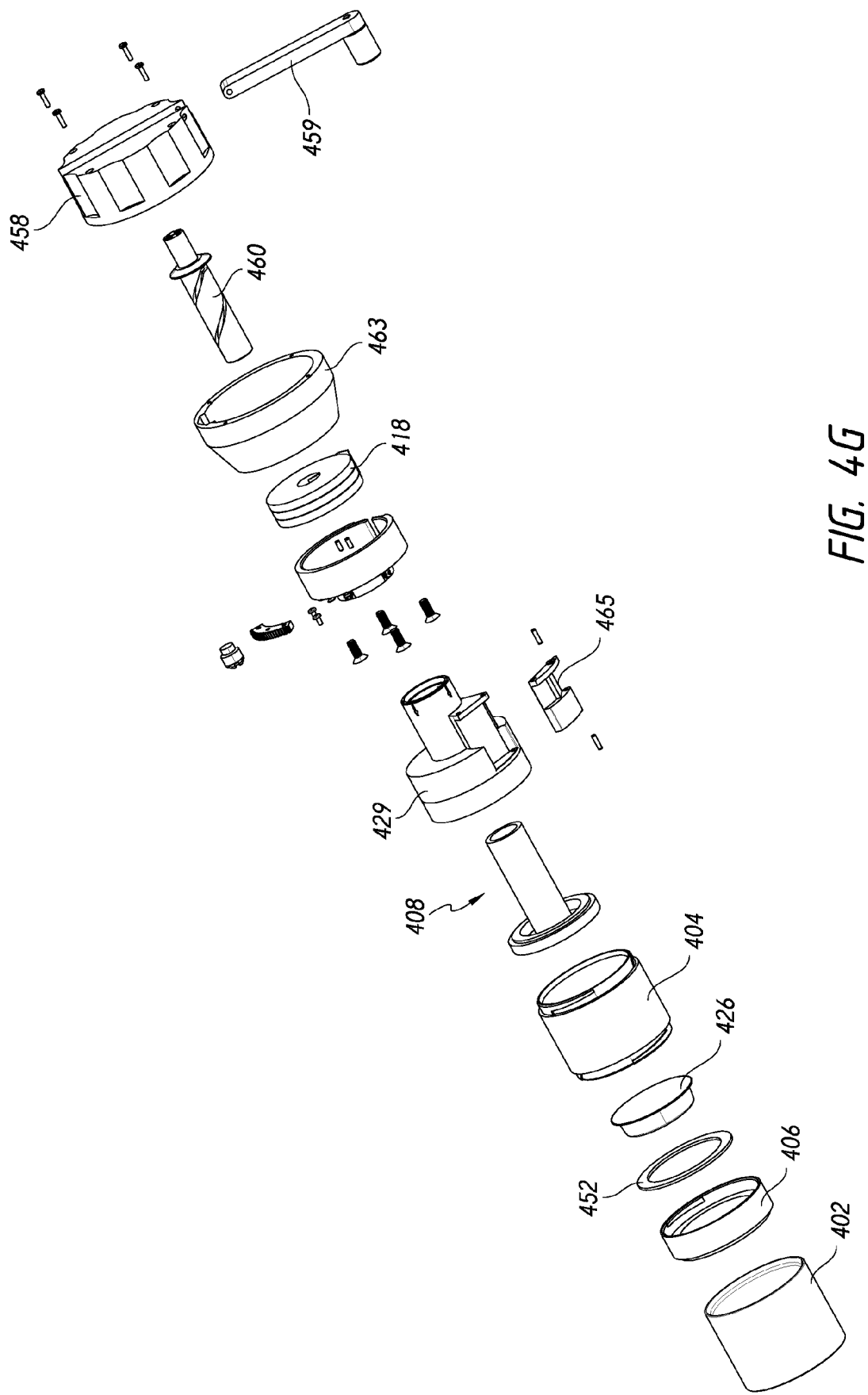
FIG. 4G illustrates an exploded view of the brewing apparatus shown in FIGS. 4E and 4F.
Figure 4H:
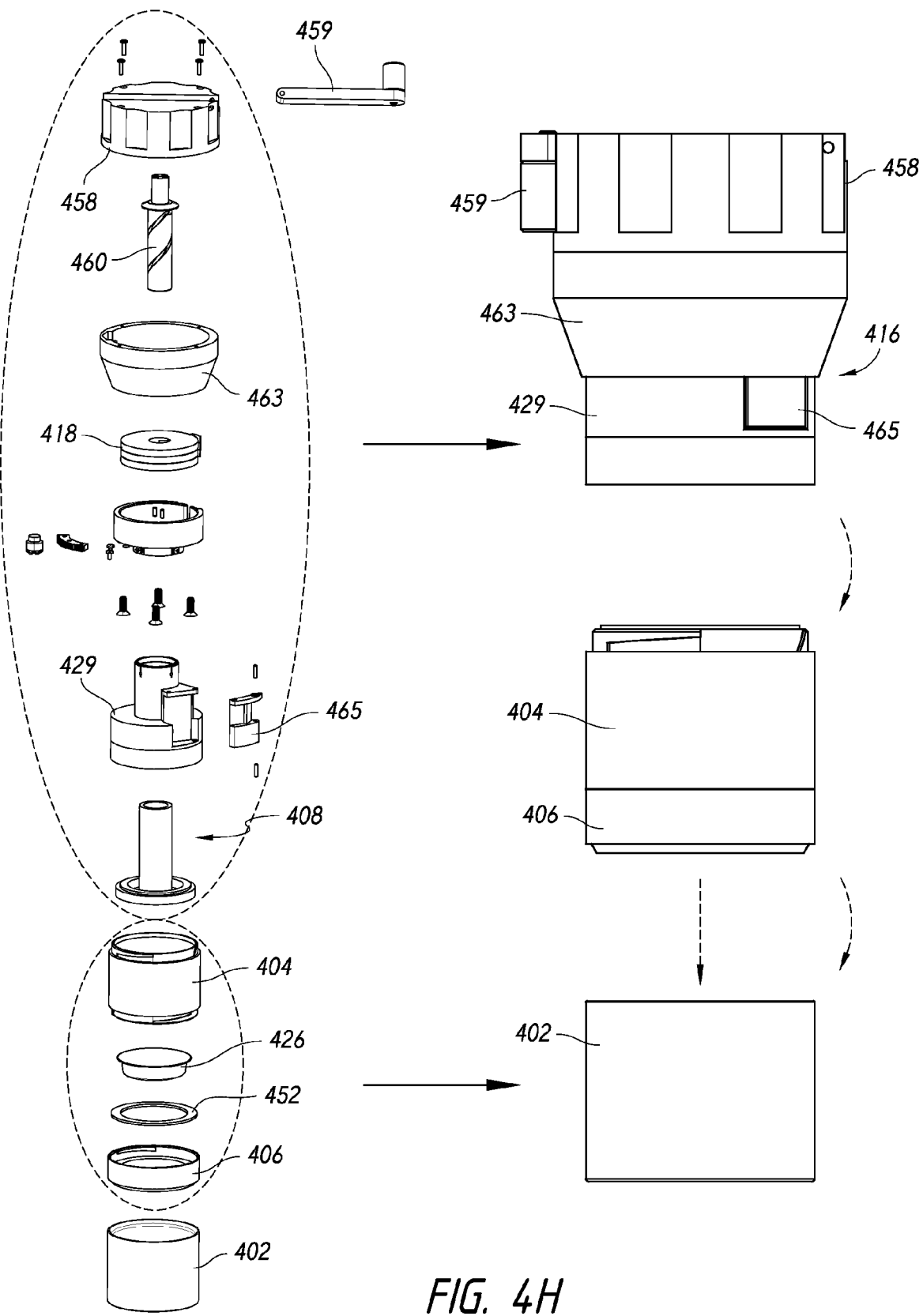
FIG. 4H illustrates a partial exploded view of the brewing apparatus shown in FIGS. 4E and 4F.
Figure 41:
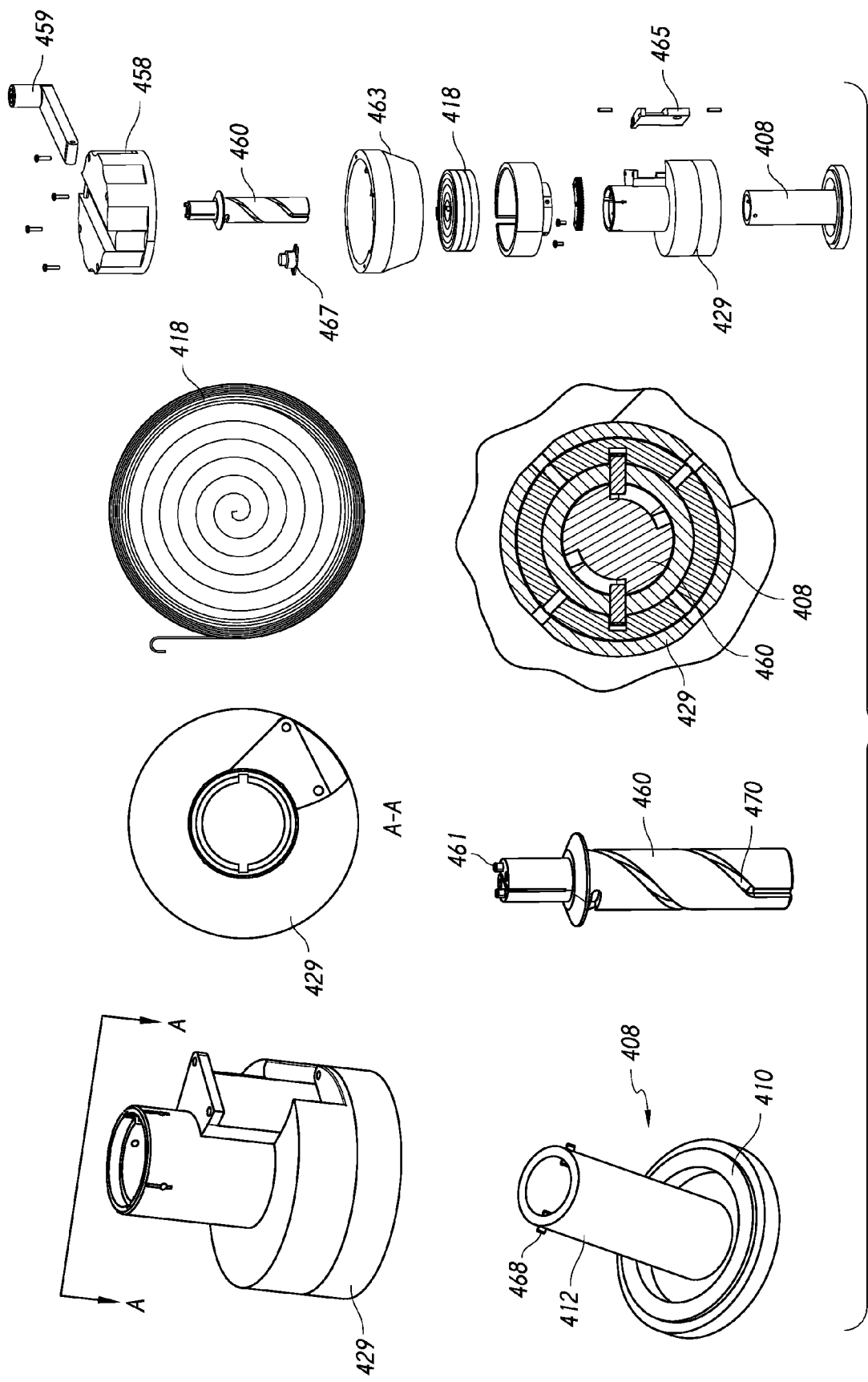
Figure 4J:
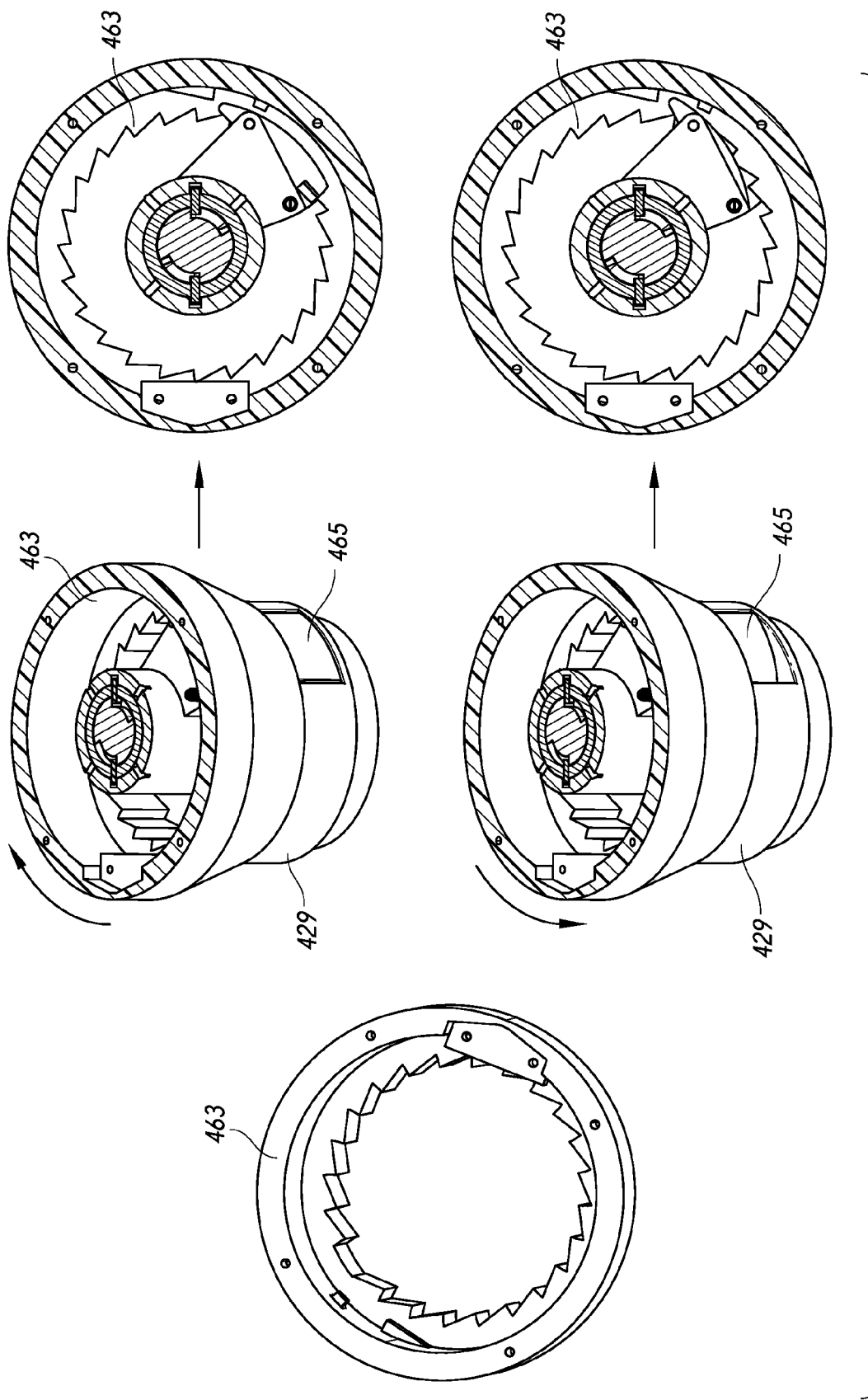
FIG. 4J illustrates a ratchet mechanism configured to control rotation of an actuator.
Figure 4L:
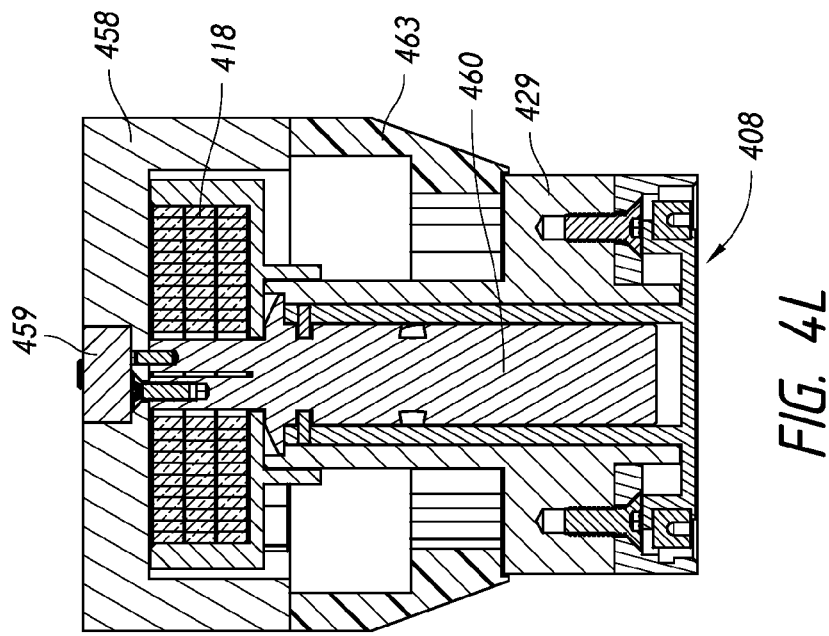
FIG. 4L illustrates an enlarged cross-section of the upper portion of the brewing apparatus shown in FIGS. 4E and 4F in a primed configuration.
Figure 4K:
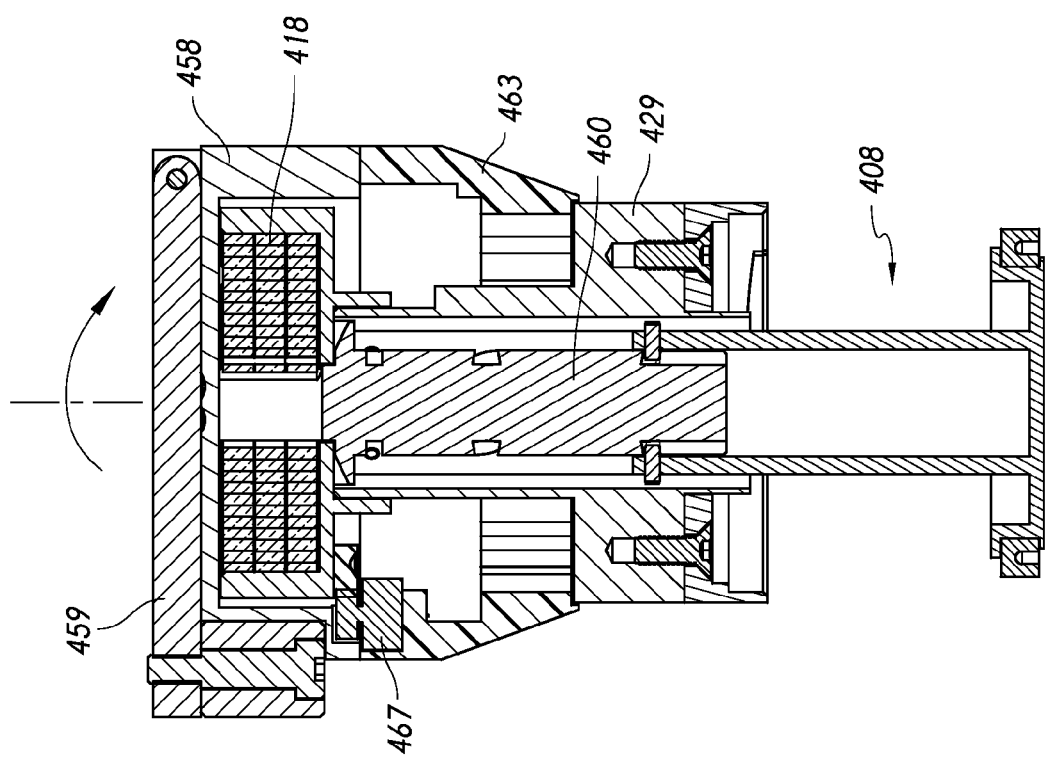
FIG. 4K illustrates an enlarged cross-section of an upper portion of the brewing apparatus shown in FIGS. 4E and 4F in a deployed configuration.
Figure 4N:
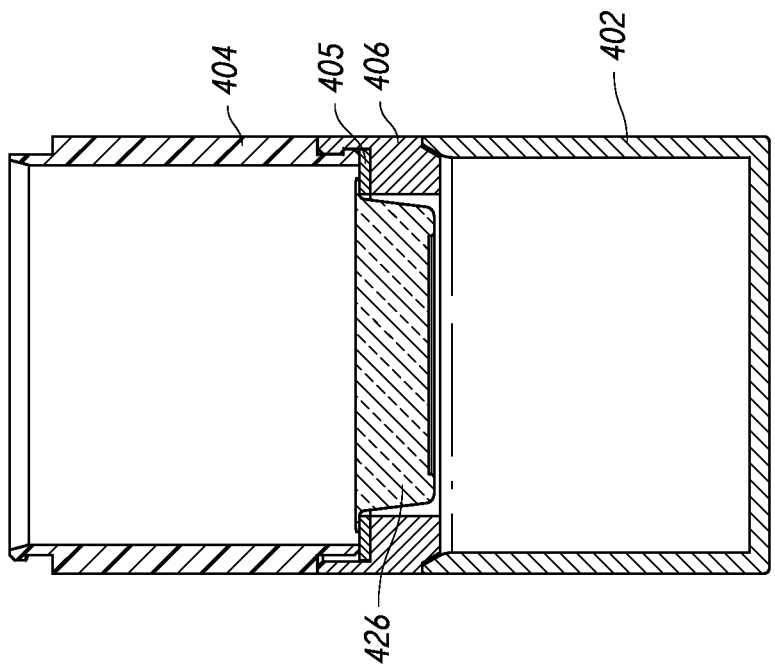
FIG. 4N illustrates an enlarged, cross-section of the lower portion of the brewing apparatus shown in FIGS. 4E and 4F.
Figure 4M:
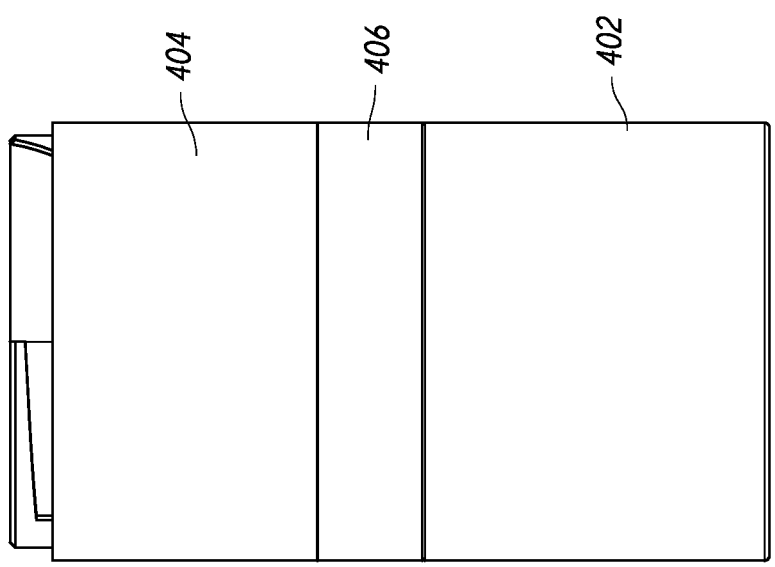
FIG. 4M illustrates an enlarged view of a lower portion of the brewing apparatus shown in FIGS. 4E and 4F.
Figure 40:
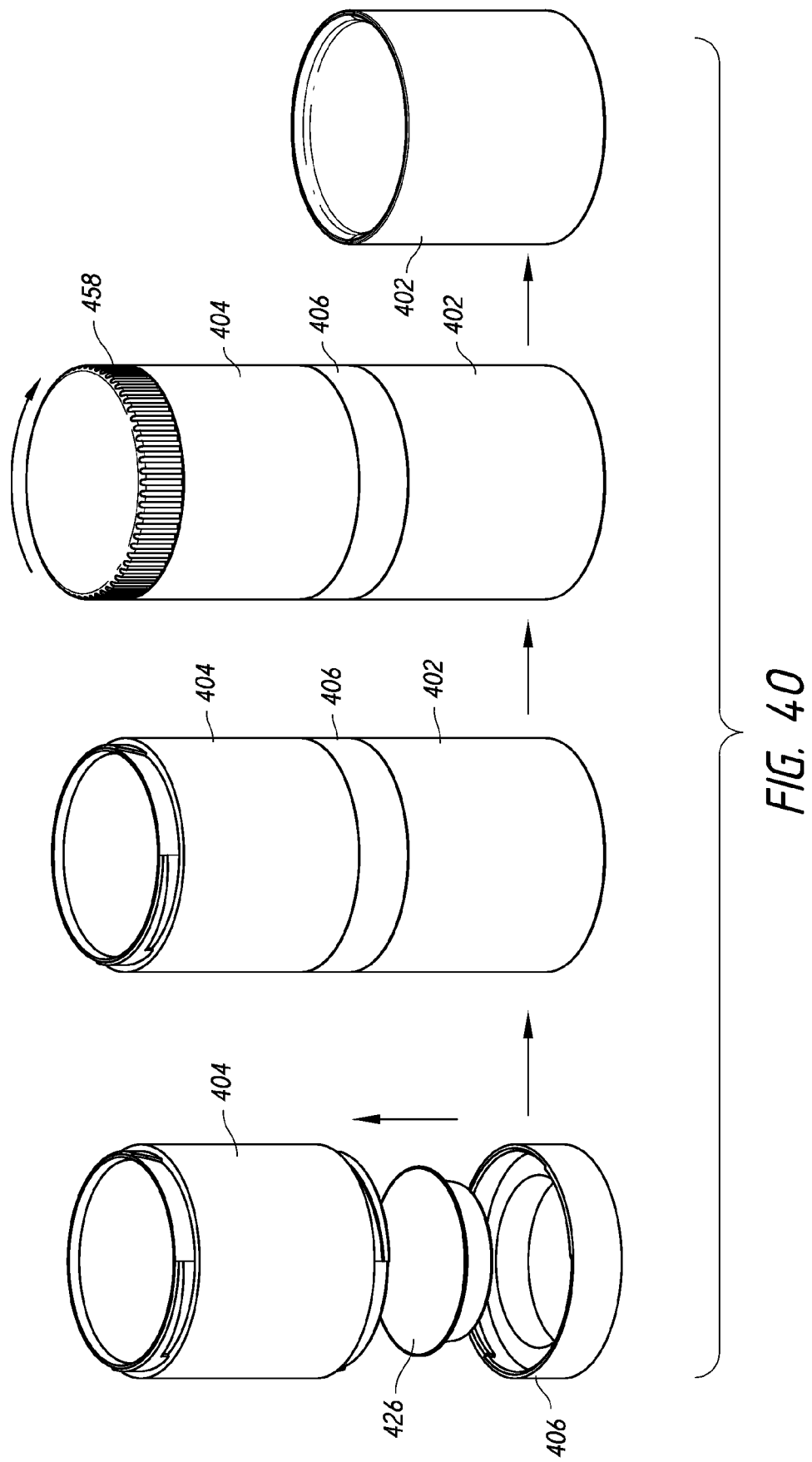

As shown in FIG. 4J, the brewing apparatus can include a ratchet 463 configured to control movement of the actuator 458. The ratchet 463 can permit the actuator 458 to move in a clockwise direction to prime the spring 418 and prevent counter-clockwise rotation. When the user is ready to brew, a pawl 465 can be pushed to disengage the ratchet 463 and permit counter-clockwise rotation of the actuator 458. The counter-clockwise rotation can release the spring 418 and drive the plunger 408. In certain aspects, shown in FIG. 4K, the brewing apparatus 400 can include a rotary damper 467 and/or other mechanism to control the rate at which the plunger 408 deploys.

As described above, the total brew time can affect the quality of the output from the brewing apparatus 400. Thus, it can be desirable to include a timer 428 configured to delay the deployment of the plunger 408 and/or control the speed at which the plunger moves by, for example, damping the release of the spring energy over the desired plunge period. The time can include, but is not limited to, an hourglass, a mechanical timer, a moisture indicator, temperature indicator, a pressure gauge, a thermo-electric powered timer, or a battery-powered electronic timer, or electric motor. For example, the brewing apparatus 400 can include a mechanical timer configured to automatically deploy the plunger 408 after the steep time has elapsed. As shown in FIG. 4C, the timer 428 can be a gear-based system secured to the lid portion 416. In certain aspects, the timer 428 can include a clockwork timer (e.g., pin-pallet escapement or Mudge's lever) to rotate the drive shaft 460 and drive the plunger 408 down the helical cam path 470.

Once the timer 428 indicates that the steep time has elapsed, the spring 418 can automatically expand. The expansion of the spring 418 can drive the plunger 408 down the cam path 470. The vertical motion causes the plunger 408 to move through the fluid reservoir 404 and force at least a majority or substantially all of the water from the fluid reservoir 404 through the cartridge 426. The spring 418 can be configured to maintain a substantially constant flow rate during the course of the plunge.

In certain variants, the timer 428 merely signals the user to release the plunger 408. For example, the brewing apparatus 400 can include a release button configured to move the plunger 408 from the primed configuration to the deployed configuration. Once primed, the release button can maintain the spring 418 in the primed configuration. After the steep time has elapsed, the user can depress the release button and release the plunger 408.

In certain aspects, the timer 428 can control the timing of the plunge by releasing the spring at a certain rate. For example, the timer 428 can include a ratchet mechanism.

FIG. 4O illustrates a method of using the brewing apparatus 400. Depending on the configuration of the cartridge holder 406, the cartridge 426 can be inserted into the holder 406 in either an upright or an inverted configuration. After inserting the cartridge 426 into the cartridge holder 406, the user can secure the fluid reservoir 404 to the cartridge holder 406, thereby sealing the cartridge 426 between the fluid reservoir 404 and the cartridge holder 406. The cartridge 426 can be sealed between the fluid reservoir 404 and the cartridge holder 406 using any connection mechanism described herein (e.g., interference fit, screw mechanism, snap fit, bayonet, detent, latch mechanism, magnet, or otherwise). In certain variants, as described above, the cartridge 426 can be sealed between the vessel 402 and the cartridge holder 406.

As shown in FIG. 4O, the cartridge holder 406 can rest on the vessel 402 or be secured to the vessel 402 using any connection mechanism described herein (e.g., interference fit, screw mechanism, snap fit, bayonet, detent, latch mechanism, magnet, or otherwise). In certain variants, the user can secure the cartridge holder 406 to the vessel 402 prior to sealing the cartridge 426 between the fluid reservoir 404 and the cartridge holder 406. Once the cartridge 426 has been sealed in place, the brewing apparatus 400 should be configured such that water from the fluid reservoir 404 can be forced through the cartridge 426 and into the vessel 402.

After securing the fluid reservoir 404, the cartridge holder 406, and the vessel 402, to each other, the user can pour hot water into the fluid reservoir 404. Thereafter, the plunger 408 can be primed by turning the actuator 458 to compress the spring 418. The actuator 458 can be turned less than or equal to about 360°, for example, 350°. In certain variants, the spring can be primed by pulling upward on a handle (not shown). Alternatively, the step of priming the plunger 408 can take place prior to loading the cartridge 426, sealing the cartridge 426, and/or filling the fluid reservoir 404 with hot water.

Setting the timer 428 will delay the plunge for a pre-determined steep time. For example, the brewing apparatus 400 can include a latch mechanism to hold the plunger 408 in a primed configuration. After the steep time elapses, the plunger 408 can move through the fluid reservoir 404 and force hot water through the cartridge 426 over the course of a pre-determined plunge time and at a substantially constant flow rate. As mentioned above, in certain aspects, the timer can control the rate at which the plunger 408 moves by, for example, damping the release of the spring energy over the desired plunge time. Once the brew process is complete, the vessel 402 can be removed and the cartridge 426 can be discarded.

Figure 4P:
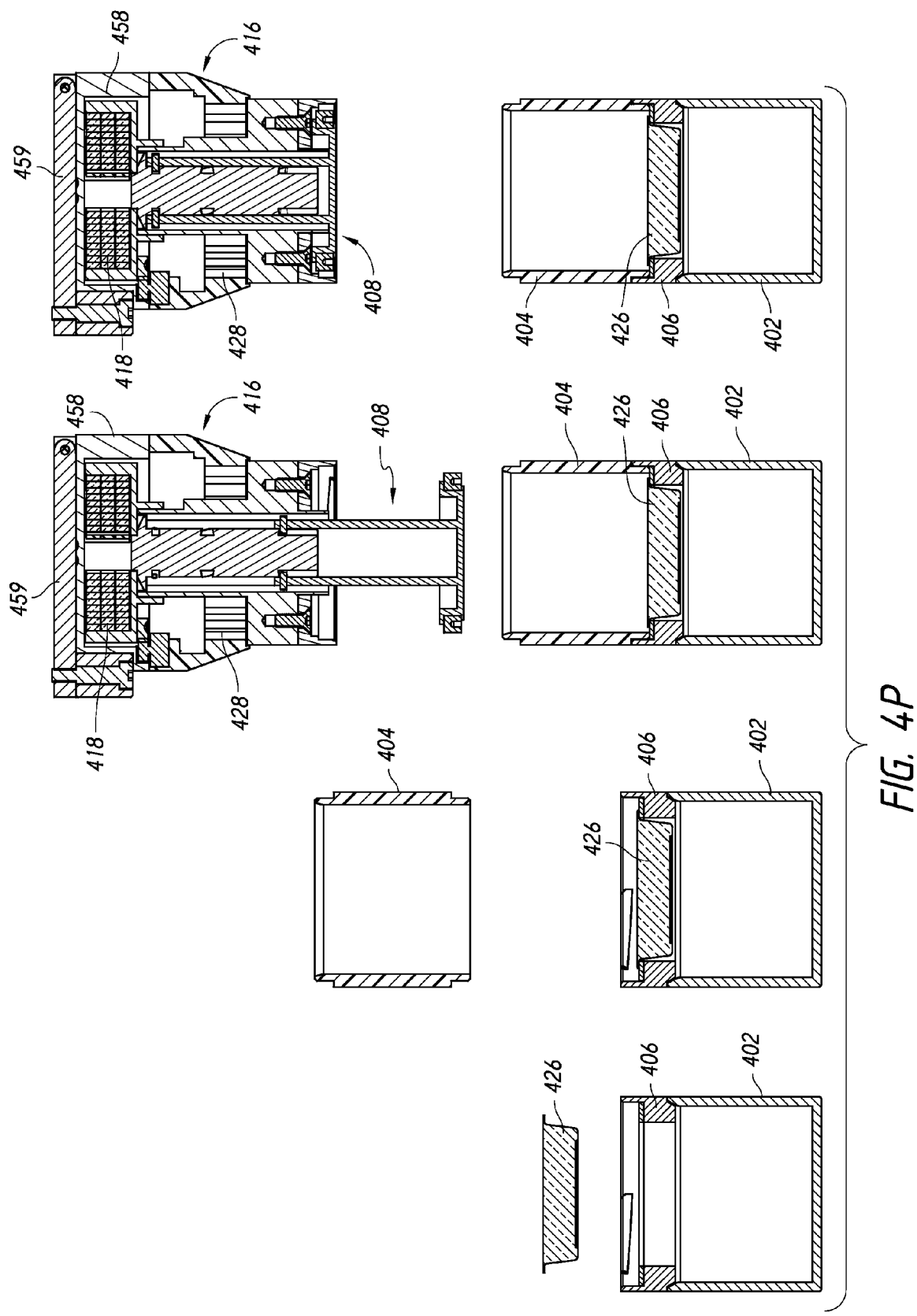
FIG. 4P illustrates cross-sectional views of a method of assembling the brewing apparatus shown in FIGS. 4E and 4F.
Figure 4Q:
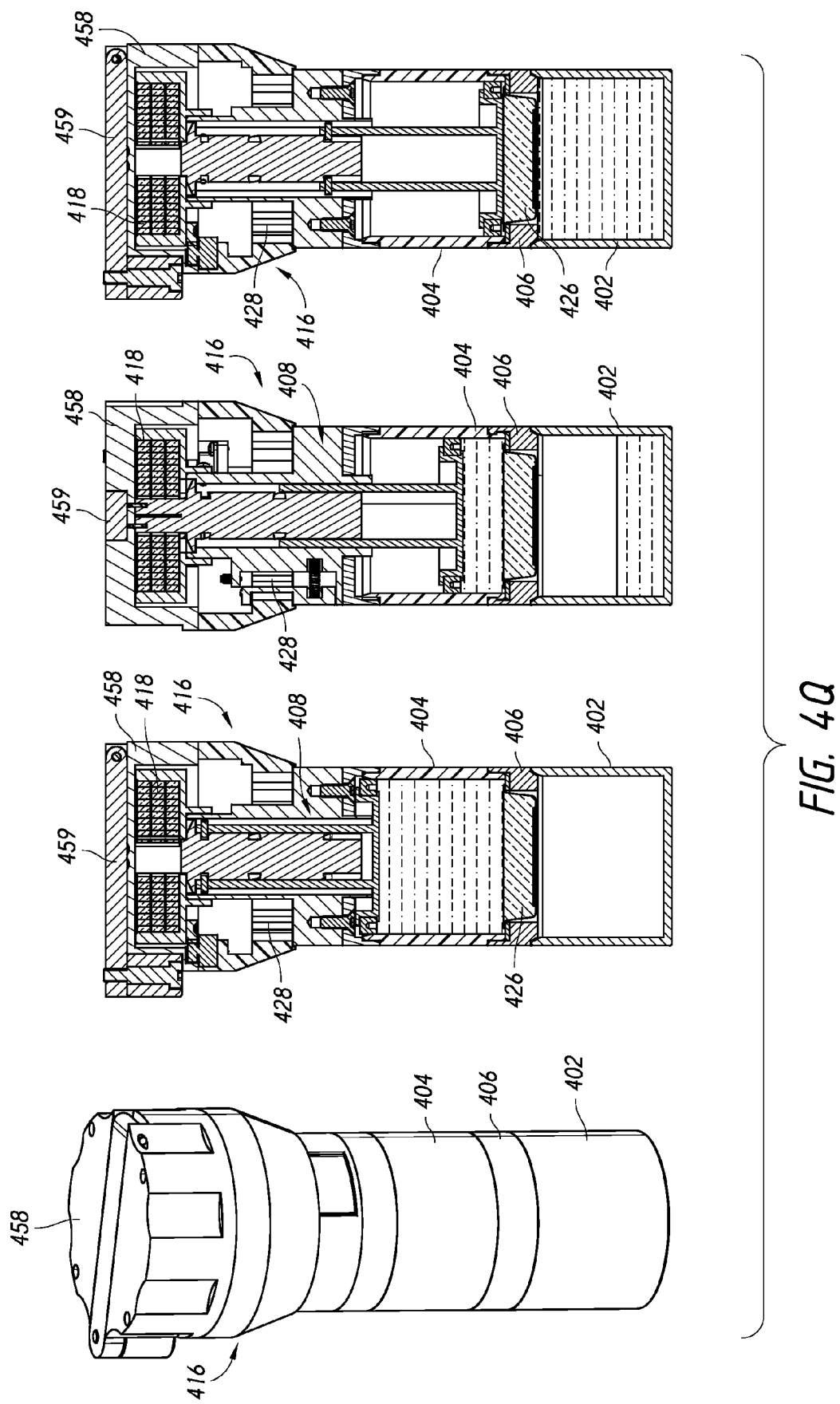
FIG. 4Q illustrates a method of using the brewing apparatus shown in FIGS. 4E and 4F.

FIGS. 4P and 4Q illustrate cross-sectional views of a method of using the brewing apparatus 400 shown in FIGS. 4E and 4F. With the cartridge holder 426 resting on the vessel 402, the user can position the cartridge 426 in the cartridge holder 406. Thereafter, the user can connect the fluid reservoir 404 to the cartridge holder 406 to seal the cartridge 426. In certain variants, the fluid reservoir 404 can be secured to the cartridge holder 406 prior to securing the cartridge holder 426 to the vessel 402.

With the lid portion 416 disengaged from the fluid reservoir 404, the actuator 458 can be turned to prime the spring 418. Thereafter, the user can add hot water to the fluid reservoir 404 and connect the lid portion 416 to the fluid reservoir 404, for example, using bayonets or any other connection feature described herein. The user can add hot water to the fluid reservoir 404 prior to priming the plunger 408, but, to prevent excessive steeping, it can be desirable to first prime the plunger 408.

After assembling the brewing apparatus 400, the pawl button 465 can be pushed to release the ratchet 463 to permit the release of the spring 418. As the spring 418 moves to the expanded configuration, the spring 418 can turn the drive shaft 460 and drive the plunger 408 through the fluid reservoir 404 until the plunger 408 forces at least a majority or substantially all of the water through the cartridge 426. Once the brewing process is complete, the vessel 402 can be removed and the cartridge 426 can be discarded.

FIGS. 5A-5B illustrate another spring-loaded brewing apparatus 500. The brewing apparatus can include features similar to the brewing apparatuses 300, 400. Some of these corresponding components are identified with the same reference numbers, except that the features are in the 500s.

As shown in FIGS. 5A-5B, the brewing apparatus can include a housing 556. The housing 556 can include an outward extending cartridge holder 506. The housing 556 can define a recessed portion 570 between the cartridge holder 506 and the base 578. The recessed portion 570 can be configured to receive the vessel 502. The cartridge holder 506 can rest on the vessel 502 or the cartridge holder 506 can include one or more features to removably engage the vessel 502 (e.g., an interference fit, a screw mechanism, a snap fit, a bayonet, a detent, a latch mechanism, a magnet, or otherwise). In certain variants, there is no base 578, and the vessel 502 sits on a table or other surface.

Depending on the configuration of the components, the brewing apparatus 500 can be configured to seal the cartridge 526 between the fluid reservoir 504 and the cartridge holder 506, between the cartridge holder 506 and the vessel 502, or directly between the fluid reservoir 504 and the vessel 502. The cartridge 526 can be sealed within the brewing apparatus 500 using any of the configurations described in connection with the brewing apparatus 300. For example, as shown in FIG. 5B, the brewing apparatus 500 can include a fluid reservoir 504 configured to seal a cartridge 526 between the fluid reservoir 504 and the cartridge holder 506 using any of the configurations described in connection with the brewing apparatus 300.

Although not shown, the brewing apparatus can include a gasket configured to facilitate a seal between the brewing apparatus 500 and the cartridge 526. When the cartridge 526 is loaded in the cartridge holder 506, the gasket can be disposed between the fluid reservoir 504 and the cartridge 526, between the lip portion 527 of cartridge 526 and an upper surface the cartridge holder 506, between the sidewall 525 of the cartridge 526 and the cartridge holder 506, or between a bottom surface of the cartridge 526 and the cartridge holder 506.

The fluid reservoir 504 can rotate at least partially into the housing 558, between a first configuration and a second configuration. When the fluid reservoir 504 is in the first configuration, the fluid reservoir 504 can engage the cartridge holder 506 using any of the connection mechanisms described herein (e.g., an interference fit, a screw mechanism, a snap fit, a bayonet, a detent, a latch mechanism, a magnet, or otherwise). When the fluid reservoir 504 is in the second configuration, the fluid reservoir 504 can be at least partially recessed within the housing 558.

The fluid reservoir 504 can include a first end 513 and a second end 515. The fluid reservoir 504 can include water fill port 574 near the first end 513 of the fluid reservoir 504 that is only accessible when the fluid reservoir 504 is in the first configuration. The second end 515 of the fluid reservoir 504 can be open to permit water to flow through to the cartridge 526. The fluid reservoir 504 can include an outward extending lip 576 to make it easier for the user to rotate the fluid reservoir 504.

The plunger 508 can move rotationally through the fluid reservoir 504 about a pivot point 562. A base portion 510 of the plunger 508 can include a sealing ring and/or other sealing feature (e.g., rolling seals, diaphragm seals, cup seal, or bellows) to prevent water from moving past the base portion.

A torsion spring 518 can drive the plunger 508. In certain aspects, the torsion spring 518 can include properties similar to the spring 418. The spring 518 can be configured to move the plunger 508 through the fluid reservoir 504 and maintain a substantially constant flow rate through the cartridge 526.

Although not shown, the brewing apparatus 500 can include a timer to signal the user when to plunge the plunger 508. The timer can be an hourglass, a mechanical timer, a moisture indicator, temperature indicator, a pressure gauge, a thermo-electric powered timer, or a battery-powered electronic timer. In certain variants, the brewing apparatus 500 can include a timer configured to automatically plunge the plunger 508 after a pre-determined steep time and/or control the release of the spring energy.

Figure 5C:
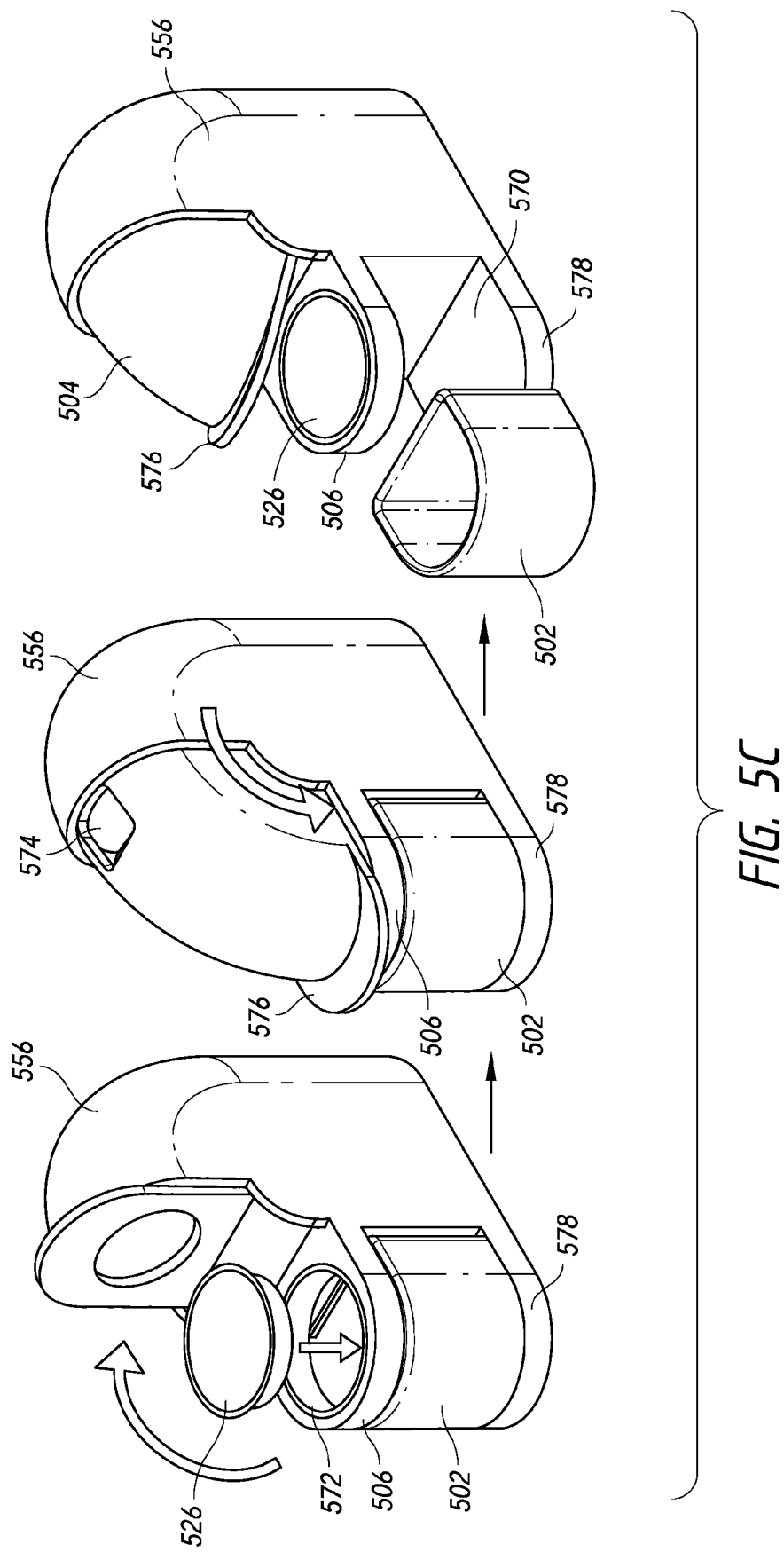
FIG. 5C illustrates a method of using the brewing apparatus shown in FIG. 5A.
Figure 5D:
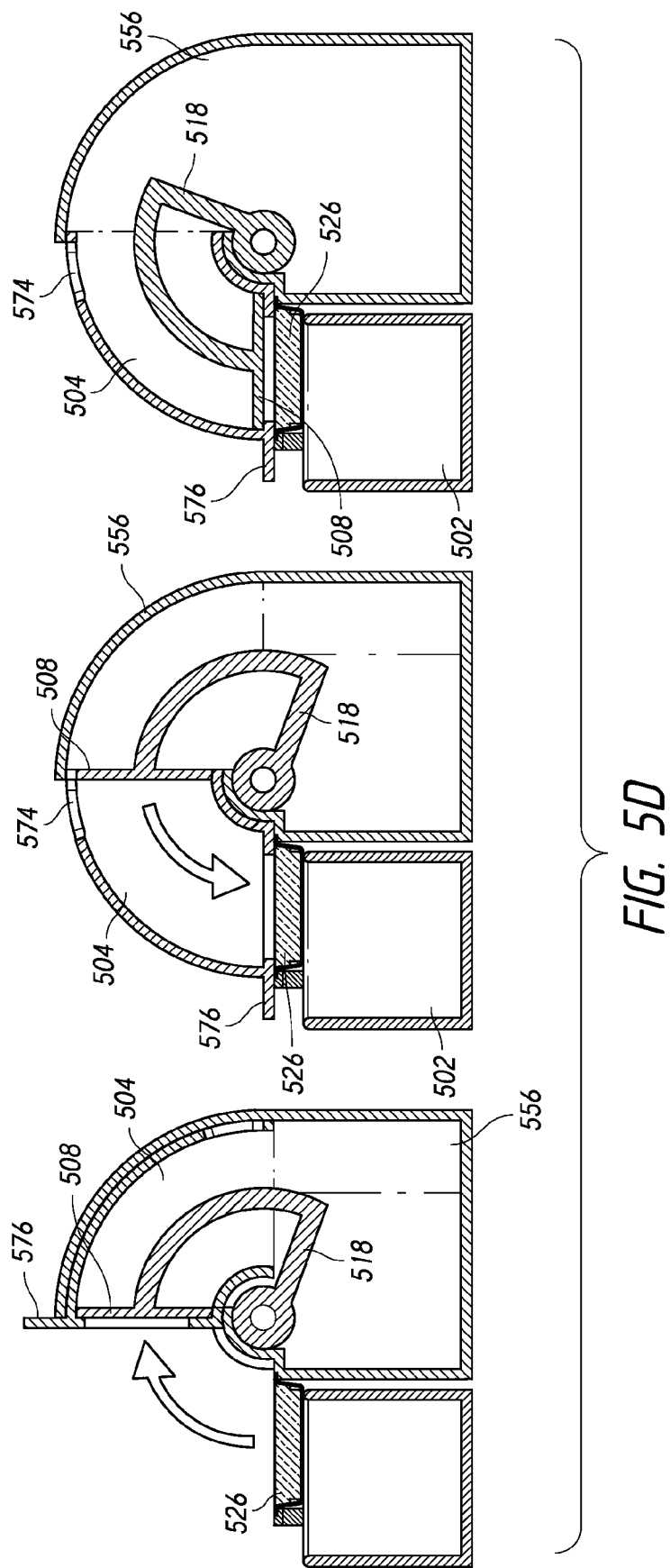
FIG. 5D illustrates cross-sectional views of a method of using the brewing apparatus shown in FIG. 5A.

FIGS. 5C-5D illustrates a method of using the brewing apparatus 500. With the vessel 502 already in place, the fluid reservoir 504 can rotate to the second configuration to provide access to the cartridge holder 506. As shown in FIG. 5D, rotating the fluid reservoir 504 to the second configuration can compress the spring 518 and move the plunger 508 between a deployed configuration and a primed configuration. The housing 558 can include a latch mechanism configured to maintain the plunger 508 in the primed configuration. Thereafter, the user can insert the cartridge 526 into the cartridge holder 506 in either an upright or an inverted configuration. In certain variants, the user can secure the vessel 502 to the housing 558 after rotating the fluid reservoir 504 and/or loading the cartridge 526.

After inserting the cartridge 526 into the cartridge holder 506, the user can rotate the fluid reservoir 504 back to the first configuration, while leaving the plunger 508 in the primed configuration. The fluid reservoir 504 can engage cartridge holder 506 using any connection mechanism described herein (e.g., interference fit, screw mechanism, snap fit, bayonet, detent, latch mechanism, a magnet, or otherwise). Once the cartridge 526 has been sealed in place, the brewing apparatus 500 should be configured such that water from the fluid reservoir 504 can be forced through the cartridge 526 and into the vessel 502.

After securing the fluid reservoir 504 to the cartridge holder 506, the user can pour hot water into the fluid reservoir 504 through the port 574. Once the timer indicates that the steep time has elapsed, the user can depress an actuator (not shown) to release the plunger 508. The spring-loaded plunger 508 can be configured to force hot water through the cartridge 528 over the course of a pre-determined plunge time and at a substantially constant flow rate. In certain variants, as described above, the brewing apparatus can automatically release the plunger 508 after the steep time elapses.

Once the brew process is complete, the vessel 502 can be removed, and the cartridge 526 can be discarded.

Figure 6B:
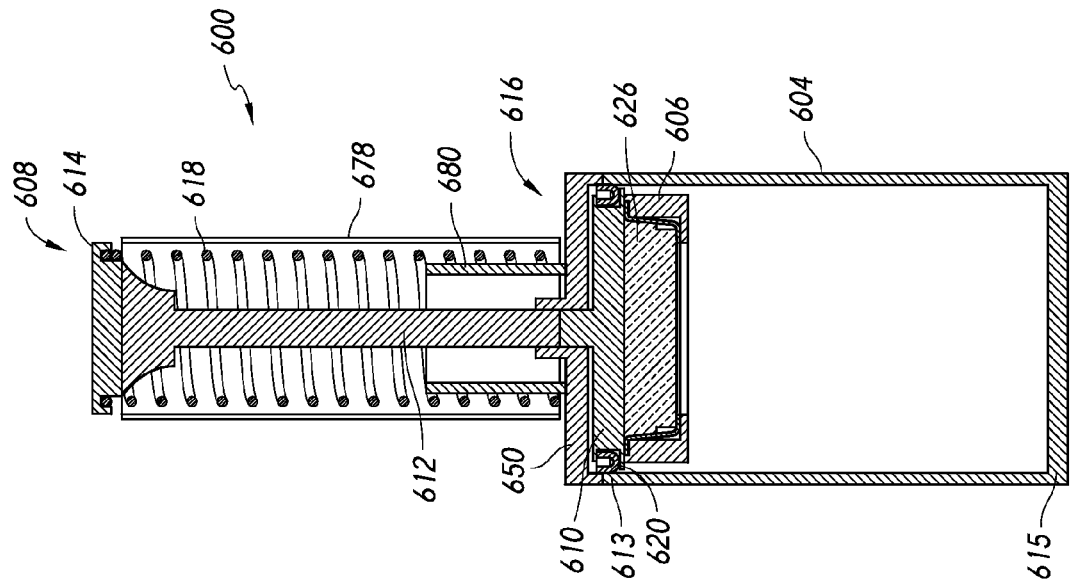
FIG. 6B illustrates a cross-section of the apparatus shown in FIG. 6A in a deployed configuration.
Figure 6A:
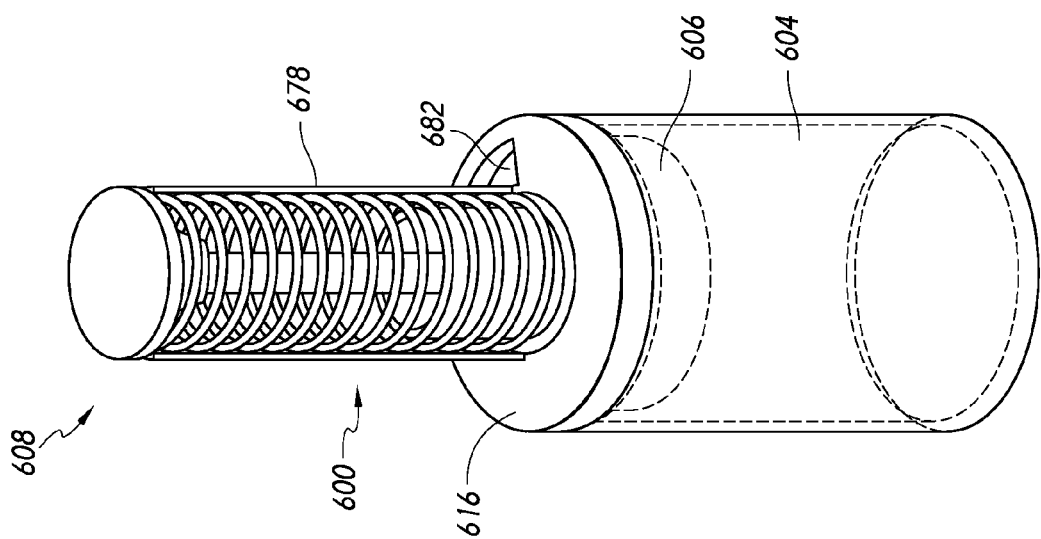
FIG. 6A illustrates an isometric view of a spring-loaded, pull-type apparatus for brewing a beverage.

FIGS. 6A-6C illustrate a pull-type brewing apparatus 600. The brewing apparatus 600 can include features similar to the brewing apparatuses 300, 400, 500. Some of these corresponding components are identified with the same reference numbers, except that the features are in the 600s.

The brewing apparatus 600 can include a fluid reservoir 604, a cartridge holder 606, a lid portion 606, and a plunger 608. The lid portion 616 can include a cover 650 and an extension portion 680 extending upward (i.e., in a direction opposite the fluid reservoir 604). The cover 650 can close an open end of the fluid reservoir 604. The lid portion 616 can connect to the fluid reservoir 604 using various connections, such as an interference fit, a screw mechanism, a snap fit, a bayonet, a detent, a latch mechanism, a magnet, or otherwise.

As shown in FIG. 6A, the lid portion 616 can include a fill port 682 through which the user can pour water into the fluid reservoir 604. In certain aspects, as shown in FIG. 6C, the lid portion 616 can include a valve 684 configured to permit one-way fluid through the fill port 682. The valve 684 can permit fluid to flow into the fluid reservoir 604 but prevent water from flowing out of the fluid reservoir 604. The valve 684 can be any type of check valve, including, but not limited to, a flapper valve, a ball check valve, a diaphragm valve, or a disc valve.

The plunger 608 can include a base portion 610 and a shaft 612. The plunger 608 can move vertically and/or rotationally relative to the lid portion 616. For example, the extension portion 680 of the lid portion 616 can define a lumen through which the plunger shaft 612 extends. The base portion 610 can include a diameter that is greater than a diameter of the lumen. When the lid portion 616 engages the fluid reservoir 604, the plunger 608 can move through the fluid reservoir 604.

As shown in FIG. 6B, the base portion 610 of the plunger 608 can engage the cartridge holder 606, such that movement of the plunger 608 through the fluid reservoir 604 also moves the cartridge holder 606. The cartridge holder 606 can be secured to the plunger 608 using any connection mechanism described herein, such as an interference fit, a screw mechanism, a snap fit, a bayonet, a detent, a latch mechanism, a magnet, or otherwise.

The plunger 608 can include a sealing ring 620 configured to form a seal between the base portion 610 and the fluid reservoir 604. The sealing ring 620 and/or or other sealing feature (e.g., rolling seal, diaphragm seal, cup seal, or bellows) can help prevent water from moving upward (i.e., toward the lid portion 616) past the base portion 610.

The brewing apparatus 600 can include a spring 618 circumferentially disposed around the shaft 616. The spring 618 can be a compression spring configured to move between a compressed configuration and an expanded configuration. The spring 618 can be coaxially disposed around the shaft 612 and positioned between the lid portion 616 and a plunger handle 614. As shown in FIGS. 6B and 6C, the brewing apparatus 600 can include a compressible structure 678 surrounding the spring 618. The compressible structure 678 can be a sheath constructed from telescopic tubes or bellows.

The spring 618 can be configured to move the plunger 608 through the fluid reservoir 604 and to maintain a substantially constant low flow rate. In certain aspects, the spring 618 can have an outer diameter that is less than an inner diameter of the fluid reservoir 604 but greater than a diameter of the plunger shaft 612. In certain aspects, the spring diameter is less than or equal to about 60 mm, for example, between about 40 mm and about 50 mm or between about 50 mm and about 60 mm. In certain aspects, the user force required to move the spring-loaded plunger 608 a distance between about three inches and about four inches can be at least about 40 N and/or less than or equal to about 80 N.

Although not shown, the brewing apparatus 600 can include a timer configured to signal the user when to plunge the plunger 608. For example, the timer can be an hourglass, a mechanical timer, a moisture indicator, temperature indicator, a pressure gauge, a thermo-electric powered timer, or a battery-powered electronic timer. In certain variants, the brewing apparatus 600 can include a timer configured to automatically plunge the plunger 608 after a pre-determined steep time.

To use the brewing apparatus 600, the user first inserts the cartridge 626 into the cartridge holder 606. Depending on the configuration of the cartridge holder 606, the cartridge 626 can be loaded in either an upright or an inverted configuration. After inserting the cartridge 626 into the cartridge holder 606, the base portion 610 of the plunger 608 can engage the cartridge holder 606, thereby sealing the cartridge 626 between the plunger 608 and the cartridge holder 606.

After securing the plunger 608 to the cartridge holder 606, the lid portion 616 can be secured to the fluid reservoir 604 using any of the connection features described herein (e.g., interference fit, screw mechanism, snap fit, bayonet, detent, latch mechanism, a magnet, or otherwise).

Once the lid portion 616 engages the fluid reservoir 604, the user can move the plunger 608 from a deployed configuration (FIG. 6B) to a primed configuration (FIG. 6C) by pushing on the handle 614. In the deployed configuration, the cartridge holder 606 can be positioned near a first end 613 of the fluid reservoir 604. In the primed configuration, the cartridge holder 606 can be positioned near a second end 615 of the fluid reservoir 604. As the plunger 608 moves from the deployed configuration to the primed configuration, the spring 618 and/or compressible structure 678 can be compressed between the upper end 614 of the plunger 608 and the lid portion 616. The brewing apparatus 600 can include a locking mechanism configured to lock the plunger 608 in the primed configuration. The locking mechanism can include any of the features of the locking mechanism shown in FIGS. 3M-3Q.

Once the plunger 608 is in the primed configuration, the user can pour water into the fluid reservoir 604 through the fill port 682.

After the timer 628 indicates that the steep time has elapsed, the user can release plunger 608 by pulling the handle 614 or otherwise triggering the release of the plunger 608 (e.g., depressing an actuator). Releasing the plunger 608 can move the plunger 608 from the primed configuration to the deployed configuration, thereby moving the cartridge 626 through the fluid reservoir 604 over the course of a pre-determined plunge time. The spring 618 can be configured such that water flows through the cartridge 628 at a substantially constant flow rate. Once the brew process is complete, the fluid reservoir 604 can be removed and the cartridge 626 can be discarded.

FIGS. 7A-7C illustrate another pull-type brewing apparatus 700. The brewing apparatus 700 can include features similar to the brewing apparatuses 300, 400, 500, 600. Some of these corresponding components are identified with the same reference numbers, except that the features are in the 700s.

The brewing apparatus 700 can include a fluid reservoir 704, a cartridge holder 706, a lid portion 716, and a plunger 708. The lid portion 716 can close an open end of the fluid reservoir 705. The lid portion 716 can connect to the fluid reservoir 704 using various connections, such as an interference fit, a screw mechanism, a snap fit, a bayonet, a detent, a latch mechanism, a magnet, or otherwise.

As shown in FIG. 7C, the lid portion 716 can include a fill port 782 through which the user can pour water into the fluid reservoir 704. In certain aspects, as shown in FIG. 7C, the lid portion 716 can include a valve 784 configured to permit one-way fluid through the fill port 782. The valve 784 can permit fluid to flow into the fluid reservoir 704 but prevent water from flowing out of the fluid reservoir 704. The valve 784 can be any type of check valve, including, but not limited to, a flapper valve, a ball check valve, a diaphragm valve, or a disc valve.

The plunger 708 can include a base portion 710 and a shaft 712. As shown in FIG. 7B, the base portion 710 of the plunger 708 can engage the cartridge holder 706, such that movement of the plunger 708 through the fluid reservoir 704 also moves the cartridge holder 706. The cartridge holder 706 can be secured to the plunger 708 using any connection mechanism described herein, such as an interference fit, a screw mechanism, a snap fit, a bayonet, a detent, a latch mechanism, a magnet, or otherwise.

The plunger 708 can include a sealing member configured to form a seal between the base portion 710 and the fluid reservoir 704. The sealing member can help prevent water from moving upward (i.e., toward the lid portion 716) past the base portion 710. For example, the sealing member can be a sealing ring 720 and/or or other sealing feature (e.g., rolling seal, diaphragm seal, cup seal, or bellows).

The brewing apparatus 700 can include a spring 718 circumferentially disposed around the shaft 712. As shown in FIG. 7C, the spring 718 can be positioned above the lid portion 716. The spring 718 can be a power spring configured to move between a compressed configuration and an expanded configuration. The spring 718 can be configured to move the plunger 708 through the fluid reservoir 704 and maintain a substantially constant flow rate through the cartridge 726. In certain aspects, the torque required to turn the spring 718 up to three times can be less than or equal to about 1.4 Nm. In certain aspects, the torque required to turn the spring 718 one turn can be between about 1.2 Nm and about 1.4 Nm, for example, about 1.3 Nm. In certain aspects, the torque required to turn the spring 718 two turns can be between 0.8 Nm and about 1.4 Nm, between about 0.8 Nm and about 1.0 Nm, or about 0.9 Nm.

The plunger 708 can move vertically and/or rotationally relative to the lid portion 716 using a drive mechanism similar to that of the brewing apparatus 400. For example, the brewing apparatus can include a drive shaft 760. When the spring 718 moves between a compressed configuration and an expanded configuration, the spring 718 can spin the drive shaft 760. In turn, the drive shaft 760 can drive the plunger 708. The drive shaft 760 can define a helical cam path (not shown) configured to receive the inward protruding portion of the plunger pins (not shown).

The brewing apparatus 700 can include a cap 729. The cap 729 can include a number of linear guide paths configured to guide the outward extending portion of the plunger pins. The combination of the spring 718, drive shaft 760, cap portion 729, and plunger 708 can help convert rotary motion to vertical motion and move the plunger 708 between a deployed configuration and a primed configuration.

The brewing apparatus 700 can include an actuator 758 configured to permit the user to prime the plunger 708. Although the figures illustrate the actuator 758 as a dial, other actuators can be imagined, such as a button, switch, or lever. The brewing apparatus 700 can include a ratchet (not shown) configured to control movement of an actuator 758. The ratchet can permit the actuator 758 to move in a clockwise direction to prime the spring 718 and prevent counter-clockwise rotation. When the user is ready to brew, a pawl (not shown) can be pushed to disengage the ratchet and to permit counter-clockwise rotation of the actuator 758. The counter-clockwise rotation can release the spring 718 and drive the plunger 708. In certain aspects, the brewing apparatus 700 can include a rotary damper and/or other mechanism to control the rate at which the plunger 708 deploys.

As described above, the total brew time can affect the quality of the output from the brewing apparatus 700. As such, it can be desirable to include a mechanical timer 728, to automatically plunge the plunger 708 after the steep time has occurred. As shown in FIG. 7C, the timer 728 can be a gear-based system secured to the lid portion 716. In certain variants, the timer 728 merely signals the user to release the plunger 708, for example, the brewing apparatus 700 can include an hourglass, a moisture indicator, temperature indicator, a pressure gauge, a thermo-electric powered timer, or a battery-powered electronic timer.

To use the brewing apparatus 700, the user first inserts the cartridge 726 into the cartridge holder 706. Depending on the configuration of the cartridge holder 706, the cartridge 726 can be loaded in either an upright or an inverted configuration. After inserting the cartridge 726 into the cartridge holder 706, the base portion 710 of the plunger 708 can engage the cartridge holder 706, thereby sealing the cartridge 726 between the plunger 708 and the cartridge holder 706.

After securing the plunger 708 to the cartridge holder 706, the lid portion 716 can be secured to the fluid reservoir 704 using any of the connection features described herein (e.g., interference fit, screw mechanism, snap fit, bayonet, detent, latch mechanism, magnet, or otherwise).

Once the lid portion 716 engages the fluid reservoir 704, the user can prime the plunger 708 by twisting the actuator 758. Twisting the actuator 758 can set the timer 728 and move the plunger 708 between a deployed configuration (FIG. 7B) and a primed configuration (FIG. 7C). In the deployed configuration, the cartridge holder 706 can be positioned near a first end 713 of the fluid reservoir 704. In the primed configuration, the cartridge holder 706 can be positioned near a second end 715 of the fluid reservoir 704. As the plunger 708 moves from the deployed configuration to the primed configuration, the spring 718 can move to a compressed configuration. Once the plunger 708 is in the primed configuration, the user can pour water into the fluid reservoir 704 through the fill port 782.

After the steep time has elapsed, the plunger 708 can automatically move from the primed configuration to the deployed configuration. The plunger 708 can force the cartridge 726 through the water over the course of a pre-determined plunge time. The spring 718 can be configured such that water flows through the cartridge 728 at a substantially constant flow rate. Once the brew process is complete, the fluid reservoir 704 can be removed and the cartridge 726 can be discarded.

In certain variants, the plunger 708 does not automatically move from the second configuration to the first configuration. The user can release plunger 708 by twisting the plunger 708 in an opposite direction or pressing an actuator (e.g., button or switch).

Gravity Press

Figure 8B:
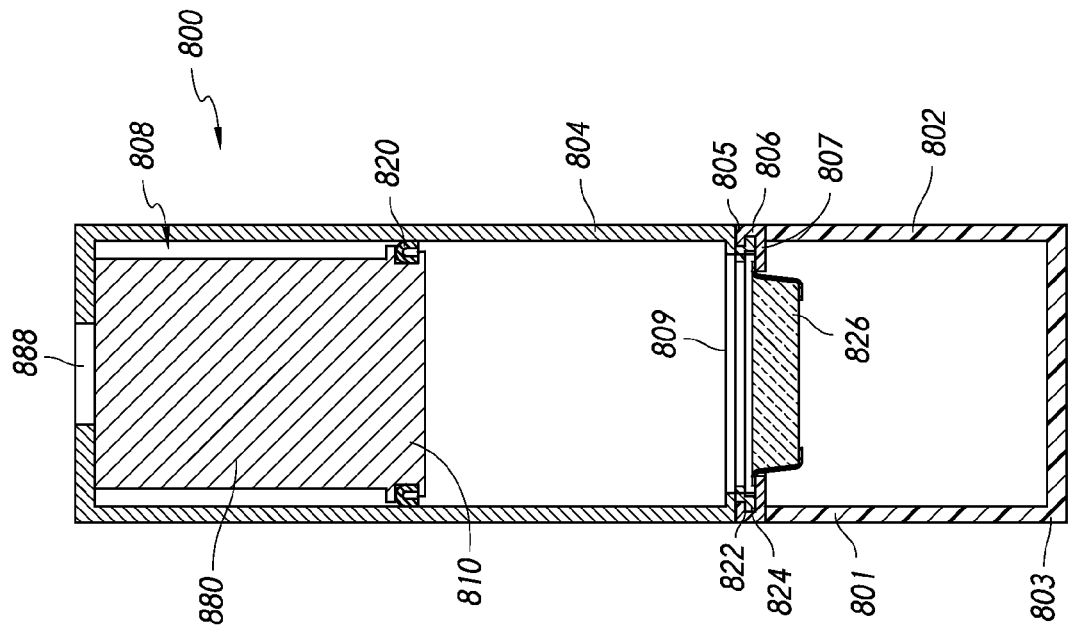
FIG. 8B illustrates a cross-section of the apparatus shown in FIG. 8A.
Figure 8A:
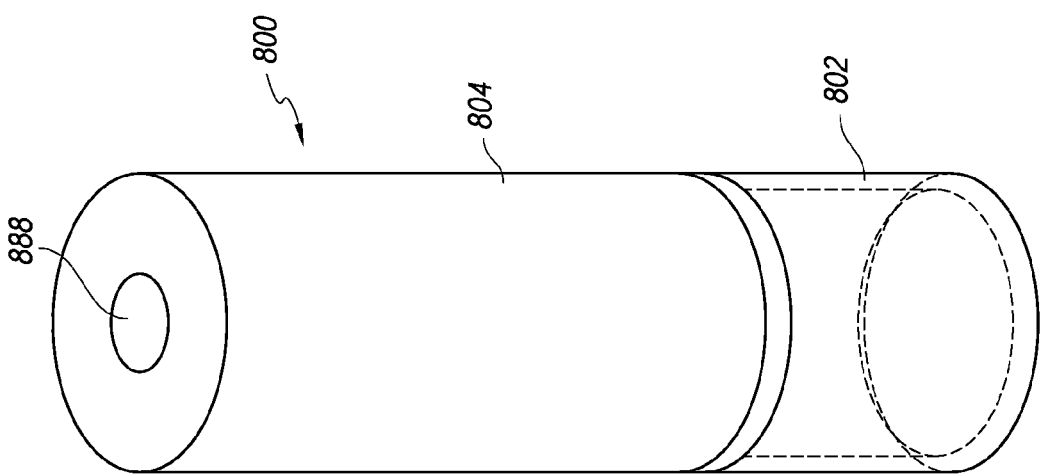
FIG. 8A illustrates an isometric view of a gravity press apparatus for brewing a beverage.
Figure 8C:
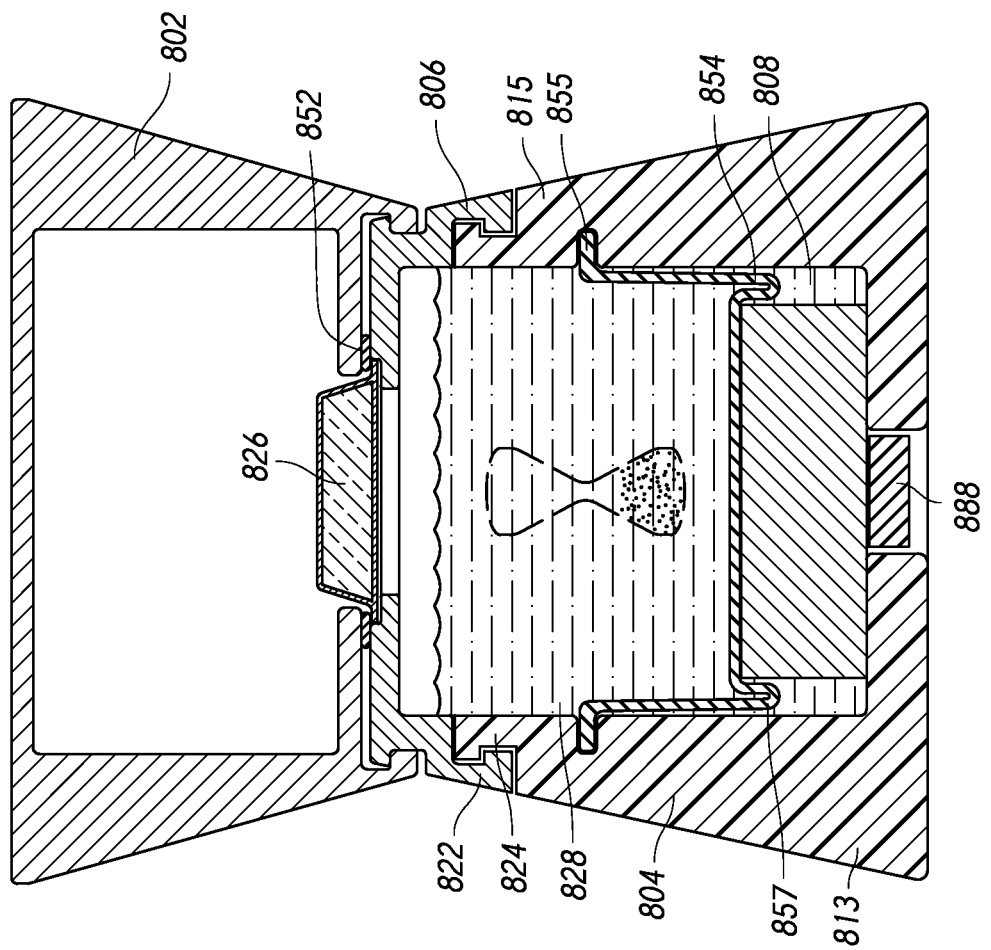
FIG. 8C illustrates a cross-section of a variant of the apparatus shown in FIG. 8A.

FIGS. 8A-8C illustrate the brewing apparatus 800, which relies on gravity to force water through the cartridge 826. The brewing apparatus 800 can include features similar to the brewing apparatuses 300, 400, 500, 600, 700. Some of the corresponding components are identified with the same reference numbers, except that the features are in the 800s.

The brewing apparatus 800 can include a vessel 802, a fluid reservoir 804, and a cartridge holder 806. The vessel 802, fluid reservoir 804, and cartridge holder 806 can removably connect to each other using any type of connection, such as interference fit, screw mechanism, snap fit, bayonet, detent, latch mechanism, magnet, or otherwise.

Depending on the configuration of the components, the brewing apparatus 800 can be configured to seal the cartridge between the fluid reservoir 804 and the cartridge holder 806, between the cartridge holder 806 and the vessel 802, or directly between the fluid reservoir 804 and the vessel 802. For example, as shown in FIG. 8B, the cartridge 826 can be sealed between the fluid reservoir 804 and the cartridge holder 806. As another example, as shown in FIG. 8C, the cartridge 826 can be sealed between the vessel 802 and the cartridge holder 806. In certain aspects, the brewing apparatus 800 can include a gasket 852 to facilitate a seal between the brewing apparatus 800 and the cartridge 826.

The fluid reservoir 804 can include a first end 813 and a second end 815. In some configurations, for example, when loading the cartridge 826, the first end 813 can rest on a surface (e.g., table). The first end 813 can include an actuator 888 (e.g., button or switch) configured to release the plunger 808. The second end 815 of the fluid reservoir 804 can releasably connect to the cartridge holder 806 using a connection mechanism, such as an interference fit, a screw mechanism, a snap fit, a bayonet, a detent, a latch mechanism, a magnet, or otherwise.

The fluid reservoir 804 can include a latch mechanism (not shown) to releasably latch the plunger 808. The latch mechanism can maintain the position of the plunger 808, regardless of the orientation of the fluid reservoir 804, until the user depresses the actuator 888.

The plunger 808 can move between the first end 813 and the second end 815 of the fluid reservoir 804. The plunger 808 can include a sealing feature configured to form a seal between the plunger 808 and the fluid reservoir 804. For example, as shown in FIG. 8B, the plunger 808 can include a sealing ring 820. As another example, as shown in FIG. 8C, the sealing features can be a rolling diaphragm or cup seal 852. The seal 852 can include a first end 855 and a second end 857. The first end 855 can be secured to the fluid reservoir 804 at a position spaced away from the actuator 888, for example, the first end 855 can be secured to the fluid reservoir 804 at a position closer to the second end 815 than the first end 813. The second end 857 of the seal 854 can engage a base portion 810 of the plunger 808. The plunger 808 can be configured to move the second end 857 of the seal 854 relative to the first end 855 of the seal 854.

The plunger 808 can include a mass 880. The mass 880 can be at least about 1 kg, at least about 7 kg, or at least about 15 kg. The mass 880 can force at least a majority or substantially all of the water through the cartridge 826 at a substantially constant force.

It can be desirable to include a timer 828 to signal the user when to release the plunger 808. As shown in FIG. 8C, the timer 828 can be an hourglass. Alternatively, the timer 828 can be a mechanical timer, a moisture indicator, temperature indicator, a pressure gauge, a thermo-electric powered timer, or a battery-powered electronic timer. Once the timer 828 indicates that the steep time has elapsed, the actuator 888 can be depressed to release the plunger 808. Gravity drives the plunger 808 from the first end 813 of the reservoir 804 toward the second end 815 of the reservoir 808. In certain variants, the brewing apparatus 800 can automatically release the plunger 808 after the steep time elapses.

Figure 8D:
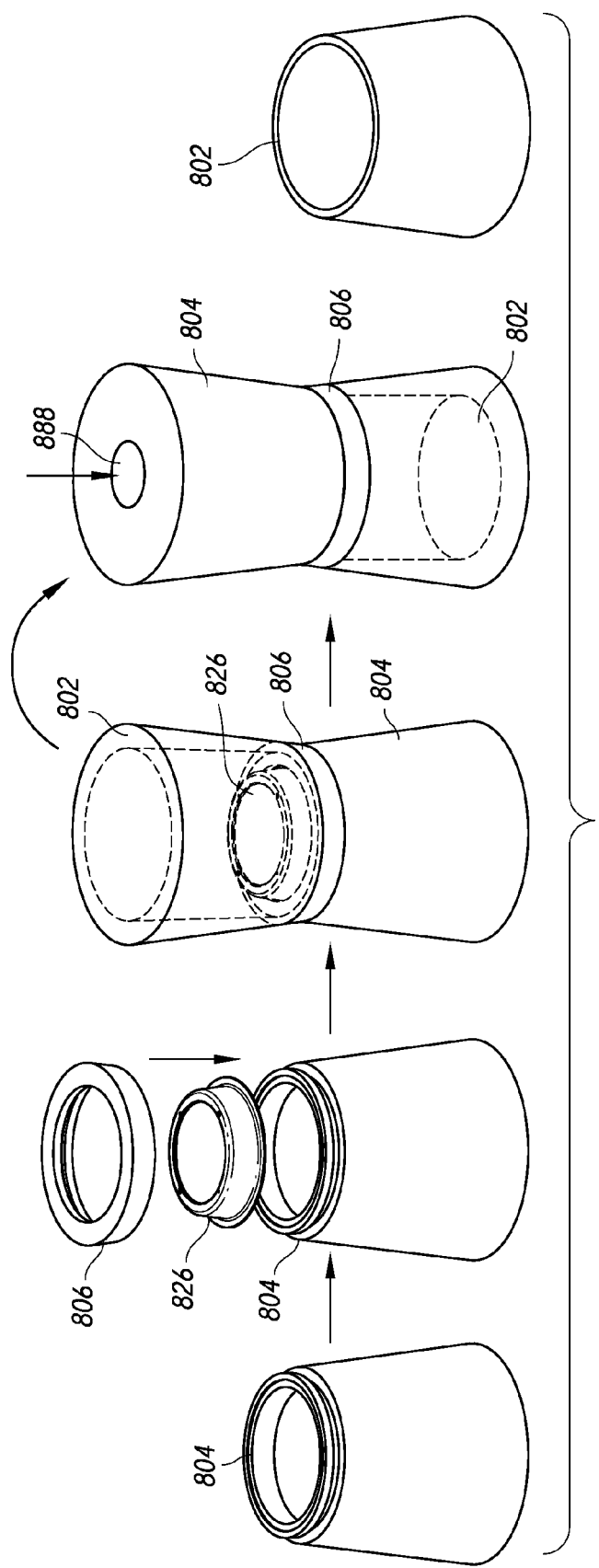
FIG. 8D illustrates a method of using the brewing apparatus shown in FIG. 8A.

FIG. 8D illustrates a method of using the brewing apparatus 800. With the first end 813 of the reservoir 808 resting on a surface, the user can fill the fluid reservoir 808 with water. Thereafter, the user can seal the cartridge 826 between the fluid reservoir 808 and the pod holder 806. Depending on the configuration of the cartridge holder 806, the cartridge 826 can be inserted into the holder 806 in either an upright or an inverted configuration. The cartridge 826 can be sealed between the fluid reservoir 804 and the cartridge holder 806 using any connection mechanism described herein (e.g., interference fit, screw mechanism, snap fit, bayonet, detent, latch mechanism, magnet, or otherwise). In certain variants, as described above, the cartridge 826 can be sealed between the vessel 802 and the cartridge holder 806 or directly between the vessel 802 and the fluid reservoir 804.

After sealing the cartridge 826, the vessel 802 can be secured to the cartridge holder 806 using any connection mechanism described herein (e.g., interference fit, screw mechanism, snap fit, bayonet, detent, latch mechanism, magnet, or otherwise). After assembling the brewing apparatus 800, the user can invert the brewing apparatus 800 such that the vessel 802 rests on the surface.

Inverting the assembly can initiate the hourglass timer 828. Once the timer 828 indicates that the steep time has elapsed, the user can depress the actuator 888 to release the plunger 808. In certain variants, as described above, the timing apparatus 800 can automatically release the plunger 808 after the steep time elapses.

The plunger 808 can be configured to force hot water through the cartridge 826 with a substantially constant force. Once the brew process is complete, the vessel 802 can be removed and the cartridge 826 can be discarded.

Figure 8E:
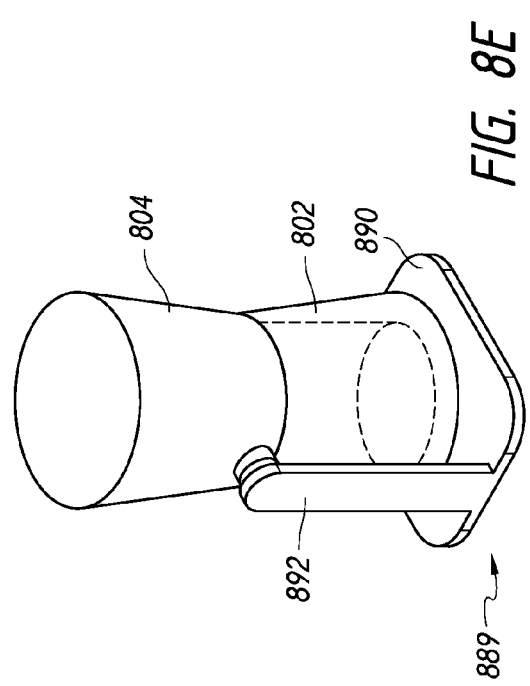
FIG. 8E illustrates the brewing apparatus shown in FIG. 8A with a stand.

In certain variants, as shown in FIG. 8E, the brewing apparatus 800 can include a stand 889. The stand 889 can include a base 890 and an arm 892. The arm 892 can rotatably connect to the fluid reservoir 804. The stand 889 can facilitate the step of inverting the brewing apparatus 800.

Manual Press

FIGS. 9A-9E illustrate a manual brewing apparatus 900. The brewing apparatus 900 can include features similar to the brewing apparatuses 300, 400, 500, 600, 700, 800. Some of the corresponding components are identified with the same reference numbers, except that the features are in the 900s.

The brewing apparatus 900 can include a vessel 902 removably connected to a fluid reservoir 904 using any type of connection, such as interference fit, screw mechanism, snap fit, bayonet, detent, latch mechanism, magnet, or otherwise. For example, as shown in FIG. 9B, the vessel 902 can include bayonets 996 configured to engage a downward extending flange portion 924 of the fluid reservoir 904. Although not shown, in certain variants, the brewing apparatus 900 can include a cartridge holder 906 disposed between the fluid reservoir 904 and the vessel 902.

Figure 9D:
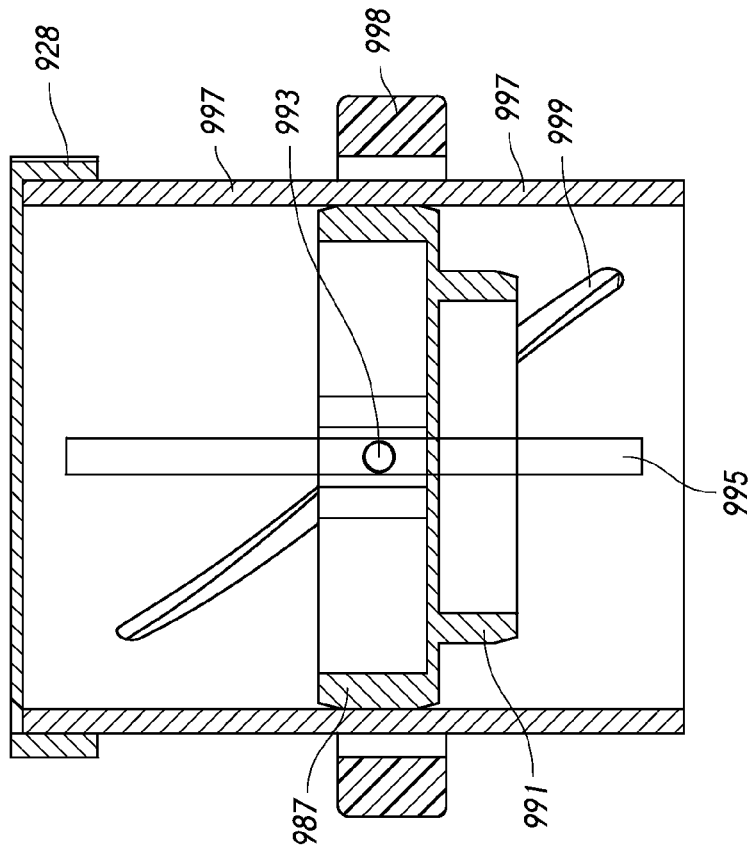
FIG. 9D illustrates an enlarged, partial cross-sectional view of the apparatus shown in FIG. 9A.
Figure 9C:
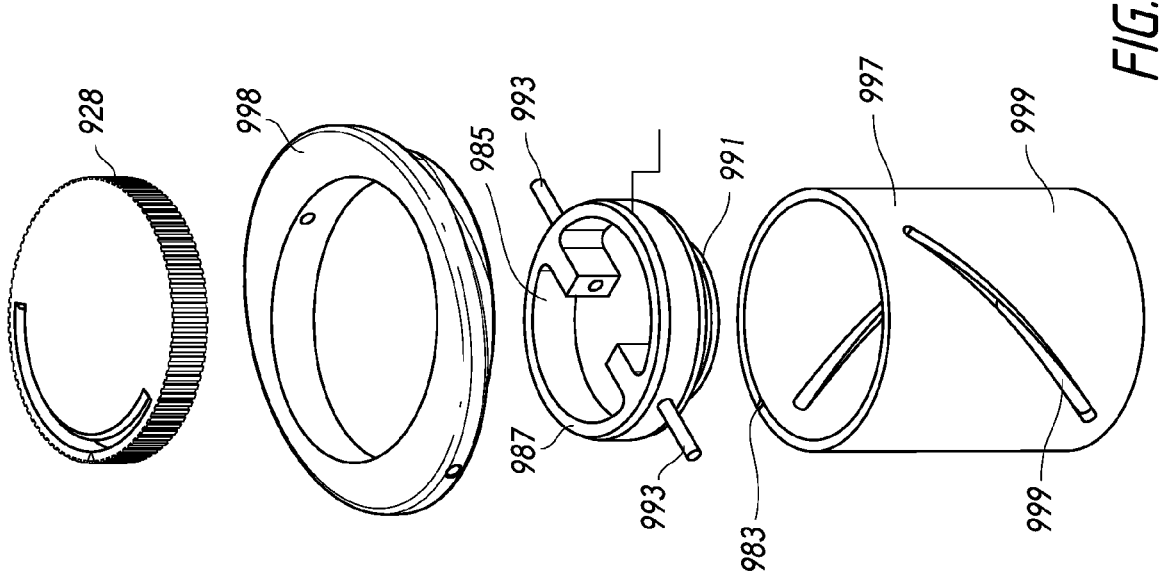
FIG. 9C illustrates an exploded view of a part of the apparatus shown in FIG. 9A.

FIG. 9C illustrates a plunger 908 configured to move between a first end 913 and a second end 915 of the fluid reservoir 904. The plunger can include an outer frame portion 987 and an inner frame portion 991. The outer frame portion 987 can include a diameter greater than a diameter of the inner frame portion 991. The plunger 902 can include one or more guide members 993. The guide members 993 can guide the plunger 908 along a length of the fluid reservoir 904. For example, as shown in FIG. 9A, the fluid reservoir 904 can include a number of guide paths 995. Each guide path 995 can receive a guide member 993.

The brewing apparatus 900 can include a handle 998. The handle 998 can be configured such that movement of the handle 998 moves the plunger 908 along a length of the fluid reservoir 904. In certain aspects, the plunger 908 can include a spring (not shown) configured to return the plunger to the original position.

The outer frame portion 987 of the plunger 908 can be secured to bellows 994 or another sealing member (e.g., rolling seals, cup seal, or likewise). The bellows 994 can form a seal between the plunger 908 and a dial cam 997.

As shown in FIG. 9B, the dial cam 997 can be coaxially disposed between the plunger 908 and the fluid reservoir 904. The dial cam 997 can define a number of cam paths 999 and can include a marker 983 at an upper surface of the dial cam 997. The dial cam 997 can indicate the pace at which the user should actuate the plunger 908. In certain variants, the brewing apparatus 900 can include a whistle to indicate the ideal plunge rate.

The brewing apparatus 900 can include a timer, such as an hourglass, a mechanical timer, a moisture indicator, temperature indicator, a pressure gauge, a thermo-electric powered timer, or a battery-powered electronic timer. As shown in FIG. 9A, the timer 928 can be a mechanical timer secured to a first end of the first end 913 of the fluid reservoir 904. The timer 928 can be configured to signal the user to actuate the plunger 908. The timer 928 can define a window 979 through which the dial cam marker 983 can be seen. The timer 928 can also include a timer marker 981.

Figure 9E:
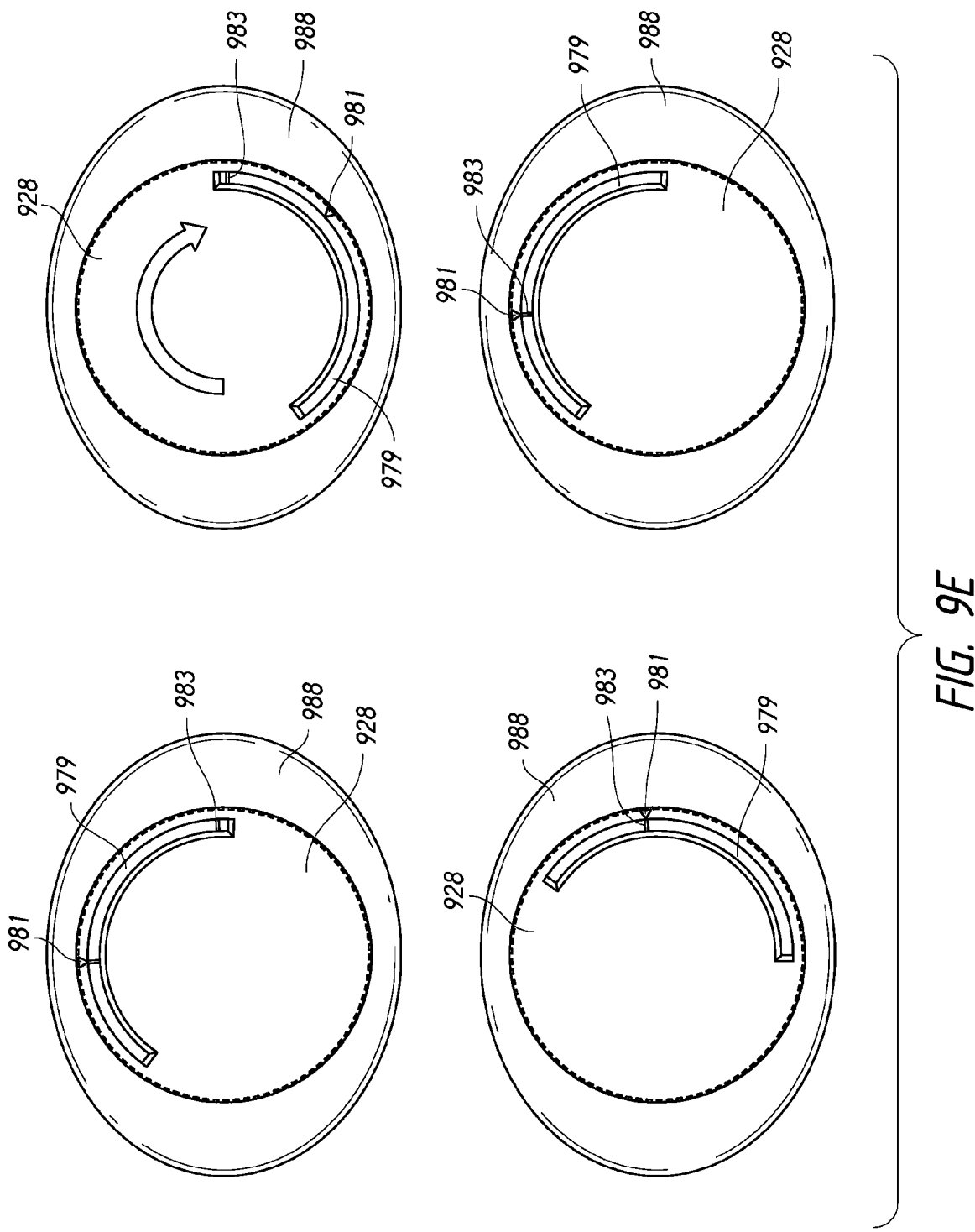
FIG. 9E illustrates a top view of a method of using the brewing apparatus shown in FIG. 9A.

FIG. 9E illustrates a method of using the timer 928. After assembling the brewing apparatus 900, the user can initiate the timer 928 to set the total brew time. After the steep time elapses, the timer marker 981 should be aligned with the dial cam marker 983, thereby signaling the user to begin depressing the plunger 908. As the user depresses the plunger 908, the dial cam 997 rotates in the same direction as the timer 928. The user can depress the plunger 908 at a rate that maintains alignment between the dial cam marker 983 and the timer marker 981. The pacing mechanism can help the user control the flow rate of water through the cartridge 926.

Alternative Plunger Designs

The brewing apparatuses described herein are not limited to the plunger designs described above. For example, the brewing apparatus can include a pump and a pressure reservoir. The user can pump a handle to pressurize the reservoir. After the steep time elapses, a fluid reservoir valve can open, thus forcing water from the fluid reservoir through the cartridge.

As another example, the brewing apparatus can include a bladder module. The bladder module can be bellows or an otherwise expandable structure. The bladder module can contain a liquid capable of boiling at the water temperature required for the brewing recipe. When the liquid reaches the boiling temperature, the liquid can undergo a phase change causing the bladder to expand and force fluid through the cartridge.

In certain variants, the plunger can be disposed between the fluid reservoir and the vessel. Moving the fluid reservoir toward a base of the brewing apparatus can compress a spring and set the plunger mechanism. The fluid reservoir moves toward the base until the fluid reservoir locks into place relative to the plunger. The brewing apparatus can include a thermal actuator or latch mechanism that uses the thermal energy to produce a mechanical force to release the plunger.

As another example, the plunger can be primed using a lever mechanism. Depressing a lever mechanism can compress a torsion spring. After the steep time elapses, the plunger can release automatically and force water through the cartridge.

The embodiments described above can but need not be used in combination with the additional embodiments described below.

Modified Spring-Loaded French Press

FIGS. 10-35 described a modified spring-loaded French press that can but need not be used in combination with the embodiments described above. These embodiments can include a cap that is sealing mounted to a container that holds a fluid (e.g., hot water). The cap can be sealed with an O-ring, gasket or other sealing structure. The cap can be coupled to the container via a press fit and/or a mechanical connection such as, for example, a combination of threads, cam members, bayonet fittings and/or snap features between the cap and the container (see e.g., the connection configurations described above). A filtering assembly can be positioned below the cap within the container. The filtering assembly can be coupled to a stem that extends through an opening in the cap. The stem, in turn, can be coupled to a handle position above the cap opposite the filtering assembly.

In one arrangement, the apparatus can include a biasing mechanism within the cap that urges the stem and the filtering assembly in a first direction (e.g., upwards) towards the cap. In one arrangement, a biasing member is positioned between the handle and the cap. As the handle is pressed in a second direction (e.g. downward), the biasing member is compressed which urges the handle upwardly and the filter assembly toward the cap. In one arrangement, the handle comprises or forms part lid that is reciprocally coupled to the container. In such an arrangement, the lid can comprise an inner surface that fits around and encompasses the outer surface of the container. As the lid and filter assembly are pressed down, the container is moved within (at least partially) the interior of the lid.

In one arrangement, the filtering assembly carries brewing material (e.g., ground coffee or tea leaves). In one arrangement, the brewing material is positioned within a cartridge that is coupled to the filtering assembly. In one arrangement, the filtering assembly includes opening for controlling the amount of fluid flowing through the cartridge carried by the filtering assembly.

The filtering assembly can include grooves of passages that allow fluid to bypass the brewing material carried by the filtering assembly as the filtering assembly is advanced in the first direct (e.g., downward). As the filtering assembly is urged in the second direction (e.g., upwardly) back towards the cap, fluid flow through the grooves and/or passages can be blocked and/or restricted to bias flow instead through the brewing material carried by the filtering assembly. In one arrangement, flow through the grooves and/or passages are blocked or restricted by a check valves (e.g., a one way valve). In one arrangement, the check valves are forced into an open position by fluid pressure as the filtering assembly is advanced in the first direction (e.g., downward) and then forced in to a closed position as the filtering assembly is urged in the second direct (e.g., upward). In one arrangement, flow is restricted by valves that can actuated into an open or closed position by a user.

In the embodiments described below, the valves are described as allowing all of the fluid flow to bypass the brewing material as the filtering assembly is advanced in the first direction (e.g., downward). However, in certain arrangements, the passages and valves can be configured such that at least a majority of the fluid bypasses the brewing material, in another arrangement at least 75% of the fluid bypasses the brewing material, in another arrangement at least 85%, in another arrangement at least 90%, in another arrangement at least 95%, in another arrangement 99%, and in another arrangement 100%. In a similar manner, in the embodiments described below, the valves are describe as blocking or preventing all of the fluid flow as the filtering assembly is urged in the second direction (e.g., upwardly) forcing all of the fluid flow to flow through the brewing material. However, in certain arrangement, the passages and/or valves can be configured such that at least a majority of the fluid flows through the brewing material, in another arrangement at least 75%, in another arrangement at least 85%, in another arrangement at least 90%, in another arrangement at least 95%, in another arrangement 99%, and in another arrangement 100%.

Openings in the filtering assembly and/or flow characteristics of the cartridge combined with the force of the biasing can be designed and selected such that the time it takes for the filter assembly to move from, for example, the bottom of the container to the top of the container corresponds to the amount of time it takes to brew the carried material.

With reference now to certain illustrated embodiments, FIGS. 10-13 depict one particular embodiment of a modified French press as well as a method for making coffee or another beverage. The illustrated device incorporates a cap 1102 sealingly mounted to a container 1104 holding hot water. The cap 1102 is sealed to the container 1104 using an O-ring or other widely recognize structure, and can be twisted on, snapped on or otherwise coupled thereto to facilitate making coffee according to the following description. The container 1104 is designed to hold a desired amount of heated water or other liquid that will be used to make coffee, steep tea, or otherwise "brew" a hot beverage through a process such as that described below. The container 1104 can be a single cup or a pitcher. The illustrated container 1104 is cylindrical; however, it can be sized and shaped as suitable for performing the functions described herein.

A filtering assembly 1106 is positioned inside the device and is coupled at one end of a stem 1108 having a handle 1110 at its opposing end, the handle 1110 being located outside the device for manipulation by a user. The illustrated stem 1108 passes through the cap 1102. Inside the illustrated cap 1102 is a biasing mechanism that urges the stem 1108 and filtering assembly 1106 upward (as oriented in FIGS. 10-13).

To actuate the device, a user depresses the handle 1110 downward against the force of the biasing mechanism (FIG. 11); when the filtering assembly has been fully depressed (FIG. 12), the user removes the downward force from the handle 1110, and the biasing mechanism returns the handle, along with the stem 1108 and filtering assembly 1106, to the upward position (FIG. 13). In certain embodiments the biasing member can comprise a power spring arranged as described above with reference to FIG. 4I to drive the stem 1108.

The filtering assembly 1106 is adapted to be quickly depressed to the bottom of the container 1104, and to return slowly to the top of the container under the return force of the biasing mechanism as the coffee steeps in the heated water. To facilitate this method, the illustrated filtering assembly 1106 incorporates at least a first opening incorporating a one-way gate or butterfly valve 1112, or the like, that allows liquid to pass quickly in only one direction. In the illustrated embodiment, liquid can pass upwards through the butterfly valve (1112) (See FIG. 11), but cannot pass in the opposite direction. The first opening around the butterfly valves 1112 allows the heated water to pass quickly through the filtering assembly, without needing to pass through the coffee or other product being steeped, allowing the filtering assembly to be quickly depressed to the bottom of the container 1104.

When the user releases the handle 1110, the biasing mechanism in the cap 1102 begins moving the filtering assembly upwards through the heated water or other liquid. The sealed cap 1102 prevents the water from escaping from the device, increasing the pressure in the liquid. Because the butterfly valves 1112 are closed against the passage of water in the downward direction, all of the pressurized, heated water in the container must instead pass through the openings in the coffee filter/cartridge 1114. The openings in the coffee cartridge 1114 can be sufficiently small to prevent an unacceptable amount of loose coffee grinds from escaping into the container 1104, and allow the water to pass slowly through the grinds, steeping the grinds and making coffee as the filtering assembly slowly rises through the container 1104. The biasing force can be calculated based on the throughput of the filter cartridge 1114 and the amount of time it takes to brew a desired cup of coffee. In certain aspects, the openings incorporating the butterfly valves 1112 can be smaller than, the same size as, or larger than the openings that permit water to flow through the cartridge 1114 when the butterfly valves 1112 are closed.

The filtering assembly 1106 moves to the top of the device under the force of the biasing mechanism. When the filtering mechanism 1106 reaches the top of its stroke, the user can remove the lid 1102 and, with it, the filtering mechanism 1106, leaving a freshly brewed cup of coffee in the container 1104. The container 1104 contains coffee, but does not contain any of the grinds (unlike a traditional French press); as a result, the coffee stops steeping as soon as the device has completed its stroke.

FIGS. 14 and 15 illustrate another modified French press 1200 according to an another embodiment. In this version, the press 1200 incorporates a lid 1202 and a container 1204 that are reciprocally coupled to each other. FIG. 14 shows the press 1200 incorporating to one particular industrial design.

The internal structure of the press 1200 is shown in FIG. 15. The illustrated lid 1202 incorporates a cap 1203 reciprocally coupled to the lid 1202 via a shaft 1208. The cap 1203 slides along the shaft 1208 from a point at least near the bottom of the lid, closest to the container 1204 during use, to a point at least near the top of the lid, opposite the container. A spring 1205 between the lid 1202 and the cap 1203 can urge the cap toward the bottom position, as shown in FIG. 15.

A lower edge of the illustrated cap 1203 can be coupled to the container 1204 in a manner designed to prevent liquid from escaping therebetween during use. In the illustrated embodiment, a neck and shoulder are formed in the bottom of the cap 1203 to engage a mouth at the top of the container 1204; however, any suitable coupling would suffice. A gasket or other seal can be incorporated around the perimeter of the cap 1203 to increase the seal between the cap and the container 1204. Likewise, an O-ring or other type of seal can be incorporated between the cap and the shaft 1208 to prevent liquid from passing through the center of the cap during use. An individual of ordinary skill in the art, having reviewed this disclosure, will immediately appreciate the types of seals that can be used for these purposes.

The terminal lower end of the illustrated shaft 1208 is attached to a filtering assembly 1206, which is movable as a unit with the shaft relative to the cap 1203 and container 1204. The filtering assembly 1206 is sized and shaped to complement the interior shape of the container 1204. A gasket 1207 or other component can seal a gap between the filtering assembly 1206 and the wall of the container 1204, and allows the filtering assembly 1206 to slide along the length of the container during use.

When the lid 1202 is placed on the container 1204, the filtering assembly 1206 slides into the top of the container and the illustrated cap 1203 engages the mouth of the container 1204. Initially, before the lid 1202 is depressed, the spring 1205 urges the lid upwards, bringing the filtering assembly 1206 into contact with the cap 1203. If the user were to depress the lid 1202, the shaft 1208 would slide through the cap 1203 and urge the filtering assembly 1206 downward through the container 1204. Releasing the lid 1202 would allow the force of the spring 1205 to return the filtering assembly 1206 to the upper-most position.

A valve 1212 in the filtering assembly 1206 is configured to allow liquid to pass through it when the filtering assembly moves through the liquid in a downward direction, and to prevent liquid from passing therethrough when the filtering assembly moves in an upward direction. As a result, more liquid can pass through the filtering assembly 1206, at a faster rate, when it moves downward than when it moves upward. The valve 1212 is sized and adapted to allow the filtering assembly to move quickly in the downward direction through the liquid.

A filter/cartridge 1214 can be coupled to the filtering assembly 1206 on a side opposite the lid 1202. In certain embodiments, the filter/cartridge 1214 can be configured as described above. Liquid need not pass through the filter/cartridge 1214 to flow through the valve 1212. When the valve 1212 is closed, however, liquid must or is biased to flow preferentially through the filter/cartridge 1214 in order for the liquid to move past the filtering assembly 1206. The filter/cartridge 1214 can be pre-filled with ground coffee beans or other brewing material, or can be adapted for being filled and re-filled by the consumer. In another arrangement, the filtering assembly can be configured to receive brewing material directly.

The openings in the filtering assembly 1206 and the filter/screen flow characteristics, combined with the force of the spring 1205, are designed and selected such that the time it takes for the filter/cartridge 1214 to move from the bottom of the container 1214 to the top of the container corresponds to the amount of time it takes to brew a cup of coffee. Thus, as the filtering assembly 1206 moves from the bottom of the container 1204 to the top of the container, and water flows through the filter/cartridge 1214, the press 1200 brews a cup of coffee corresponding to the size of the container.

Figure 16A:
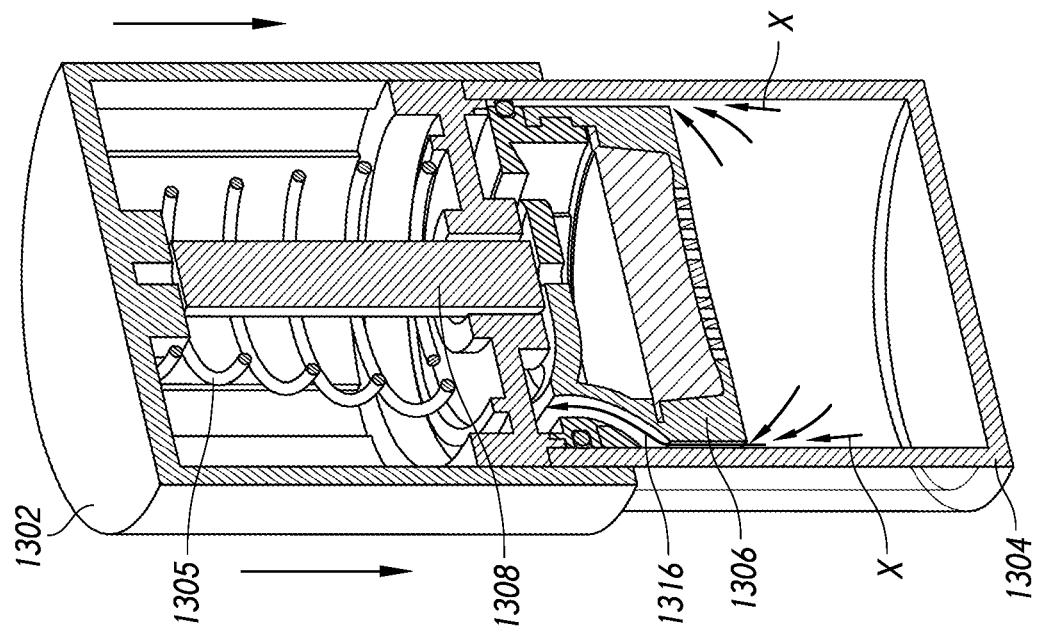
FIG. 16A is a ¾ perspective of the cross-section of FIG. 16.
Figure 16:
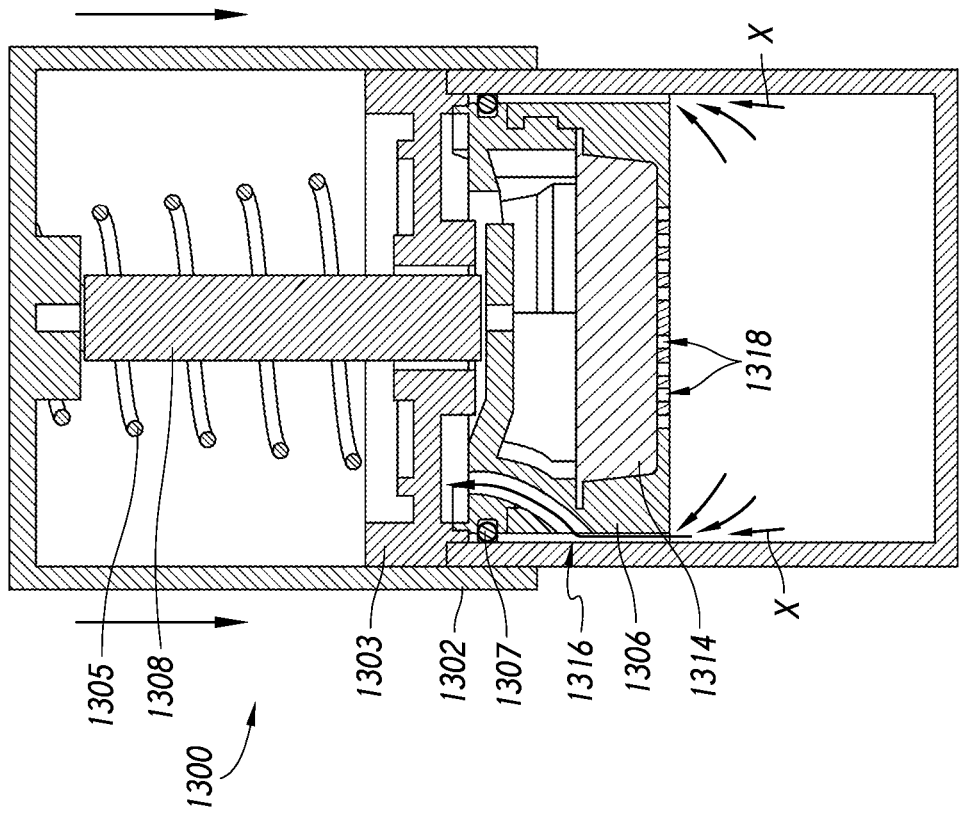
FIG. 16 is a diametric cross section of an apparatus for brewing a steeped beverage according to yet another embodiment, shown in a starting/ending configuration.
Figure 17A:
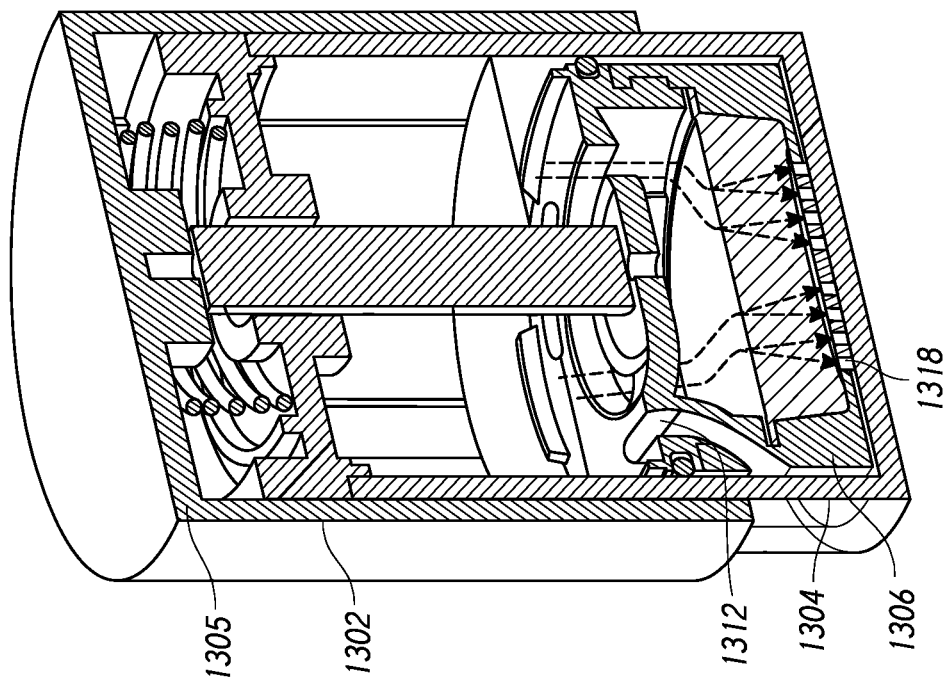
FIG. 17A is a ¾ perspective of the cross section of FIG. 17.
Figure 17:
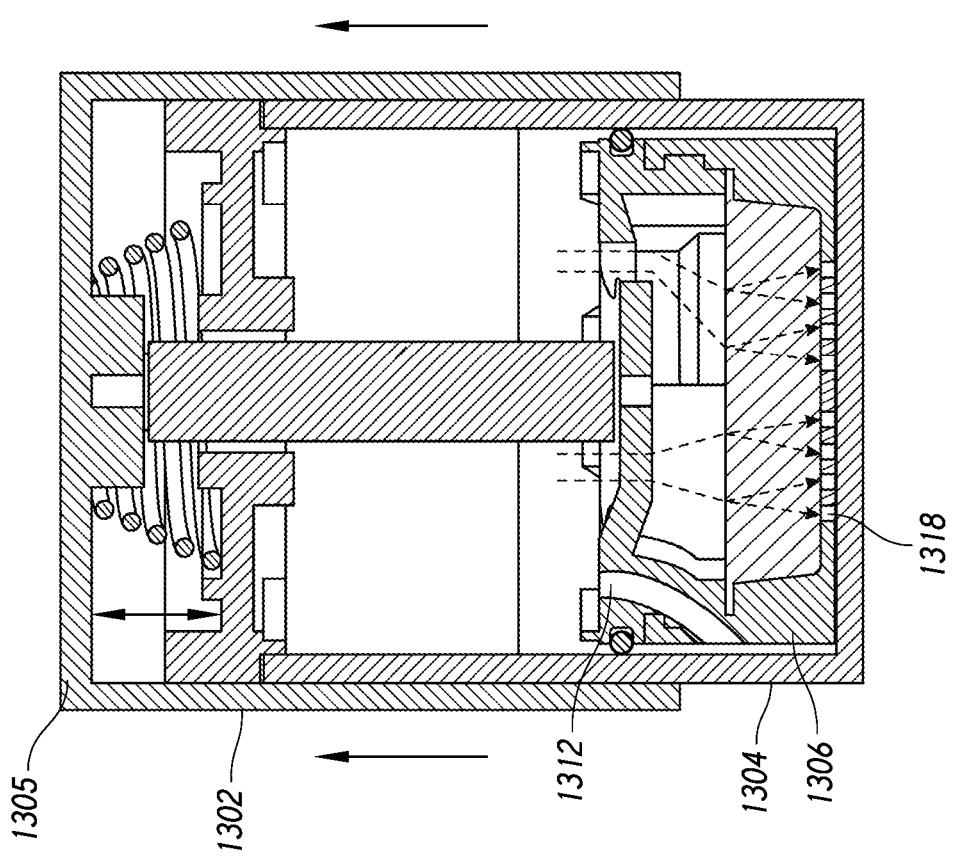
FIG. 17 is a diametric cross section of the apparatus of FIG. 16, shown in an initial brewing configuration.

FIGS. 16 and 17 illustrate yet another embodiment of an apparatus 1300 for steeping coffee or the like. This particular embodiment is similar to the previous embodiment: a container 1304 covered by a cap 1303 that is slidably coupled by a shaft 1308 to a lid 1302. The lid 1302 is urged toward the upward position, away from the container 1304, by a spring 1305. A filter assembly 1306 is coupled to the shaft 1308 on the bottom side of the cap 1303. Depressing the lid 1302 against the force of the spring 1305 causes the filtering assembly 1306 to move to the bottom of the container 1304, then the spring urges the filtering assembly back to the top of the container.

FIGS. 16 and 16A show the lid 1302, shaft 1308 and filtering assembly 1306 being depressed to initiate the brewing sequence. During this step, water flows quickly around the filter/cartridge 1314. During the downward stroke, the flow resistance created by the filter/cartridge 1314 is sufficient to divert virtually all of the water around the filter/cartridge and through enlarged bypass channels. This allows the filtering assembly 1306 to move quickly through the water to begin the brewing stroke.

FIGS. 17 and 17A show the start of the brewing stroke, in which the water flows slowly through the filer/cartridge 1314 to make coffee or another steeped beverage. Water is prevented by the one-way valves 1312 from flowing around the filter/cartridge 1314, so it must flow through the filter/cartridge.

The perimeter of the illustrated filtering assembly 1306 incorporates enlarged passages 1316 that allow water to pass quickly through the filtering assembly when the lid 1302 is depressed to initiate the brewing process. Water in the lower portion of the container 1304 can pass between the wall of the container and the filter/cartridge 1314, as shown by the small arrows X. Water can flow about the entire perimeter of the filtering assembly 1306 increasing the flow rate through the enlarged openings 1316. In alternate embodiments, the enlarged openings 1316 can extend through the bottom of the filtering assembly 1306 so that the water can flow directly into the enlarged openings without flowing through the gap between the filtering assembly and the wall of the container 1304. The device 1300 can incorporate one, two, three or more enlarged openings 1316, of various sizes and shapes, as necessary or desirable to create suitable flow characteristics.

A gate valve, butterfly valve or other type of one-way valve is positioned in or along the enlarged passage 1316 to allow water to pass upwards, but not downwards, through the filtering assembly 1306. One example of a valve 1312 is shown in FIG. 17A In the illustrated embodiment, the valve 1312 pivots or bends between a closed orientation, abutting and obstructing the mouth of the enlarged opening 1316, and an open orientation, at least partially spaced apart from the mouth of the opening. Water pressure moves the valve 1312 from the closed orientation to the open orientation when the filtering assembly 1306 is urged downward. Thus, water passes through the valve 1312 and the enlarged opening 1316 when the filtering assembly 1306 moves in the downward direction. When the filtering assembly 1306 moves in the upward direction, water forces the valve 1312 into the closed orientation, against the mouth of the enlarged opening 1316, forcing the water to flow through the filter/cartridge 1314.

The filtering assembly 1314 incorporates an array of small openings 1318 located to be positioned over a base of the filter/cartridge 1314 when the filter/cartridge is coupled to the filtering assembly 1306. When the filtering assembly 1306 moves upwards under the force of the spring 1305, the water is forced through the filter/cartridge 1314 and through the small openings 1318, as illustrated in FIGS. 17 and 17A. The force of the spring 1305 and the flow-rate of the filter/cartridge 1314 and/or the small openings 1318 can be calibrated to cause the filtering assembly 1306 to take enough time moving across the container to brew a desired strength coffee or other steeped beverage. The small openings 1318 can be holes, as depicted in FIGS. 16-17, or can be gaps in a fine mesh screen or other apertures small enough to allow water to pass through while preventing a significant amount of coffee grinds or other matter to pass.

FIGS. 18A-18E sequentially illustrate the steps of assembling and using still another arrangement of an apparatus 1400 for brewing coffee or otherwise steeping a beverage. In this particular embodiment, the filtering assembly 1406 is made by coupling together an upper portion 1420 and a lower portion 1422. The filter/cartridge 1414 can be sandwiched between the upper and lower portions 1420, 1422 of the filtering assembly 1406, and can be removed and replaced by separating the two between uses, as depicted in FIG. 18A.

In FIG. 18B, the filtering assembly 1406 has been assembled with the filter/cartridge 1414 therein, and the cap 1403 has been engaged with the container 1404 holding water. The illustrated valve 1412 in the filtering assembly 1406 defaults into the closed orientation, and the illustrated spring 1405 urges the filtering assembly 1406 to default into the uppermost position with the filter/cartridge 1414 above the level of the water.

Between FIG. 18B and FIG. 18C, the user has depressed the handle 1410 of the device 1400 to cause the filtering mechanism 1406 to move to the bottom of the container 1404 and compress the spring 1405. Along the way, water in the container 1404 flowed along channel F, past the one-way valve 1412, to the upper side of the filtering mechanism. The valve 1412 was moved out of the way of the channel F under the increased water pressure as the filtering assembly 1406 moved downward. By FIG. 18C the filtering assembly 1406 is at the bottom of its stroke, positioned to begin a complete upward brewing stroke.

In FIG. 18D, the handle 1410, stem 1408 and filtering assembly 1406 are moving upwards with respect to the cap 1403 and the container 1404 under the force of the spring 1405. The valve 1412 is held by water pressure in the closed orientation, causing the water to flow through the filter/cartridge 1414. The spring 1405 continues to move the filtering assembly 1406 upwards through the water until, as shown in FIG. 18E, the filtering assembly has completed its upward stroke and is located above the top surface of the water. At this point, the cap 1403 and filtering assembly 1406 can be removed from the container 1404, along with the handle 1410 and spring 1405, leaving a container of coffee.

Dispensing Assembly

Figure 19A:
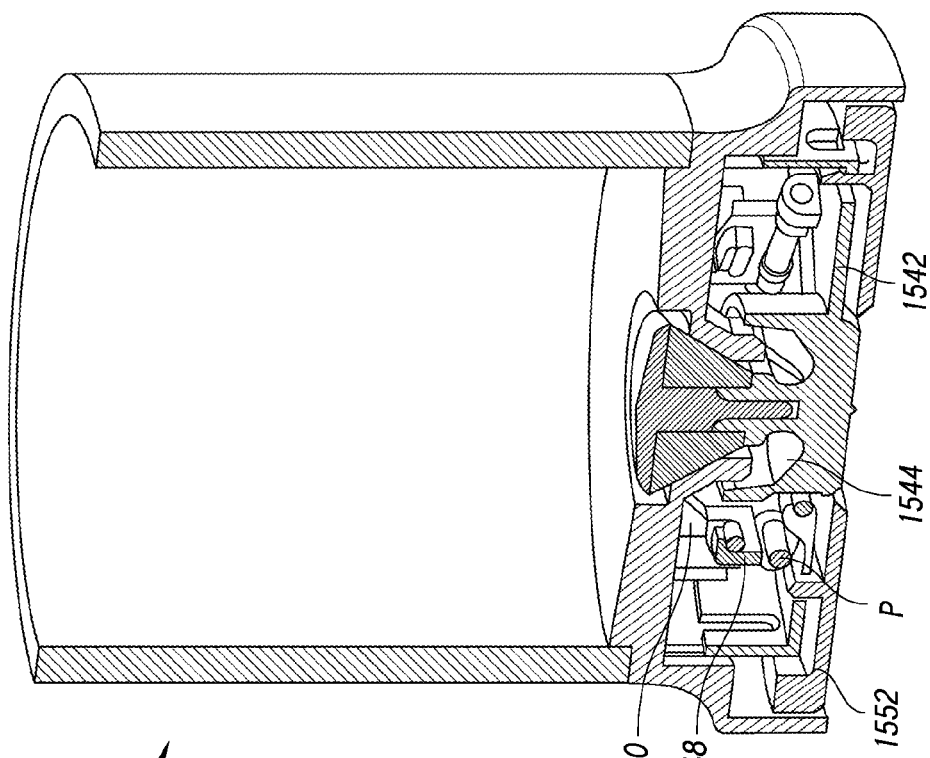
FIG. 19A is a ¾ perspective of the cross-section of FIG. 19.
Figure 19:
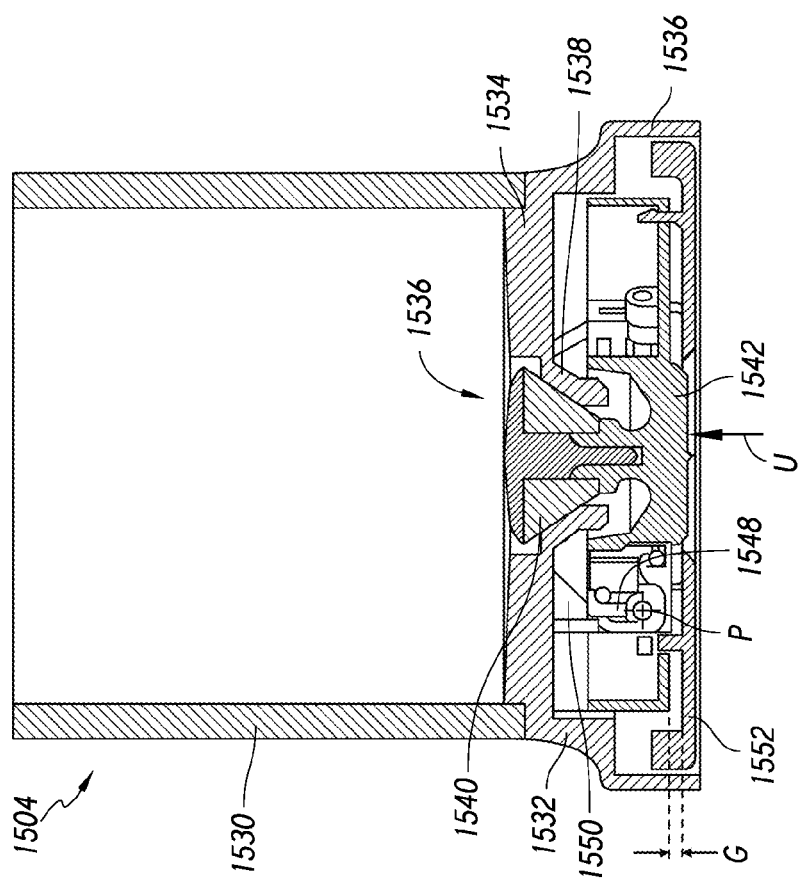
FIG. 19 is a diametric cross section of a container from an apparatus for brewing a steeped beverage according to yet another embodiment, shown in a closed and locked configuration.
Figure 20A:
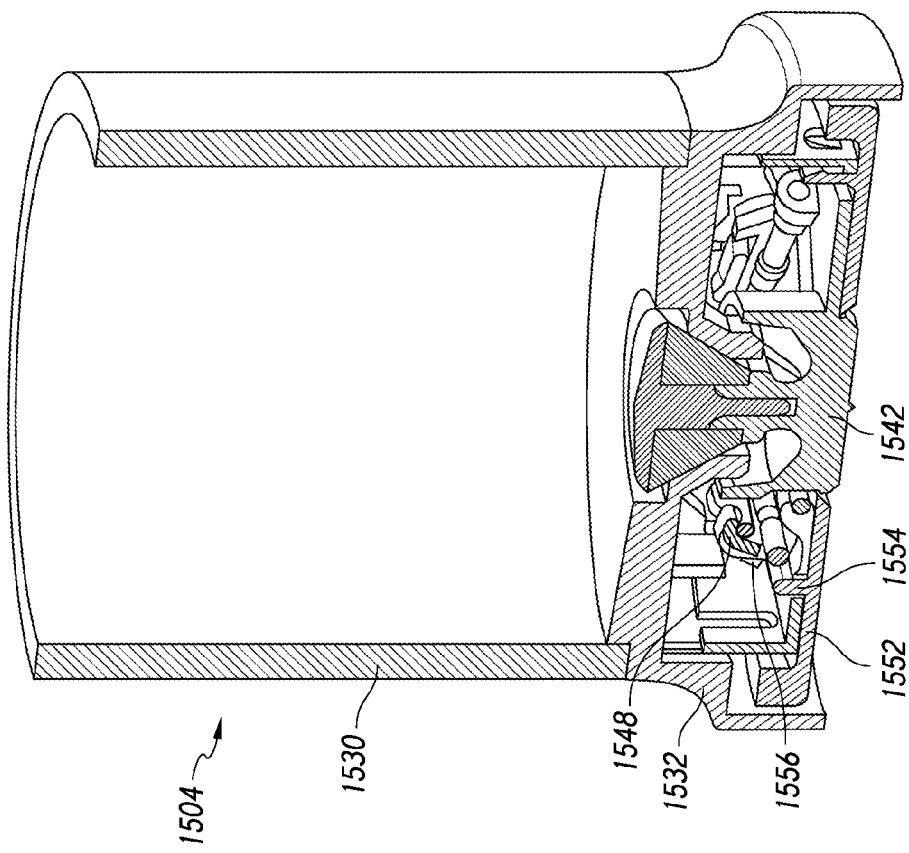
FIG. 20A is a ¾ perspective of the cross section of FIG. 20.
Figure 20:
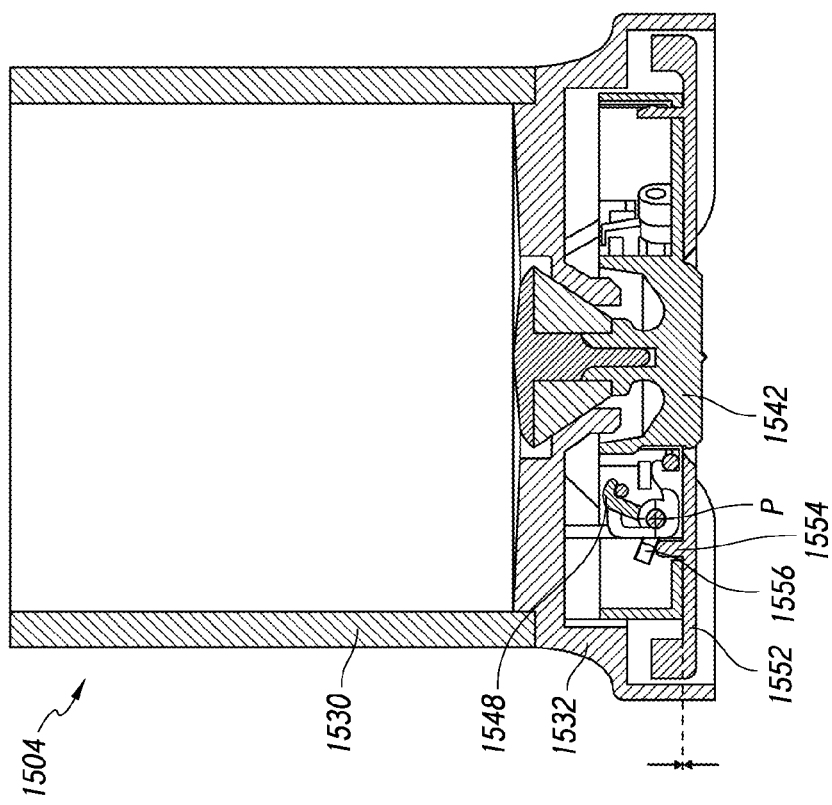
FIG. 20 is a diametric cross section of the apparatus of FIG. 19, shown in a closed and unlocked configuration.
Figure 21A:
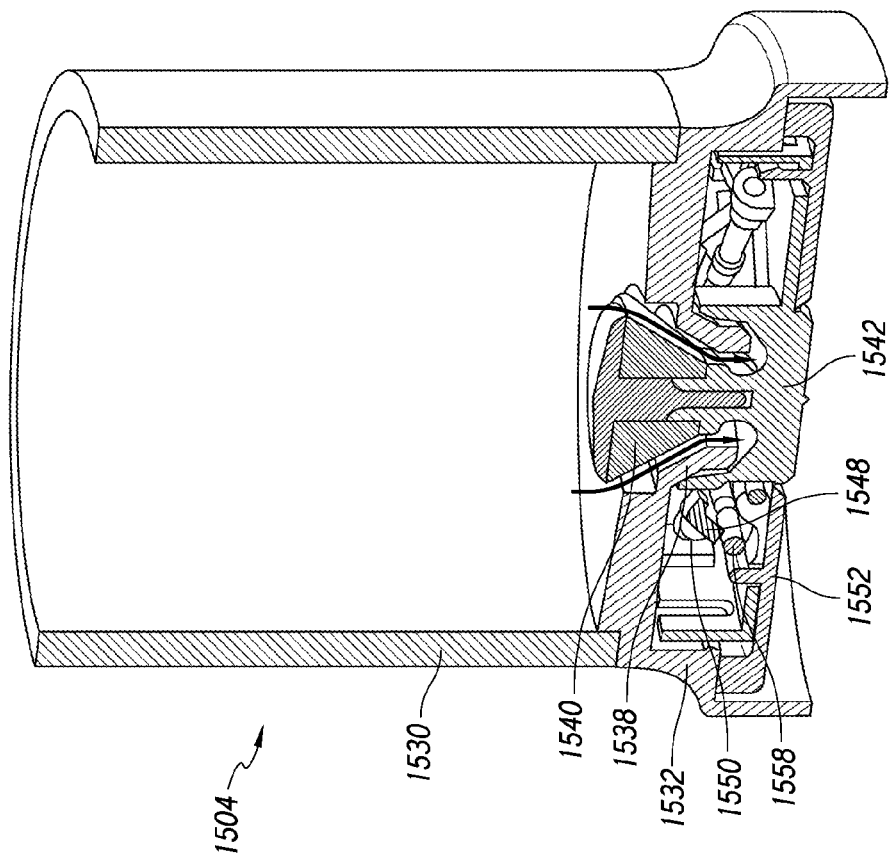
FIG. 21A is a ¾ perspective of the cross section of FIG. 21.
Figure 21:
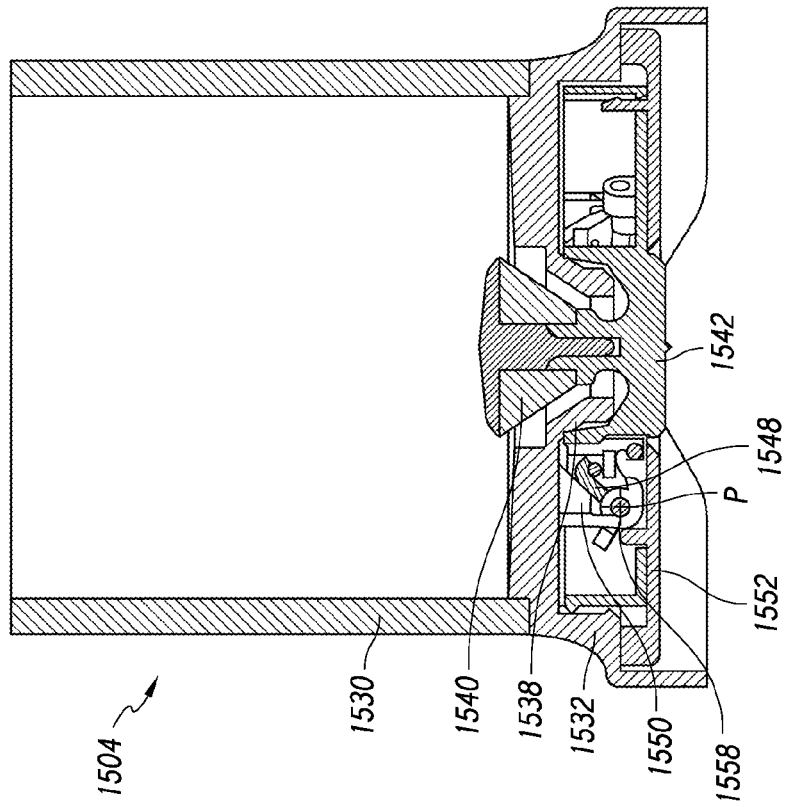
FIG. 21 is a diametric cross section of the apparatus of FIG. 19, shown in an open configuration.

FIGS. 19-21 illustrate an alternate version of a container 1504 according to still another embodiment. In this particular embodiment, as described in detail below, the container 1504 is designed to drain into a cup or mug when the container is set on the rim of the cup or mug, but to otherwise retain the coffee or other liquid in the container whether it is being held in the air, resting on a countertop or otherwise not resting on a cup or mug. It should be appreciated that the features of this container 1504 can be combined with container embodiments described in this application to provide the function of draining into a cup or mug when the container is set on the rim of the cup or mug, but to otherwise retain the coffee or other liquid in the container whether it is being held in the air, resting on a countertop or otherwise not resting on a cup or mug. In addition, the embodiment of FIGS. 19-21 can but need not be used in combination with container embodiments described herein.

The container 1504 can be fabricated from a wall 1530 coupled to a base 1532. The top of the illustrated base 1532 has an annular, flat central surface 1534, corresponding to the bottom of the container 1504. The base 1532 is surrounded by a skirt 1536 projecting downward therefrom to form a circular footing for the device. The illustrated skirt 1536 terminates at its lower end in a complete circle, upon which the container 1504 rests; however, the footing can be discontinuous or can have another suitable shape.

The center of the illustrated base 1532 is formed with a drain hole 1537 having a conical seat 1538 at its lower end. A plug 1540 is positioned in the drain hole 1537, and is nested in the conical seat 1538 to seal the container 1504 above the base 1532. When the plug 1540 is moved upwards away from the conical seat 1538, as illustrated in FIG. 21 and described below, liquid in the container 1504 can drain around the plug out of the container 1504 through the drain hole 1537.

The plug 1540 is coupled on its lower side to an actuator plate 1542, which, when unlocked and urged upwards from below, moves the plug from the closed or sealed configuration to the open or unsealed configuration. A central area in the illustrated actuator plate 1542 incorporates radial fins 1544 and openings 1546 therebetween through which the liquid exiting the container 1504 can drain. In the illustrated embodiment, the central area is circular; the central area can have any suitable size and shape.

In the configuration shown in FIGS. 19 and 19A, the actuator plate 1542 is locked. A latch 1548, pivotally coupled to the actuator plate to rotate about a latching pivot point P, abuts a stop 1550 on the lower face of the central surface 1534. The stop 1550 prevents upward movement of the latch 1548 and, with it, the actuator plate 1534. As a result, in this configuration, an upward force U on the center of the actuator plate does not move the plug 1540. Consequently, if the container 1504 is set onto a flat surface smaller than the diameter of the skirt 1536, the activator plate 1542 will not move, and the container will not empty. Only if the container 1504 is set on a surface with a hole or depression in it wider than the central portion of the activator plate 1542 and narrower than the skirt 1536-such as a cup or mug-will the activator plate move the plug 1540 into the open configuration.

Below the activator plate 1542 is a locking plate 1552, spaced apart from the activator plate by a gap G. The illustrated locking plate 1552 is slidably mounted with respect to the activator plate 1542 to reciprocate vertically. Movement of the locking plate 1552 upwards to close the gap G, unlocks the activation plate 1552. By comparing FIGS. 19 and 20, you can see the difference between the locking plate in the lower, locked position (FIG. 19) and in the upper, unlocked position (FIG. 20).

Movement of the locking plate 1552 into the upper, unlocked position causes a projection 1554 on an upper surface of the locking plate to push a tab 1556 on the latch 1548, rotating the latch about the latch pivot P from the locked orientation (FIG. 19) to the unlocked orientation (FIG. 20). At this point, the locking plate 1552 is abutted against the activator plate 1542, such that additional upward force on the locking plate causes both the locking plate and the unlocked activator plate 1542 to move further upwards into the base 1532.

In FIG. 21, the upward movement of the locking plate 1552 and the activator plate 1542 has resulted in the plug 1540 to move out of the seat 1538, opening the drain hole 1537 to allow liquid to escape the container 1504 through the openings 1546.

When the upward force on the locking plate 1552 is removed, a spring 1558 forces the latch 1548 to counter-rotate and slide along an angled surface on the stop 1550. The latch 1548 slides along the stop 1550, forcing the activator plate 1542 and locking plate 1552 downward and back into the locked configuration. This also causes the plug 1540 to contact the seat 1538 and seal the container 1504.

FIGS. 22A-22G depict another embodiment of a modified French press. Similar to some of the embodiments described above, the illustrated device 1600 incorporates a lid 1602 sealingly mounted to a container 1604 holding hot water. The lid 1602 can be sealed to the container 1604 using an O-ring or other widely recognize structure, and can be twisted on, snapped on or otherwise coupled thereto to facilitate making coffee according to the following description.

Figure 22D:
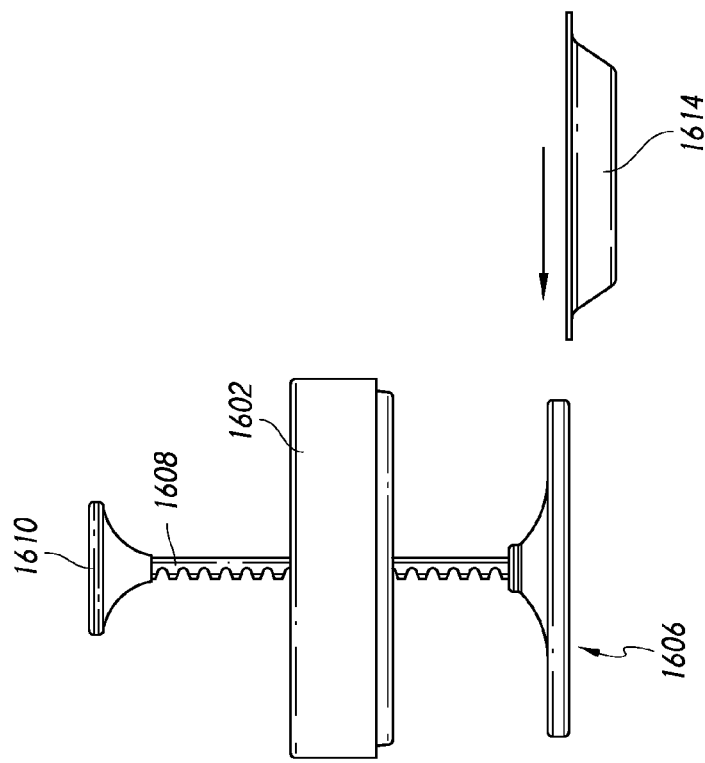
FIG. 22D is side view of a valve/seal combination and pod of FIG. 22A.
Figure 22C:
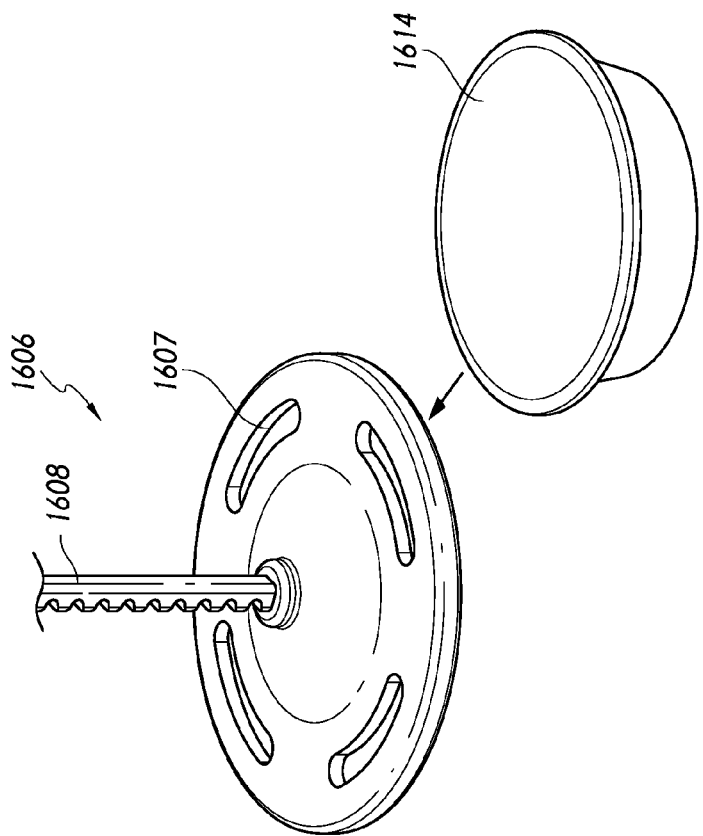
FIG. 22C is top perspective view of a valve/seal combination and pod of FIG. 22A.
Figure 22G:
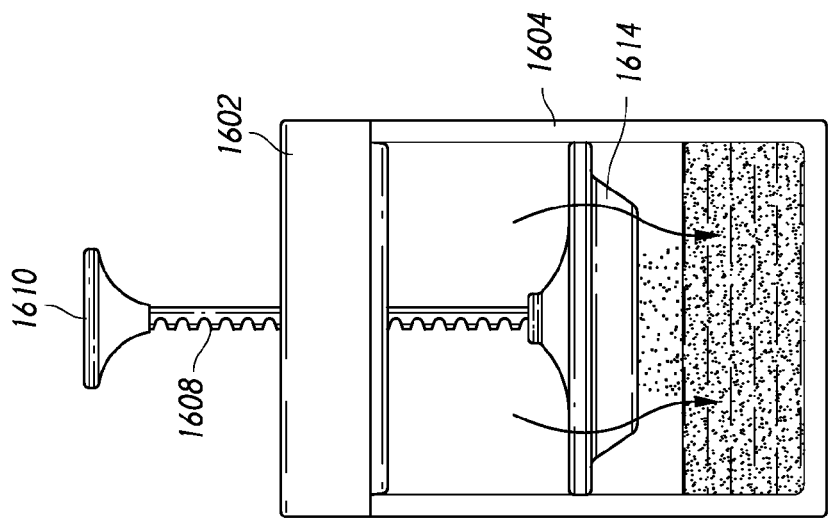
FIGS. 22E, 22F, 22G is a progression of diametric cross-sectional views of an embodiment of the apparatus of FIG. 22A, shown in the course of assembling the apparatus and brewing coffee.

A filtering assembly 1606 can be positioned inside the device 1600. The filtering assembly 1606 can be coupled to one end of a stem 1608 having a handle 1610 at its opposing end, the handle 1610 being located outside the device for manipulation by a user. The illustrated stem 1608 passes through the lid 1602. Inside the illustrated lid 1602 is a biasing mechanism (not illustrated) that urges the stem 1608 and filtering assembly 1606 upward. As shown in FIG. 22C, the filtering assembly 1606 can include a plurality of valves 1607 positioned about the periphery of the filtering assembly 1606. The valves 1607 can comprise any of the one-way or check type of valves described herein (e.g., butterfly, flap, ball and/or umbrella valves). The valves 1607 allow liquid to flow from below the assembly 1606 and flow through the assembly 1606 as the assembly is advanced downward through the liquid. As the assembly 1606 is advanced upward through the liquid, the valves 1607 close or partially close to bias the liquid through a filter/cartridge 1614 coupled to the assembly 1606. As shown in FIG. 22D, in the illustrated arrangement, the assembly 1606 can include grooves for receiving a lip on the filter/cartridge 1614 so as to couple the filter/cartridge 1614 to the assembly 1606 as the filter/cartridge 1614 is slid into the grooves. In modified embodiments, the grooves can be on the filter/cartridge 1614 and/or other mechanisms can be used to couple the filter/cartridge 1614 to the assembly 1606.

Figure 22F:
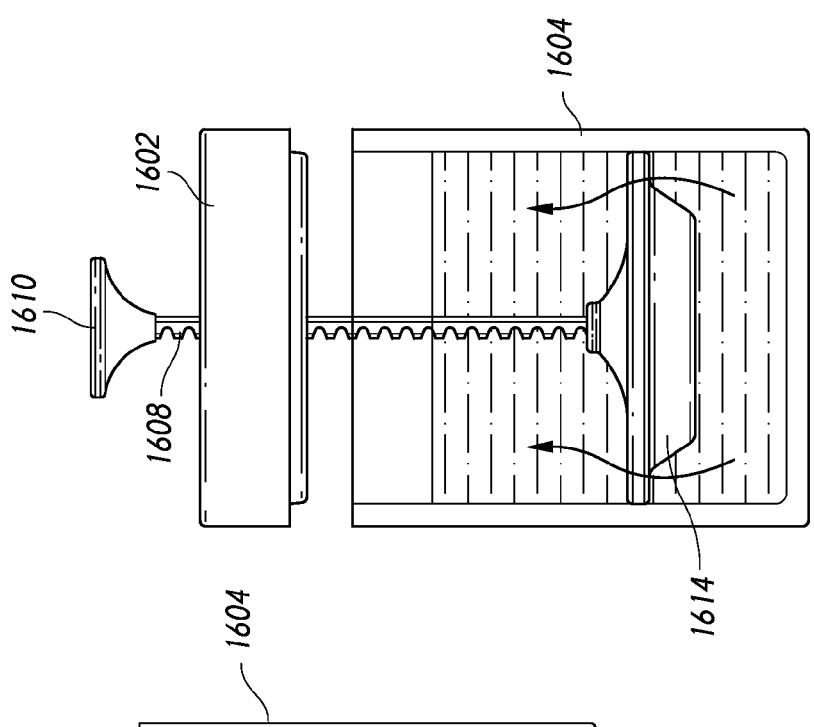
Figure 22E:
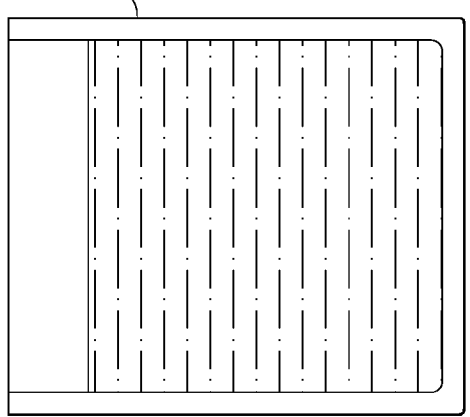
Figure 24:
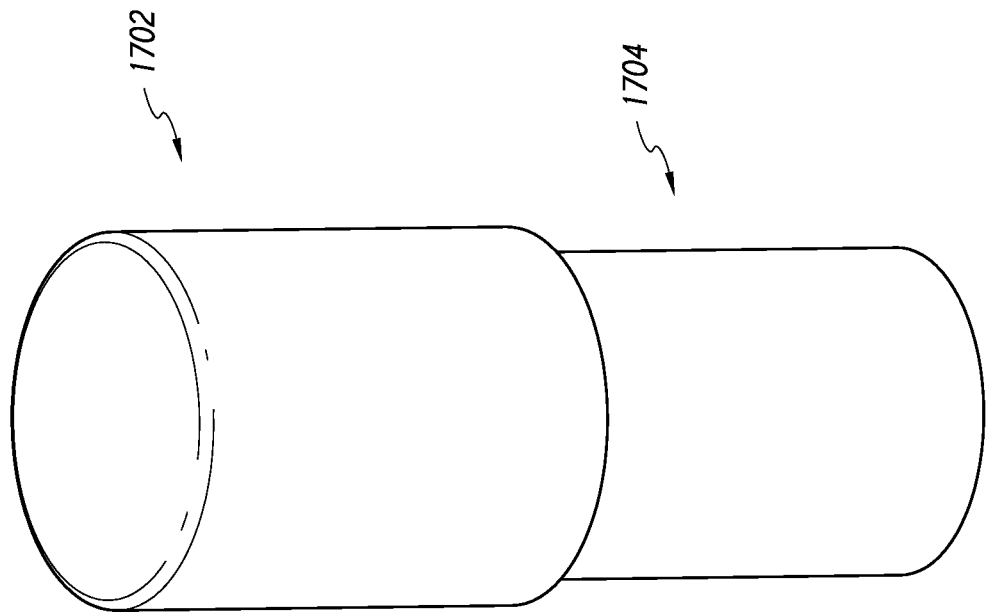
FIG. 24 is a front perspective view of a container mated with the lid of FIG. 23.
Figure 23:
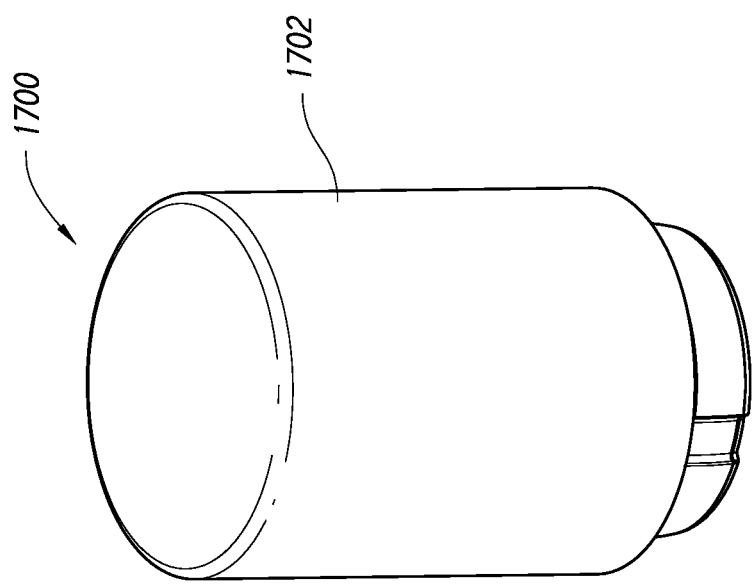
FIG. 23 is a front perspective view illustrating a lid of an apparatus for brewing a steeped beverage according to one embodiment.

To actuate the device, a user depresses the handle 1610 downward against the force of the biasing mechanism (FIG. 22F). When the filtering assembly 1606 has been fully depressed, the user removes the downward force from the handle 1610, and the biasing mechanism returns the handle, along with the stem 1608 and filtering assembly 1606, to the upward position.

Figure 25:
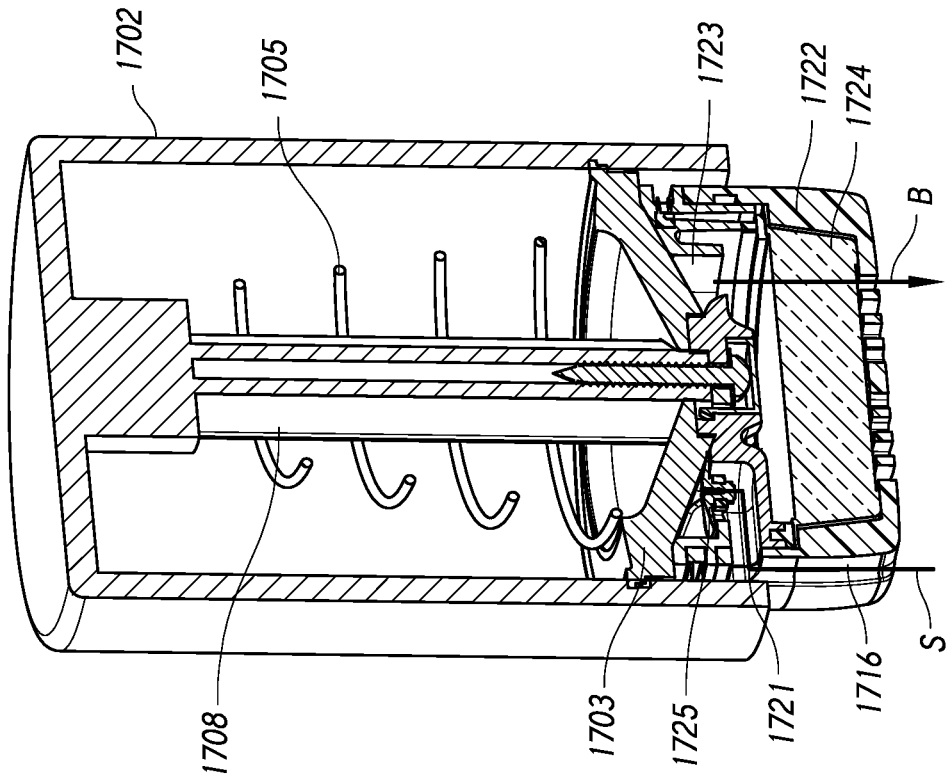
FIG. 25 is a diametric cross-section of the lid of FIG. 23.

FIGS. 23-28 illustrate yet another embodiment of an apparatus 1700 for steeping coffee or the like. This particular embodiment is similar to the embodiment of FIGS. 16 and 17 and generally comprises: a container 1704 (FIG. 24) covered by a cap 1703 that is slidably coupled by a shaft 1708 to a lid 1702 (FIG. 25). The lid 1702 is urged toward the upward position, away from the container 1704, by a biasing member 1705, e.g., a spring, bellow, or likewise (FIG. 25). A filter assembly 1706 is coupled to a lower portion of the shaft 1708. Depressing the lid 1702 against the force of the biasing member 1705 causes the filtering assembly 1706 to move downward relative to the cap 1703 and to the bottom of the container 1704, then the biasing member 1705 urges the filtering assembly 1706 back to the top of the container 1704. Although not shown, the container 1704 can optionally include a base. The base 1705 can be made of a resilient material such as, for example, rubber.

Figure 27:
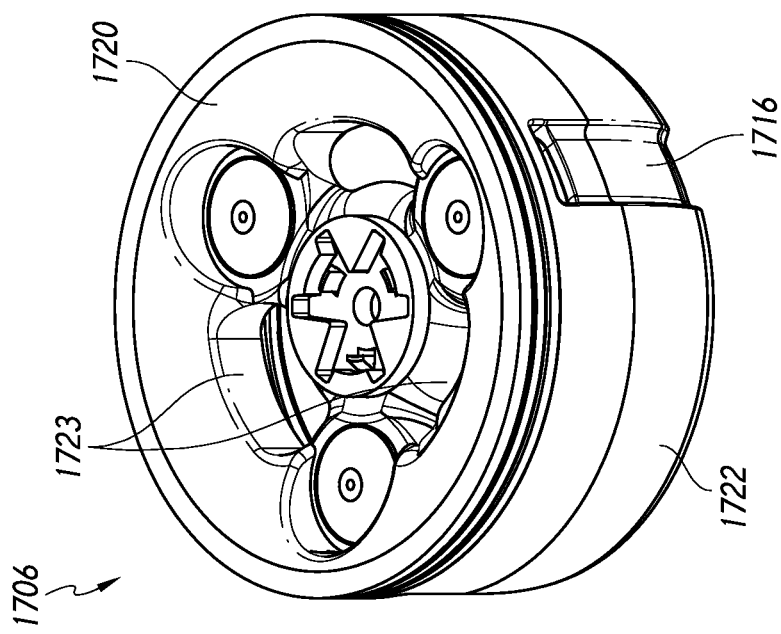
FIG. 27 is a front perspective view of the filtering assembly of the apparatus of FIG. 23.

FIG. 27 illustrates the filtering assembly 1706 that can be made by coupling together an upper portion 1720 and a lower portion 1722 similar to the arrangement described above with reference to FIGS. 18A-E. A filter/cartridge 1714 can be sandwiched between the upper and lower portions 1720, 1722 of the filtering assembly 1706, and can be removed and replaced by separating the two between uses (see FIG. 25).

Figure 28:
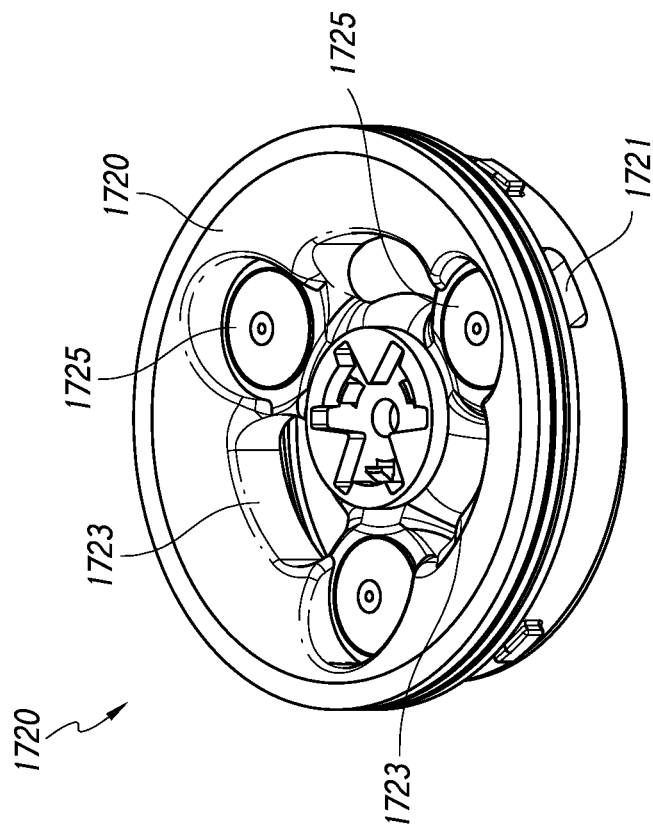
FIG. 28 is a front perspective view of the filtering assembly of FIG. 27 with a lower portion of the filtering assembly removed.

As shown in FIG. 27, the perimeter of the illustrated filtering assembly 1706 incorporates one or more passages 1716 (e.g., grooves, channels, or likewise) that allow water to pass quickly through the filtering assembly 1706 when the lid 1702 is depressed to initiate the brewing process. Water in the lower portion of the container 1704 can pass between the wall of the container and the filter/cartridge 1714 by passing through one or more passages 1716. The illustrated arrangement includes three passages 1716 equally spaced about the perimeter of the filtering assembly 1706. In the illustrated embodiment, the passages 1716 are formed in the lower portion 1722 of the filtering assembly 1706. The passages 1716 communicate with the openings 1721 formed in the upper portion 1720 of the filtering assembly 1706 (see FIG. 28). As shown in FIG. 28, openings (not shown) are positioned on the top of the upper portion 1720 and each opening is covered by a valve 1725, an umbrella valve, a gate valve, butterfly valve or other type of one-way allow water to pass upwards, but not downwards, through the filtering assembly 1706. In the illustrated arrangement, the valve 1725 is an umbrella valve. Water pressure moves the valve 1725 from the closed orientation to the open orientation when the filtering assembly 1706 is urged downward. Thus, water passes through the valve 1725 and the opening 1716 when the filtering assembly 1706 moves in the downward direction. When the filtering assembly 1706 moves in the upward direction, water forces the valve 1725 into the closed orientation, against the mouth of the openings in the upper portion 1720, forcing the water to flow through the filter/cartridge 1714.

Figure 26:
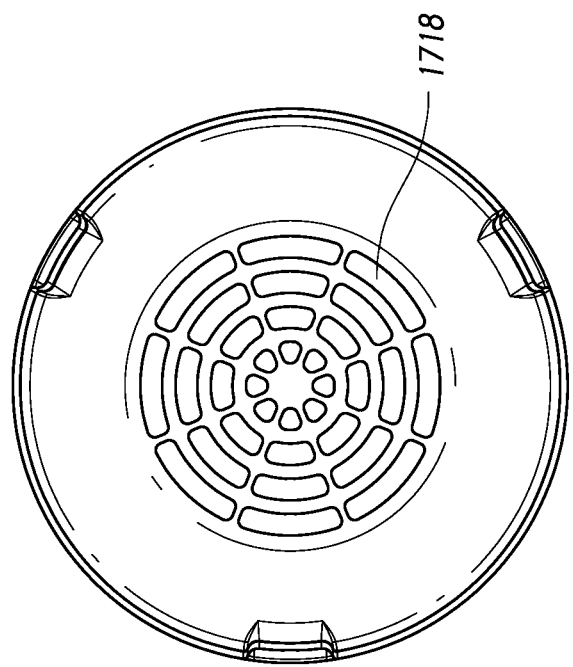
FIG. 26 is a bottom view of a filtering assembly of the lid of FIG. 23.

With reference to FIG. 26, the filtering assembly 1706 incorporates an array of openings 1718 positioned under the filter/cartridge 1714 when the filter/cartridge 1714 is positioned in the filtering assembly 1706. When the filtering assembly 1706 moves upwards under the force of the spring 1705, the water is forced through the filter/cartridge 1714 and through the small openings 1718, The force of the biasing member 1705 and the flow-rate of the filter/cartridge 1714 and/or the openings 1718 can be calibrated to cause the filtering assembly 1706 to take enough time moving across the container to brew a desired strength coffee or other steeped beverage. The openings 1718 can be holes, as depicted in FIG. 26, or can be gaps in a fine mesh screen or other apertures small enough to allow water to pass through while preventing a significant amount of coffee grinds or other matter to pass.

As with the embodiment of FIGS. 16 and 17, the filtering assembly 1706 is depressed to initiate the brewing sequence. During this step, water flows quickly around the filter assembly 1706 (in direction S) through the passages 1716 and openings in the upper portion 1720, for example, as the valves 1725 are pushed into an open position, if present. During the downward stroke, the flow resistance created by the filter assembly 1706 is sufficient to divert virtually all of the water around the filter assembly 1706 and through passages 1716. This allows the filtering assembly 1706 to move quickly through the water to begin the brewing stroke.

At the start of the brewing stroke, the water flows slowly through the one or more openings 1723 (see FIG. 27) in the filter assembly 1706 to make coffee or another steeped beverage (in direction B). Water is prevented by the one-way valves 1725 from flowing around the filter assembly 1706, so it must flow through the filter assembly 1706. Water moving downward through the filter assembly 1706 can pass through openings 1723 formed in the upper portion 1720 of the filtering assembly 1706. As shown in FIG. 27, the filtering assembly 1706 can include three openings 1723, which can be positioned between the three valves 1725. In certain aspects, the openings 1723 are larger than the openings 1721.

Figure 29:
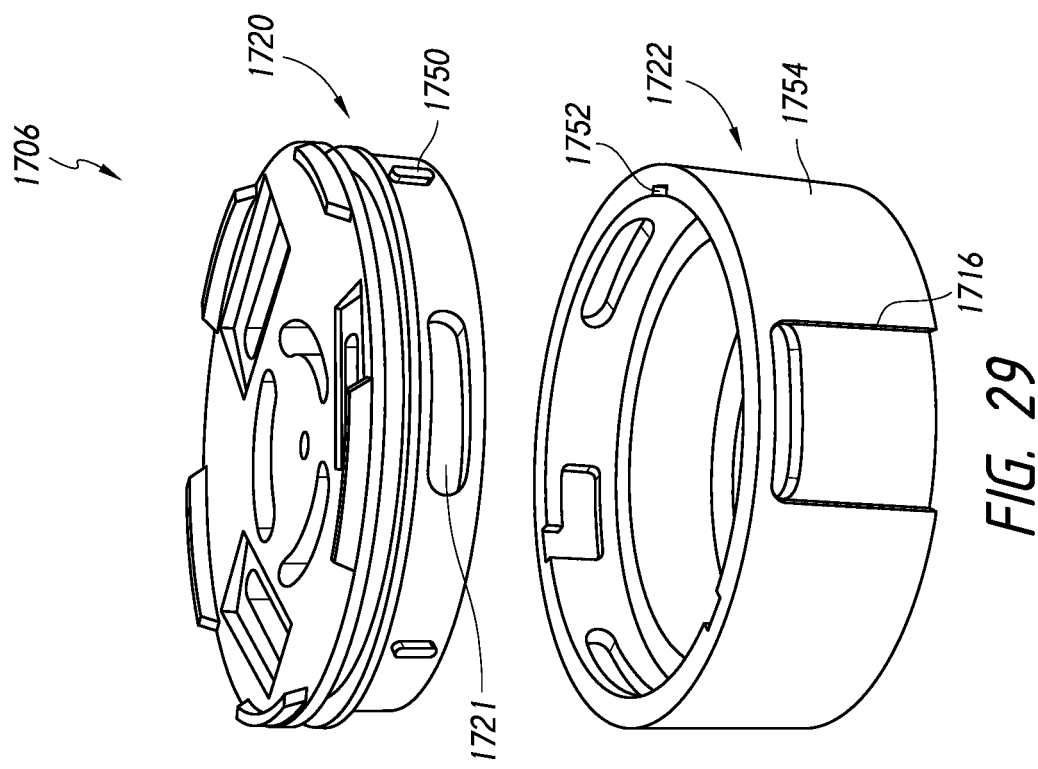
FIG. 29 illustrates the upper and lower portions of the filtering assembly of FIGS. 27 and 28.

FIG. 29 is another view of the filtering assembly 1706 showing the upper and lower portions 1720, 1722. As described above, a filter/cartridge (not shown) can be sandwiched between the upper and lower portions 1720, 1722 of the filtering assembly 1706, and can be removed and replaced by separating the two between uses. As shown, the upper and lower portion 1720, 1722, can optionally be connected by a bayonet mount comprising a male pin 1752 on the upper portion 1720 and a female receptor 1752 on the lower portion 1722. As shown in FIG. 29, the female receptor 1752 is formed within a side wall 1754 of the lower portion 1722.

Figure 30:
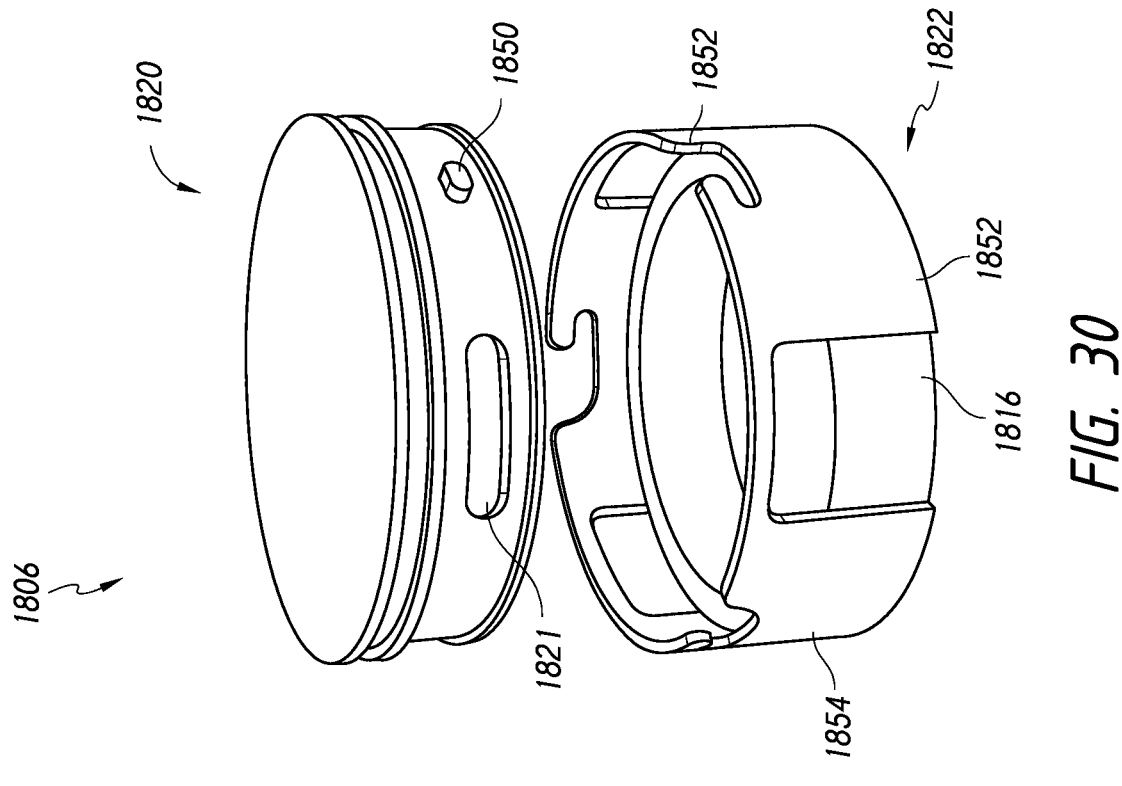
FIG. 30 illustrates a modified arrangement of the filtering assembly.
Figure 31:
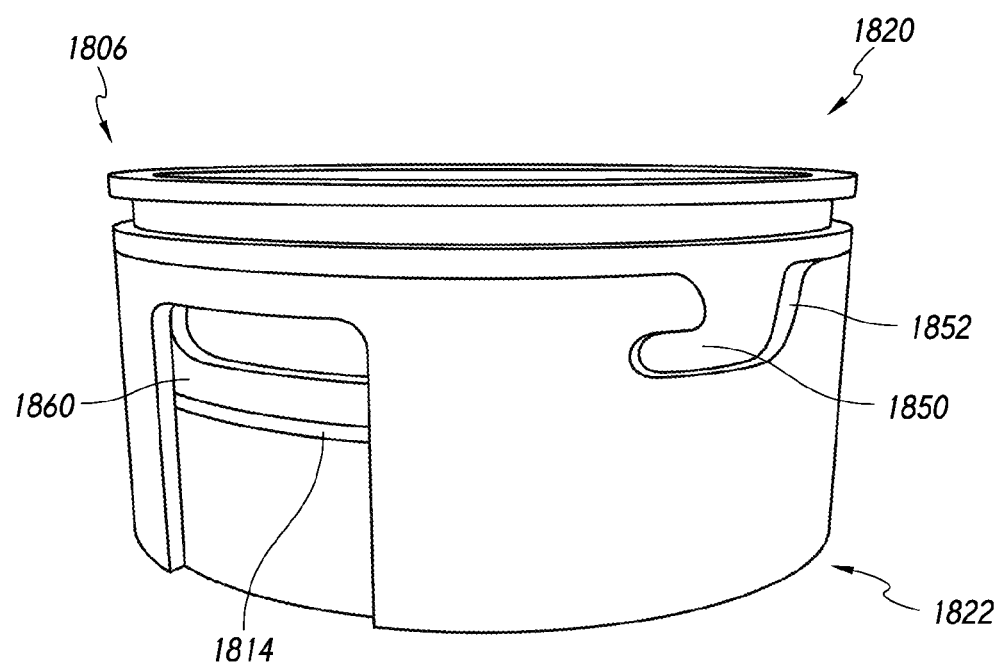
FIG. 31 is an assembled view of the filtering assembly of FIG. 30.

FIG. 30 illustrates a modified embodiment in which the thickness of the side wall is reduced as compared to FIG. 29. Thus, as shown in FIG. 30, the female receptor 1852 forms an opening in the side wall 1854. Further, the perimeter of the illustrated filtering assembly 1806 incorporates enlarged passages 1816 (e.g., grooves, channels, or likewise) that allow water to pass quickly between the filtering assembly 1806 and the container and through the filtering assembly 1806 when the lid is depressed to initiate the brewing process. FIG. 31 is a side view of the filtering assembly 1806. As shown in FIG. 31, the cartridge 1814 is sandwiched between the upper and lower portions 1820, 1822 of the assembly 1806. A seal 1860 can be positioned between the upper cartridge 1814 and the upper portion 1820 to prevent fluid leakage as the assembly is moved through the fluid.

Figure 32:
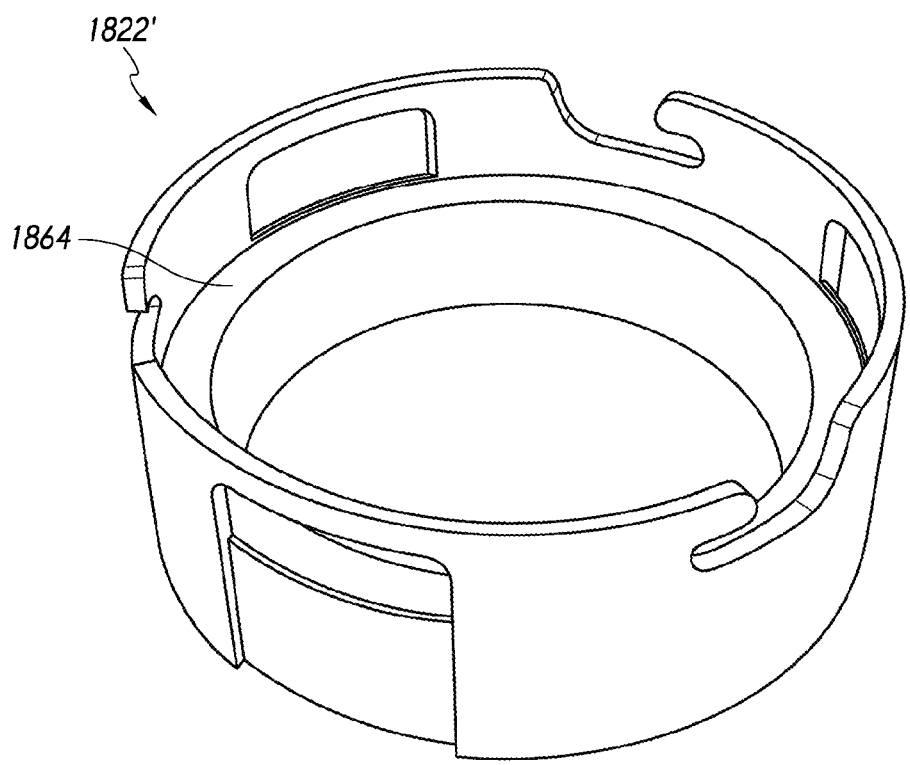
FIG. 32 is a top perspective view of the lower portion of the filtering assembly of FIG. 30.
Figure 33:
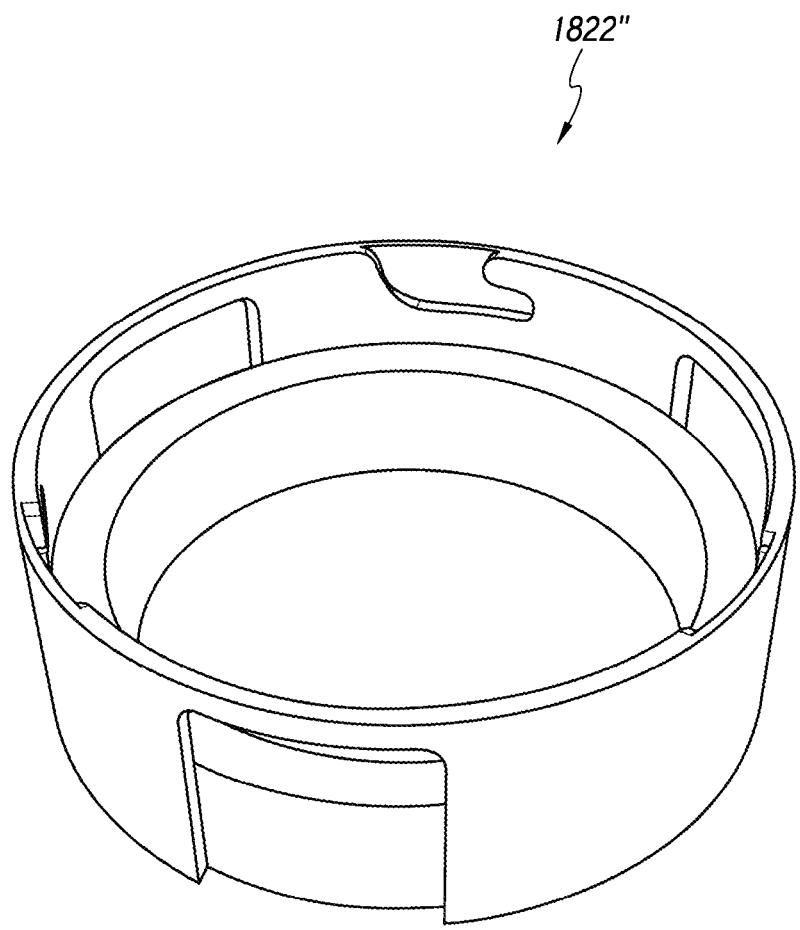
FIG. 33 is top perspective view of another embodiment of the lower portion of the filtering assembly of FIG. 30.

FIG. 32 illustrates a modified embodiment of the lower portion 1822' of FIG. 31 wherein the seal 1860 can be replaced with a small lip 1864 that forms a seal with the cartridge to prevent leakage. FIG. 33 illustrates another embodiment of the lower portion 1822" in which the lower portion 1822" includes thin side walls.

Figure 34A:
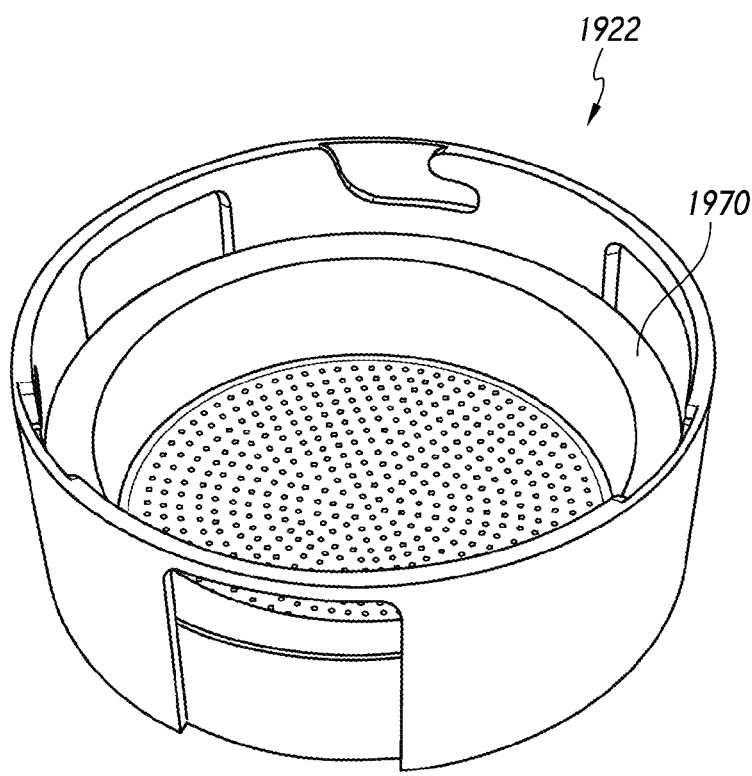
FIGS. 34A and 34B are top and bottom perspective views of the lower portion of FIG. 33 with a basket.
Figure 34B:
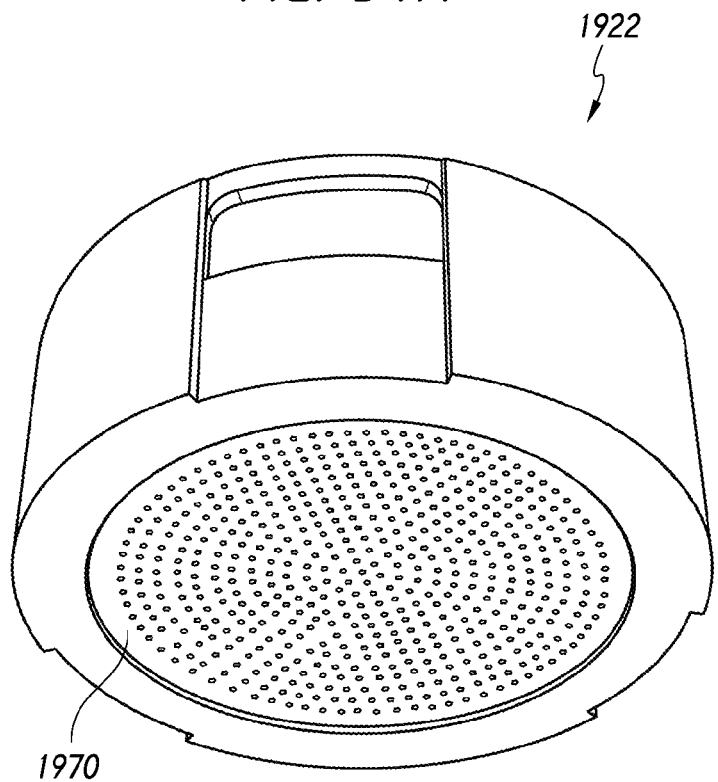

FIGS. 34A and 34B illustrate an embodiment of the lower portion 1922 that includes a basket 1970 positioned within the lower portion (e.g., a metallic basket). The basket 1970 in certain embodiments can be removable. As shown in FIG. 34A, the screen can include logos and other images and in certain embodiments can be laser edged onto the material.

In the embodiments described herein, it is advantageous that the pressure below the filtering assembly is lower than the pressure above the filtering assembly. The decreased pressure is caused by the movement of the filtering assembly upward from the bottom of the container, which increases the volume below the filtering assembly. In certain embodiments, the pressure below the filtering assembly can be within the range of about 0.5 to 10 psi, and in other arrangements, between about 1 and 7 psi and in another arrangement about 3 psi. This lower pressure below the filtering assembly can pull the water through the filter/cartridge. The negative pressure is also useful for extracting flavor out of the material (e.g., coffee grinds) in the filter cartridge.

Although not illustrated or described in detail, it should be appreciated that the arrangements of FIGS. 10-35 can be combined with various combinations and/sub-combinations of FIGS. 2-9E. For example, the various timing mechanism and/or mechanism for adjusting brew time can be incorporated into these designs. In other arrangements, the user input features can be provided as described above.

In the embodiments of FIGS. 10-35, the filter assembly is described as moving first downward through the fluid bypassing the filter/cartridge and then moving upward during a brewing step as the fluid moves through the filter/cartridge. However, these embodiments are not limited to the described upward/downward orientation. That is, in other embodiments, the upward/downward directions can be reversed or orientated differently (e.g. laterally).

Although certain embodiments have been described herein with respect to coffee, the cartridges described herein can include particulate materials or components for producing many other types of beverages, such as a chocolate-based product (e.g., hot cocoa), tea, juice, and other beverages. In addition, although some embodiments have been disclosed in which water is used to produce a beverage, other liquids can be used, such as milk. Further, although some embodiments have been disclosed in which liquid is introduced into the cartridge, the introduction of other phases is contemplated. For example, in some embodiments, steam or a combination of steam and liquid water is introduced into the cartridge. Additionally, although certain embodiments have been disclosed that include a single beverage component or precursor, the term "beverage component or precursor" is not limited to only a single component. Rather, the beverage component or precursor can comprise one component (e.g., coffee) or a plurality of components (e.g., coffee and a sweetener).

Additionally, although the brewing apparatuses disclosed herein are described in connection with a cartridge, any of the brewing apparatuses can be configured for use with different types of cartridges and/or a loose beverage component (e.g., coffee grinds or tea leaves). For example, the brewing apparatus can be configured to receive one of a number of cartridge holders sized to receive different types of cartridges and/or a loose beverage holder. The loose beverage holder can be a re-fillable basket configured to hold loose beverage components. Alternatively, the loose beverage components can be inserted into the fluid reservoir without the use of a holder. As another example, the brewing apparatus can include an adjustable cartridge holder configured to adjust to the size of the cartridge.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments, whether these features, elements, and/or steps are included or are to be performed in any particular embodiment.

The ranges disclosed herein also encompass any and all overlap, sub-ranges, and combinations thereof. Language such as "up to," "at least," "greater than," "less than," "between" and the like includes the number recited. Numbers preceded by a term such as "about" or "approximately" include the recited numbers. For example, "about 30 mm" includes "30 mm."

The terms "approximately," "about," and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although certain embodiments and examples have been described herein, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

What is claimed is:

1. A method of using a brewing apparatus comprising:
   coupling one or more beverage components to a filtering assembly of the brewing apparatus;
   adding fluid to a fluid reservoir of the brewing apparatus;
   advancing the filtering assembly through the fluid in a first direction with the fluid avoiding the one or more beverage components by moving through a passage and a one way valve positioned on the filtering assembly, wherein advancing the filter assembly charges a biasing member; and
   releasing the biasing member to urge the filtering assembly in a second direction wherein fluid is restricted from moving through the passage by the one way valve to force fluid to move through one or more beverage components.

2. The method of claim 1, wherein coupling the one or more beverage components to the filtering assembly comprises coupling a cartridge housing the one or more beverage components to the filter assembly.

3. The method of claim 2, wherein coupling the cartridge to the filtering assembly comprising placing the cartridge between and upper and lower portion of the filtering assembly.

4. The method of claim 2, wherein advancing the filtering assembly through the fluid comprises compressing a spring.

5. The method of claim 2, wherein advancing the filtering assembly through the fluid in a first direction comprises advancing a stem coupled to the filtering assembly at one end and a handle at another end through a cap coupled to the fluid reservoir.

* * * * *